(12) United States Patent
Murakami et al.

(10) Patent No.: US 8,216,698 B2
(45) Date of Patent: Jul. 10, 2012

(54) ORGANIC ELECTROLUMINESCENCE DEVICE, NOVEL PLATINUM COMPLEX COMPOUND AND NOVEL COMPOUND CAPABLE OF BEING A LIGAND THEREOF

(75) Inventors: Takeshi Murakami, Ashigarakami-gun (JP); Toshihiro Ise, Ashigarakami-gun (JP); Ikuo Kinoshita, Ashigarakami-gun (JP); Saki Takada, Ashigarakami-gun (JP); Akira Takeda, Ashigarakami-gun (JP); Hiroo Takizawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 12/427,493

(22) Filed: Apr. 21, 2009

(65) Prior Publication Data
US 2009/0261721 A1 Oct. 22, 2009

(30) Foreign Application Priority Data

Apr. 22, 2008 (JP) .................................. 2008-111799
Dec. 4, 2008 (JP) .................................. 2008-310220

(51) Int. Cl.
*H01L 51/54* (2006.01)
*C09K 11/06* (2006.01)

(52) U.S. Cl. ............ 428/690; 428/917; 313/504; 546/4; 548/103; 257/E51.044

(58) Field of Classification Search ........................ None
See application file for complete search history.

(56) References Cited

U.S. PATENT DOCUMENTS

| | | |
|---|---|---|
| 6,303,231 B1 | 10/2001 | Sawada et al. |
| 6,303,238 B1 | 10/2001 | Thompson et al. |
| 6,653,654 B1 | 11/2003 | Che |
| 7,569,692 B2 | 8/2009 | Nii et al. |
| 2002/0008233 A1 | 1/2002 | Forrest et al. |
| 2002/0013306 A1 | 1/2002 | Lowe |
| 2002/0068190 A1 | 6/2002 | Tsuboyama et al. |
| 2002/0076576 A1* | 6/2002 | Li et al. ........................ 428/690 |
| 2003/0205707 A1 | 11/2003 | Chi-Ming |
| 2005/0170209 A1 | 8/2005 | Lee et al. |
| 2005/0260444 A1 | 11/2005 | Forrest et al. |
| 2005/0260445 A1 | 11/2005 | Walters et al. |
| 2006/0073359 A1 | 4/2006 | Ise et al. |
| 2006/0134460 A1 | 6/2006 | Kondakova et al. |
| 2006/0134461 A1 | 6/2006 | Huo et al. |
| 2006/0182992 A1 | 8/2006 | Nii et al. |
| 2006/0204787 A1 | 9/2006 | Sano et al. |
| 2006/0263635 A1 | 11/2006 | Ise |
| 2006/0264625 A1 | 11/2006 | Nakayama et al. |
| 2006/0286406 A1 | 12/2006 | Igarashi et al. |
| 2007/0059551 A1 | 3/2007 | Yamazaki |
| 2007/0082284 A1 | 4/2007 | Stoessel |
| 2007/0103060 A1 | 5/2007 | Itoh et al. |
| 2008/0001530 A1 | 1/2008 | Ise et al. |
| 2008/0036373 A1 | 2/2008 | Itoh et al. |
| 2009/0058279 A1* | 3/2009 | Takeda ........................ 313/504 |
| 2009/0072726 A1 | 3/2009 | Murakami et al. |
| 2009/0128008 A1 | 5/2009 | Ise et al. |
| 2009/0174324 A1 | 7/2009 | Nii et al. |
| 2009/0218935 A1* | 9/2009 | Sotoyama et al. ............ 313/504 |
| 2009/0218936 A1* | 9/2009 | Shibata et al. ................ 313/504 |
| 2009/0267500 A1 | 10/2009 | Kinoshita et al. |
| 2009/0309490 A1 | 12/2009 | Ise et al. |

FOREIGN PATENT DOCUMENTS

| | | |
|---|---|---|
| EP | 0969532 A2 | 1/2000 |
| EP | 1683804 A2 | 7/2006 |
| JP | 05-009470 A | 1/1993 |
| JP | 2000-048960 A | 2/2000 |
| JP | 2000-503982 A | 4/2000 |
| JP | 2001-338768 A | 12/2001 |
| JP | 2002-175884 A | 6/2002 |
| JP | 2002-305083 A | 10/2002 |
| JP | 2002-363552 A | 12/2002 |
| JP | 2003-123976 A | 4/2003 |
| JP | 2003-123981 A | 4/2003 |
| JP | 2003-520391 A | 7/2003 |
| JP | 2004-331508 A | 11/2004 |
| JP | 2005-220136 A | 8/2005 |

(Continued)

OTHER PUBLICATIONS

Yong-Yue Lin, et al.; "Structural, Photophysical, and Electrophosphorescent Properties of Platinum(II) Complexes Supported by Tetradentate N2O2 Chelates" Chemistry: A European Journal vol. 9, No. 6; 2003 Wiley-VCH; pp. 1263-1272.

M. A. Baldo, et al.; "Highly efficient phosphorescent emission from organic electroluminescent devices"; Letters to Nature, vol. 395; Sep. 1998; pp. 151-154.

Japanese Office Action issued in Application No. 2008-310220, dated Nov. 17, 2009.

Extended European Search Report issued for Application No. 09005627.6-1218/2112213, dated Feb. 22, 2010.

Office Action issued on May 24, 2011 in counterpart European Application No. 09005627.6.

(Continued)

*Primary Examiner* — Marie R. Yamnitzky
(74) *Attorney, Agent, or Firm* — Sughrue Mion, PLLC

(57) ABSTRACT

An organic electroluminescence device, includes: a pair of electrodes; and at least one organic layer including a light emitting layer, the light emitting layer being provided between the pair of electrodes, wherein at least one layer of the at least one organic layer contains a compound represented by formula (1) as defined in the specification.

Formula (1)

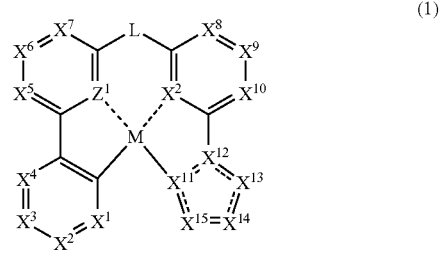

(1)

5 Claims, No Drawings

FOREIGN PATENT DOCUMENTS

| | | | |
|---|---|---|---|
| JP | 2005-310733 A | 11/2005 |
| JP | 2006-093542 A | 4/2006 |
| JP | 2006-120811 A | 5/2006 |
| JP | 2006-256999 A | 9/2006 |
| JP | 2006-261623 A | 9/2006 |
| JP | 2006-332620 A | 12/2006 |
| JP | 2007-019462 A | 1/2007 |
| JP | 2007-073845 A | 3/2007 |
| JP | 2007-519614 A | 7/2007 |
| JP | 2008-037848 A | 2/2008 |
| JP | 2008-103535 A | 5/2008 |
| JP | 2008-524848 A | 7/2008 |
| WO | 00-057676 A1 | 9/2000 |
| WO | 03-093283 A1 | 11/2003 |
| WO | 2004-039914 A1 | 5/2004 |
| WO | 2004/108857 A1 | 12/2004 |
| WO | 2005-042444 A2 | 5/2005 |
| WO | WO 2008/117889 A1 * | 10/2008 |

OTHER PUBLICATIONS

Notification of Reasons for Refusal dated Jul. 13, 2010, issued by the Japanese Patent Office in counterpart Japanese Patent Application No. 2010-007524.

Communication, dated Nov. 8, 2011, issued by the State Intellectual Property Office of P.R. China in corresponding Chinese Application No. 200910135125.4.

* cited by examiner

ORGANIC ELECTROLUMINESCENCE DEVICE, NOVEL PLATINUM COMPLEX COMPOUND AND NOVEL COMPOUND CAPABLE OF BEING A LIGAND THEREOF

BACKGROUND OF THE INVENTION

1. Field of the Invention

The present invention relates to an organic electroluminescence device (hereinafter also referred to as "device" or "organic EL device"). In particular, the invention relates to an organic electroluminescence device with excellent durability at a high brightness.

2. Description of the Related Art

In recent years, organic electroluminescence devices (organic EL devices) are being actively researched and developed because light emission with high brightness is obtained by low-voltage driving. In general, organic EL devices are configured of organic layers including a light emitting layer and a pair of electrodes interposing the foregoing layers therebetween and are one in which an electron injected from a cathode and a hole injected from an anode recombine with each other in the light emitting layer, and energy of a formed exciton is utilized.

In recent years, high efficiency of the device is being advanced by using a phosphorescent material. Iridium complexes, platinum complexes and so on are known as the phosphorescent light emitting material (see, for example, JP-A-2005-220136).

There is known a technique for enhancing the luminous efficiency and durability of an organic EL device by using a platinum complex having a tetradentate ligand (see, for example, WO 04/108857). Among such platinum complexes, complexes having a pyridylpyridine structure are able to shorten the emission wavelength relative to complexes having a phenylpyridine structure and are promising as a light-blue to blue light emitting material. However, there has not been reported a light emitting material with excellent durability.

Also, there are known a light emitting material having a pyridylpyridine structure and an organic EL device using the same (see JP-A-2006-261623). JP-A-2006-261623 discloses that an organic EL device having high emission brightness, high luminous efficiency and high durability is obtained.

SUMMARY OF THE INVENTION

However, devices capable of satisfying both high efficiency and durability especially in the use at the time of high brightness have not been developed yet. In the case of considering the development of an organic EL device for displays or lighting instruments, it is necessary to utilize it at a high brightness. Thus, it is desirable to develop a light emitting material which is excellent in durability at a high brightness.

An object of the invention is to provide an organic electroluminescence device with excellent durability in the use at a high brightness.

Also, another object of the invention is to provide a light emitting material capable of realizing excellent durability in the use at a high brightness.

In order to solve the foregoing problems, the present inventors made extensive investigations. As a result, the present inventors have found a metal complex in which a bond to platinum is formed at a carbon atom of a nitrogen-containing heterocyclic 6-membered ring and a bond to platinum is formed at a carbon atom or a nitrogen atom of a 5-membered ring having not more than two nitrogen atoms to be contained and further found that by adding this metal complex to an organic layer, the durability of an organic EL device is enhanced in the use at a high brightness as compared with known light emitting materials.

Furthermore, it has been found that by using a material having at least one deuterium atom in an organic layer, the durability is more enhanced.

That is, the foregoing problems have been able to be solved by the following means.

[1] An organic electroluminescence device, comprising:
a pair of electrodes; and
at least one organic layer including a light emitting layer, the light emitting layer being provided between the pair of electrodes,
wherein at least one layer of the at least one organic layer contains a compound represented by formula (1):

Formula (1)

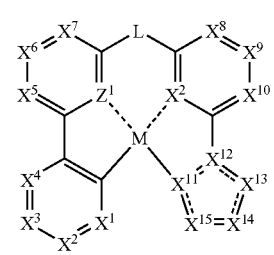

wherein each of $X^1$, $X^2$, $X^3$ and $X^4$ independently represents a carbon atom or a nitrogen atom;
one or more of $X^1$, $X^2$, $X^3$ and $X^4$ represent a nitrogen atom;
each of $X^5$, $X^6$, $X^7$, $X^8$, $X^9$ and $X^{10}$ independently represents a carbon atom or a nitrogen atom;
each of $X^{11}$ and $X^{12}$ independently represents a carbon atom or a nitrogen atom;
each of $X^{13}$, $X^{14}$ and $X^{15}$ independently represents a carbon atom, a nitrogen atom, an oxygen atom or a sulfur atom;
the number of the nitrogen atom contained in a 5-membered ring structure represented by $X^{11}$, $X^{12}$, $X^{13}$, $X^{14}$ and $X^{15}$ is not more than 2;
each of $Z^1$ and $Z^2$ independently represents a nitrogen atom or a phosphorus atom;
L represents a single bond or a divalent connecting group; and
M represents a divalent metal ion.

[2] The organic electroluminescence device as described in [1] above,
wherein the compound represented by formula (1) is a compound represented by formula (2):

Formula (2)

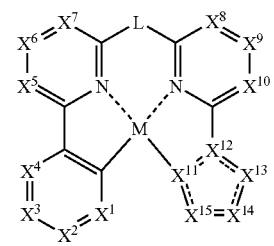

wherein each of $X^1$, $X^2$, $X^3$ and $X^4$ independently represents a carbon atom or a nitrogen atom;
one or more of $X^1$, $X^2$, $X^3$ and $X^4$ represent a nitrogen atom;
each of $X^5$, $X^6$, $X^7$, $X^8$, $X^9$ and $X^{10}$ independently represents a carbon atom or a nitrogen atom;

each of $X^{11}$ and $X^{12}$ independently represents a carbon atom or a nitrogen atom;

each of $X^{13}$, $X^{14}$ and $X^{15}$ independently represents a carbon atom, a nitrogen atom, an oxygen atom or a sulfur atom;

the number of the nitrogen atom contained in a 5-membered ring structure represented by $X^{11}$, $X^{12}$, $X^{13}$, $X^{14}$ and $X^{15}$ is not more than 2;

L represents a single bond or a divalent connecting group; and

M represents a divalent metal ion.

[3] The organic electroluminescence device as described in [2] above, wherein the compound represented by formula (2) is a compound represented by formula (3):

Formula (3)

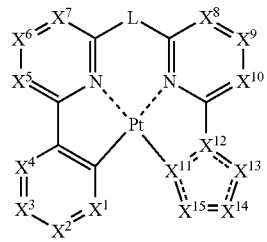

(3)

wherein each of $X^1$, $X^2$, $X^3$ and $X^4$ independently represents a carbon atom or a nitrogen atom;

one or more of $X^1$, $X^2$, $X^3$ and $X^4$ represent a nitrogen atom;

each of $X^5$, $X^6$, $X^7$, $X^8$, $X^9$ and $X^{10}$ independently represents a carbon atom or a nitrogen atom;

each of $X^{11}$ and $X^{12}$ independently represents a carbon atom or a nitrogen atom;

each of $X^{13}$, $X^{14}$ and $X^{15}$ independently represents a carbon atom, a nitrogen atom, an oxygen atom or a sulfur atom;

the number of the nitrogen atom contained in a 5-membered ring structure represented by $X^{11}$, $X^{12}$, $X^{13}$, $X^{14}$ and $X^{15}$ is not more than 2; and L represents a single bond or a divalent connecting group.

[4] The organic electroluminescence device as described in [3] above, wherein the compound represented by formula (3) is a compound represented by formula (4):

Formula (4)

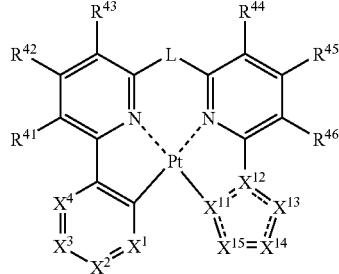

(4)

wherein each of $X^1$, $X^2$, $X^3$ and $X^4$ independently represents a carbon atom or a nitrogen atom;

one or more of $X^1$, $X^2$, $X^3$ and $X^4$ represent a nitrogen atom;

each of $R^{41}$, $R^{42}$, $R^{43}$, $R^{44}$, $R^{45}$ and $R^{46}$ independently represents a hydrogen atom or a substituent;

each of $X^{11}$ and $X^{12}$ independently represents a carbon atom or a nitrogen atom;

each of $X^{13}$, $X^{14}$ and $X^{15}$ independently represents a carbon atom, a nitrogen atom, an oxygen atom or a sulfur atom;

the number of the nitrogen atom contained in a 5-membered ring structure represented by $X^{11}$, $X^{12}$, $X^{13}$, $X^{14}$ and $X^{15}$ is not more than 2; and L represents a single bond or a divalent connecting group.

[5] The organic electroluminescence device as described in [4] above, wherein the compound represented by formula (4) is a compound represented by formula (4a-1):

Formula (4a-1)

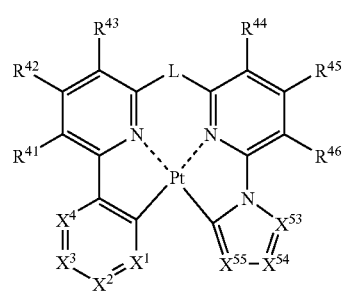

(4a-1)

wherein each of $X^1$, $X^2$, $X^3$ and $X^4$ independently represents a carbon atom or a nitrogen atom;

one or more of $X^1$, $X^2$, $X^3$ and $X^4$ represent a nitrogen atom;

each of $R^{41}$, $R^{42}$, $R^{43}$, $R^{44}$, $R^{45}$ and $R^{46}$ independently represents a hydrogen atom or a substituent;

each of $X^{53}$, $X^{54}$ and $X^{55}$ independently represents a carbon atom or a nitrogen atom;

the number of the nitrogen atom contained in a 5-membered ring structure containing $X^{53}$, $X^{54}$ and $X^{55}$ is 1 or 2; and L represents a single bond or a divalent connecting group.

[6] The organic electroluminescence device as described in [5] above, wherein the compound represented by formula (4a-1) is a compound represented by formula (4a-2):

Formula (4a-2)

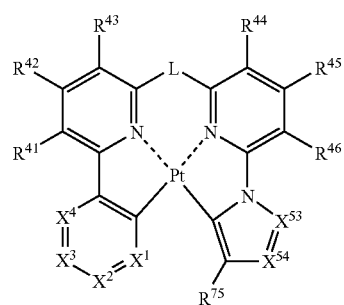

(4a-2)

wherein each of $X^1$, $X^2$, $X^3$ and $X^4$ independently represents a carbon atom or a nitrogen atom;

one or more of $X^1$, $X^2$, $X^3$ and $X^4$ represent a nitrogen atom;

each of $R^{41}$, $R^{42}$, $R^{43}$, $R^{44}$, $R^{45}$ and $R^{46}$ independently represents a hydrogen atom or a substituent;

each of $X^{53}$ and $X^{54}$ independently represents a carbon atom or a nitrogen atom;

the number of the nitrogen atom contained in a 5-membered ring structure containing $X^{53}$ and $X^{54}$ is 1 or 2;

$R^{75}$ represents a hydrogen atom or a substituent; and

L represents a single bond or a divalent connecting group.

[7] The organic electroluminescence device as described in [6] above, wherein the compound represented by formula (4a-2) is a compound represented by formula (4a-3):

Formula (4a-3)

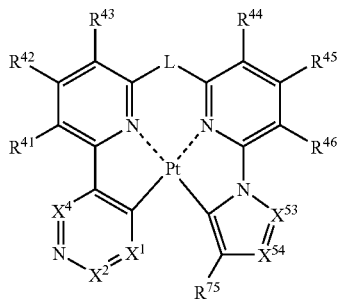

(4a-3)

wherein each of $X^1$, $X^2$ and $X^4$ independently represents a carbon atom or a nitrogen atom;

each of $R^{41}$, $R^{42}$, $R^{43}$, $R^{44}$, $R^{45}$ and $R^{46}$ independently represents a hydrogen atom or a substituent;

each of $X^{53}$ and $X^{54}$ independently represents a carbon atom or a nitrogen atom;

the number of the nitrogen atom contained in a 5-membered ring structure containing $X^{53}$ and $X^{54}$ is 1 or 2;

$R^{75}$ represents a hydrogen atom or a substituent; and

L represents a single bond or a divalent connecting group.

[8] The organic electroluminescence device as described in [4] above, wherein the compound represented by formula (4) is a compound represented by formula (4b-1):

Formula (4b-1)

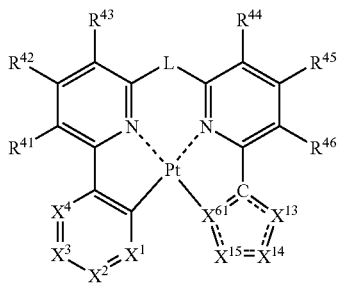

(4b-1)

wherein each of $X^1$, $X^2$, $X^3$ and $X^4$ independently represents a carbon atom or a nitrogen atom;

one or more of $X^1$, $X^2$, $X^3$ and $X^4$ represent a nitrogen atom;

each of $R^{41}$, $R^{42}$, $R^{43}$, $R^{44}$, $R^{45}$ and $R^{46}$ independently represents a hydrogen atom or a substituent;

$X^{61}$ represents a carbon atom or a nitrogen atom;

each of $X^{13}$, $X^{14}$ and $X^{15}$ independently represents a carbon atom, a nitrogen atom, an oxygen atom or a sulfur atom;

the number of the nitrogen atom contained in a 5-membered ring structure represented by $X^{61}$, the carbon atom, $X^{13}$, $X^{14}$ and $X^{15}$ is not more than 2; and L represents a single bond or a divalent connecting group.

[9] The organic electroluminescence device as described in [8] above, wherein the compound represented by formula (4b-1) is a compound represented by formula (4b-2):

Formula (4b-2)

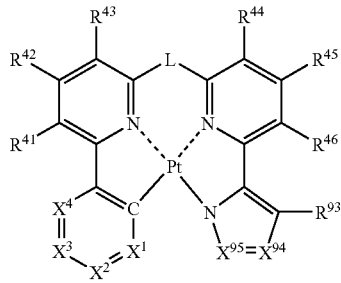

(4b-2)

wherein each of $X^1$, $X^2$, $X^3$ and $X^4$ independently represents a carbon atom or a nitrogen atom;

one or more of $X^1$, $X^2$, $X^3$ and $X^4$ represent a nitrogen atom;

each of $R^{41}$, $R^{42}$, $R^{43}$, $R^{44}$, $R^{45}$ and $R^{46}$ independently represents a hydrogen atom or a substituent;

each of $X^{94}$ and $X^{95}$ independently represents a carbon atom or a nitrogen atom;

at least one of $X^{94}$ and $X^{95}$ represents a carbon atom;

$R^{93}$ represents a hydrogen atom or a substituent; and

L represents a single bond or a divalent connecting group.

[10] The organic electroluminescence device as described in [9] above, wherein the compound represented by formula (4b-2) is a compound represented by formula (4b-3):

Formula (4b-3)

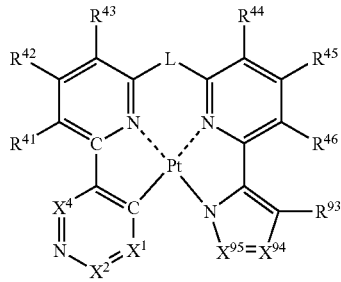

(4b-3)

wherein each of $X^1$, $X^2$ and $X^4$ independently represents a carbon atom or a nitrogen atom;

one or more of $X^1$, $X^2$ and $X^4$ represent a nitrogen atom;

each of $R^{41}$, $R^{42}$, $R^{43}$, $R^{44}$, $R^{45}$ and $R^{46}$ independently represents a hydrogen atom or a substituent;

each of $X^{94}$ and $X^{95}$ independently represents a carbon atom or a nitrogen atom;

at least one of $X^{94}$ and $X^{95}$ represents a carbon atom;

$R^{93}$ represents a hydrogen atom or a substituent; and

L represents a single bond or a divalent connecting group.

[11] The organic electroluminescence device as described in any one of [1] to [10] above, wherein the light emitting layer contains at least one member of the compounds represented by formulae (1) to (4), (4a-1) to (4a-3) and (4b-1) to (4b-3).

[12] The organic electroluminescence device as described in any one of [1] to [11] above, wherein at least one layer of the at least one organic layer contains a material having at least one deuterium atom.

[13] The organic electroluminescence device as described in [12] above, wherein the material having at least one deuterium atom is a material containing any one of a carbazole structure and an indole structure each having at least one deuterium atom.

[14] A compound represented by formula (4a-4):

Formula (4a-4)

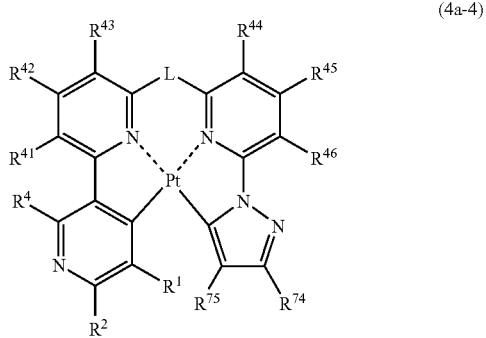

(4a-4)

wherein each of $R^1$, $R^2$, $R^4$, $R^{41}$, $R^{42}$, $R^{43}$, $R^{44}$, $R^{45}$, $R^{46}$, $R^{74}$ and $R^{75}$ independently represents a hydrogen atom or a substituent; and L represents a single bond or a divalent connecting group.

[15] A compound represented by the following formula (4a-4'):

Formula (4a-4')

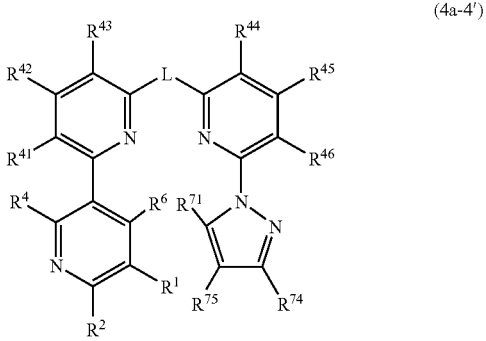

(4a-4')

wherein each of $R^1$, $R^2$, $R^4$, $R^6$, $R^{41}$, $R^{42}$, $R^{43}$, $R^{44}$, $R^{45}$, $R^{46}$, $R^{71}$, $R^{74}$ and $R^{75}$ independently represents a hydrogen atom or a substituent; and L represents a single bond or a divalent connecting group.

DETAILED DESCRIPTION OF THE INVENTION

Preferred embodiments of the organic EL device according to the invention are hereunder described.

In this specification, the substituent group B is defined as follows.

(Substituent Group B)

Examples of the substituent group B include an alkyl group (preferably an alkyl group having from 1 to 30 carbon atoms, more preferably an alkyl group having from 1 to 20 carbon atoms, and especially preferably an alkyl group having from 1 to 10 carbon atoms; for example, methyl, ethyl, isopropyl, tert-butyl, n-octyl, n-decyl, n-hexadecyl, cyclopropyl, cyclopentyl, cyclohexyl, etc.), an alkenyl group (preferably an alkenyl group having from 2 to 30 carbon atoms, more preferably an alkenyl group having from 2 to 20 carbon atoms, and especially preferably an alkenyl group having from 2 to 10 carbon atoms; for example, vinyl, allyl, 2-butenyl, 3-pentenyl, etc.), an alkynyl group (preferably an alkynyl group having from 2 to 30 carbon atoms, more preferably an alkynyl group having from 2 to 20 carbon atoms, and especially preferably an alkynyl group having from 2 to 10 carbon atoms; for example, propargyl, 3-pentynyl, etc.), an aryl group (preferably an aryl group having from 6 to 30 carbon atoms, more preferably an aryl group having from 6 to 20 carbon atoms, and especially preferably from 6 to 12 carbon atoms; for example, phenyl, p-methylphenyl, naphthyl, anthranyl, etc.), an amino group (preferably an amino group having from 0 to 30 carbon atoms, more preferably an amino group having from 0 to 20 carbon atoms, and especially preferably an amino group having from 0 to 10 carbon atoms; for example, amino, methylamino, dimethylamino, diethylamino, dibenzylamino, diphenylamino, ditolylamino, etc.); an alkoxy group (preferably an alkoxy group having from 1 to 30 carbon atoms, more preferably an alkoxy group having from 1 to 20 carbon atoms, and especially preferably an alkoxy group having from 1 to 10 carbon atoms; for example, methoxy, ethoxy, butoxy, 2-ethylhexyloxy, etc.), an aryloxy group (preferably an aryloxy group having from 6 to 30 carbon atoms, an aryloxy group having from 6 to 20 carbon atoms, and especially preferably an aryloxy group having from 6 to 12 carbon atoms; for example, phenoxy, 1-naphthoxy, 2-naphthoxy, etc.), a heterocyclic oxy group (preferably a heterocyclic oxy group having from 1 to 30 carbon atoms, more preferably a heterocyclic oxy group having from 1 to 20 carbon atoms, and especially preferably a heterocyclic oxy group having from 1 to 12 carbon atoms; for example, pyridyloxy, pyrazyloxy, pyrimidyloxy, quinolyloxy, etc.), an acyl group (preferably an acyl group having from 1 to 30 carbon atoms, more preferably an acyl group having from 1 to 20 carbon atoms, and especially preferably an acyl group having from 1 to 12 carbon atoms; for example, acetyl, benzoyl, formyl, pivaloyl, etc.), an alkoxycarbonyl group (preferably an alkoxycarbonyl group having from 2 to 30 carbon atoms, more preferably an alkoxycarbonyl group having from 2 to 20 carbon atoms, and especially preferably an alkoxycarbonyl group having from 2 to 12 carbon atoms; for example, methoxycarbonyl, ethoxycarbonyl, etc.), an aryloxycarbonyl group (preferably an aryloxycarbonyl group having from 7 to 30 carbon atoms, more preferably an aryloxycarbonyl group having from 7 to 20 carbon atoms, and especially preferably an aryloxycarbonyl group having from 7 to 12 carbon atoms; for example, phenyloxycarbonyl, etc.), an acyloxy group (preferably an acyloxy group having from 2 to 30 carbon atoms, more preferably an acyloxy group having from 2 to 20 carbon atoms, and especially preferably an acyloxy group having from 2 to 10 carbon atoms; for example, acetoxy, benzoyloxy, etc.), an acylamino group (preferably an acylamino group having from 2 to 30 carbon atoms, more preferably an acylamino group having from 2 to 20 carbon atoms, and especially preferably an acylamino group having from 2 to 10 carbon atoms; for example, acetylamino, benzoylamino, etc.), an alkoxycarbonylamino group (preferably an alkoxycarbonylamino group having from 2 to 30 carbon atoms, more preferably an alkoxycarbonylamino group having from 2 to 20 carbon atoms, and especially preferably an alkoxycarbonylamino group having from 2 to 12 carbon atoms; for example, methoxycarbonylamino, etc.), an aryloxycarbonylamino group (preferably an aryloxycarbonylamino group having from 7 to 30 carbon atoms, more preferably an aryloxycarbonylamino group having from 7 to 20 carbon atoms, and especially preferably an aryloxycarbonylamino group having from 7 to 12 carbon atoms; for example, phenyloxycarbonylamino, etc.),
a sulfonylamino group (preferably a sulfonylamino group having from 1 to 30 carbon atoms, more preferably a sulfonylamino group having from 1 to 20 carbon atoms, and especially preferably a sulfonylamino group having from 1 to 12 carbon atoms; for example, methanesulfonylamino, benzenesulfonylamino, etc.), a sulfamoyl group (preferably a sulfamoyl group having from 0 to 30 carbon atoms, more preferably a sulfamoyl group having from 0 to 20 carbon atoms, and especially preferably a sulfamoyl group having from 0 to 12 carbon atoms; for example, sulfamoyl, methylsulfamoyl, dimethylsulfamoyl, phenylsulfamoyl, etc.), a carbamoyl group (preferably a carbamoyl group having from 1 to 30 carbon atoms, more preferably a carbamoyl group having from 1 to 20 carbon atoms, and especially preferably a carbamoyl group having from 1 to 12 carbon atoms; for example, carbamoyl, methylcarbamoyl, diethylcarbamoyl, phenylcarbamoyl, etc.), an alkylthio group (preferably an alkylthio group having from 1 to 30 carbon atoms, more preferably an alkylthio group having from 1 to 20 carbon atoms, and especially preferably an alkylthio group having from 1 to 12 carbon atoms; for example, methylthio, ethylthio, etc.), an arylthio group (preferably an arylthio group having from 6 to 30 carbon atoms, more preferably an arylthio group having from 6 to 20 carbon atoms, and especially preferably an arylthio group having from 6 to 12 carbon atoms; for example, phenylthio, etc.), a heterocyclic thio group (preferably a heterocyclic thio group having from 1 to 30 carbon atoms, more preferably a heterocyclic thio group having from 1 to 20 carbon atoms, and especially preferably a heterocyclic thio group having from 1 to 12 carbon atoms; for example, pyridylthio, 2-benzimizolylthio, 2-benzoxazoylthio, 2-benzthiazoylthio, etc.), a sulfonyl group (preferably a sulfonyl group having from 1 to 30 carbon atoms, more preferably a sulfonyl group having from 1 to 20 carbon atoms, and especially preferably a sulfonyl group having from 1 to 12 carbon atoms; for example, mesyl, tosyl, etc.),
a sulfinyl group (preferably a sulfinyl group having from 1 to 30 carbon atoms, more preferably a sulfinyl group having from 1 to 20 carbon atoms, and especially preferably a sulfinyl group having from 1 to 12 carbon atoms; for example, methanesulfinyl, benzenesulfinyl, etc.), a ureido group (preferably a ureido group having from 1 to 30 carbon atoms, more preferably a ureido group having from 1 to 20 carbon atoms, and especially preferably a ureido group having from 1 to 12 carbon atoms; for example, ureido, methylureido, phenylureido, etc.), a phosphoric acid amide group (preferably a phosphoric acid amide group having from 1 to 30 carbon atoms, more preferably a phosphoric acid amide group having from 1 to 20 carbon atoms, and especially preferably a phosphoric acid amide group having from 1 to 12 carbon atoms; for example, diethylphosphoric acid amide, phenylphosphoric acid amide, etc.), a hydroxyl group, a mercapto group, a halogen atom (for example, a fluorine atom, a chlorine atom, a bromine atom, an iodine atom), a cyano group, a sulfo group, a carboxyl group, a nitro group, a hydroxamic acid group, a sulfino group, a hydrazino group, an imino group, a heterocyclic (heteroaryl) group (preferably a heterocyclic group having from 1 to 30 carbon atoms, and more preferably a heterocyclic group having from 1 to 12 carbon atoms; examples of the hetero atom include a nitrogen atom, an oxygen atom and a sulfur atom; and specific examples of the heterocyclic group include imidazolyl, pyridyl, quinolyl, furyl, thienyl, piperidyl, morpholino, benzoxazolyl, benzimidazolyl, benzthiazolyl, carbazolyl and azepinyl), a silyl group (preferably a silyl group having from 3 to 40 carbon atoms, more preferably a silyl group having from 3 to 30 carbon atoms, and especially preferably a silyl group having from 3 to 24 carbon atoms; for example, trimethylsilyl, triphenylsilyl, etc.) and a silyloxy group (preferably a silyloxy group having from 3 to 40 carbon atoms, more preferably a silyloxy group having from 3 to 30 carbon atoms, and especially preferably a silyloxy group having from 3 to 24 carbon atoms; for example, trimethylsilyloxy, triphenylsilyloxy, etc.). These substituents may be further substituted. As the further substituent, the groups selected among those in the foregoing substituent group B can be exemplified.

The organic EL device according to the invention is one comprising a pair of electrodes having therebetween organic layers including at least a light emitting layer. In addition to the light emitting layer, the organic layers may include, as the organic layer, a hole injection layer, a hole transport layer, an electron injection layer, an electron transport layer, a hole blocking layer, an electron blocking layer, an exciton blocking layer, etc. Each of the layers may also work as other function. Also, each of the layers may be divided into plural secondary layers.

As an embodiment of lamination of the organic layers, one in which the hole transport layer, the light emitting layer and the electron transport layer are laminated from the anode side is preferable. Furthermore, a charge blocking layer or the like may be provided between the hole transport layer and the light emitting layer, and/or between the light emitting layer and the electron transport layer. The hole injection layer may be provided between the anode and the hole transport layer; and the electron injection layer may be provided between the cathode and the electron transport layer.

At least any one of the organic layers contains a metal complex with a specified structure, which is represented by any one of the foregoing formulae (1) to (4), (4a-1) to (4a-4) and (4b-1) to (4b-3) (the metal complex will be hereinafter generically referred to as "metal complex with a specified structure").

The metal complex with a specified structure is not limited as to its function but can be utilized as a light emitting material, a host material, an exciton blocking material, a charge blocking material or a charge transport material. Above all, the case of utilizing the metal complex with a specified structure as a light emitting material, a host material or a charge transport material is more preferable; the case of utilizing the metal complex with a specified structure as a light emitting material or a host material is further preferable; and the case of utilizing the metal complex with a specified structure as a light emitting material is the most preferable.

Also, the metal complex with a specified structure can be contained in any of the foregoing organic layers. The metal complex with a specified structure is preferably contained in the light emitting layer, more preferably contained as a light emitting material or a host material in the light emitting layer, further preferably contained as a light emitting material in the light emitting layer, and especially preferably contained together with at least one kind of host material in the light emitting layer.

In the case where the metal complex with a specified structure is contained as a light emitting material in the light emitting layer, its content is preferably in the range of 0.1% by mass or more and not more than 60% by mass, more preferably in the range of 0.2% by mass or more and not more than 50% by mass, further preferably in the range of 0.3% by mass or more and not more than 40% by mass, and most preferably in the range of 0.5% by mass or more and not more than 30% by mass relative to the total mass of the light emitting layer. (In this specification, mass ratio is equal to weight ratio.)

Also, in the case where the metal complex with a specified structure is used jointly with other light emitting material, the content of the metal complex with a specified structure is preferably in the range of 0.1% by mass or more and not more than 60% by mass, more preferably in the range of 0.2% by mass or more and not more than 50% by mass, further preferably in the range of 0.3% by mass or more and not more than 40% by mass, and most preferably in the range of 0.5% by mass or more and not more than 35% by mass relative to the mass of the whole of the light emitting materials.

In the case where the metal complex with a specified structure is used in other layer (for example, a charge transport layer, etc.) than the light emitting layer, the metal complex with a specified structure is contained preferably in an amount of from 10% by mass to 100% by mass, and more preferably in an amount of from 30% by mass to 100% by mass in the subject layer.

The metal complex with a specified structure is hereunder described.

In the formulae (1) to (4), (4a-1) to (4a-4), (4b-1) to (4b-3) and (4a-4'), the hydrogen atom also includes isotopes (for example, deuterium, etc.); and the atoms constituting the substituents also include isotopes thereof.

Also, in the foregoing formulae, the coordinate bond is a bond formed when a lone pair of a neutral atom is coordinated on a metal and is expressed by a dotted line in this specification. Also, the covalent bond is a bond formed when a monovalent anion is coordinated on a metal and is expressed by a solid line in this specification.

The metal complex represented by the formula (1) is described.

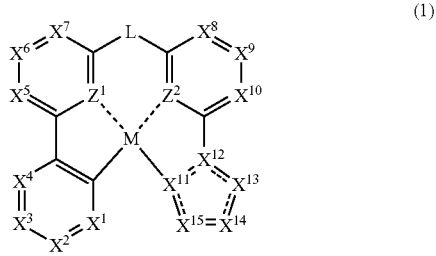

(1)

In the formula, each of $X^1$, $X^2$, $X^3$ and $X^4$ independently represents a carbon atom or a nitrogen atom; one or more of $X^1$, $X^2$, $X^3$ and $X^4$ represent a nitrogen atom; each of $X^5$, $X^6$, $X^7$, $X^8$, $X^9$ and $X^{10}$ independently represents a carbon atom or a nitrogen atom; each of $X^{11}$ and $X^{12}$ independently represents a carbon atom or a nitrogen atom; each of $X^{13}$, $X^{14}$ and $X^{15}$ independently represents a carbon atom, a nitrogen atom, an oxygen atom or a sulfur atom; the number of the nitrogen atom contained in a 5-membered ring structure represented by $X^{11}$, $X^{12}$, $X^{13}$, $X^{14}$ and $X^{15}$ is not more than 2; each of $Z^1$ and $Z^2$ independently represents a nitrogen atom or a phosphorus atom; L represents a single bond or a divalent connecting group; and M represents a divalent metal ion.

Each of $X^1$, $X^2$, $X^3$ and $X^4$ independently represents a carbon atom or a nitrogen atom. In the case where each of $X^1$, $X^2$, $X^3$ and $X^4$ can be further substituted, each of $X^1$, $X^2$, $X^3$ and $X^4$ may independently have a substituent. In the case where each of $X^1$, $X^2$, $X^3$ and $X^4$ has a substituent, examples of the substituent include those represented by the foregoing substituent group B. As the substituent, an alkyl group, a perfluoroalkyl group, an aryl group, an aromatic heterocyclic group, a dialkylamino group, a diarylamino group, an alkyloxy group, a cyano group and a halogen atom are preferable; an alkyl group, a perfluoroalkyl group, an aryl group, a dialkylamino group, a cyano group and a fluorine atom are more preferable; and an alkyl group, a trifluoromethyl group and a fluorine atom are further preferable. Also, if possible, the substituents may be connected to each other to form a condensed ring structure.

Any one or more of $X^1$, $X^2$, $X^3$ and $X^4$ represent a nitrogen atom. The number of the nitrogen atom is preferably from 1 to 2, and more preferably 1.

The nitrogen atom may be located at any of $X^1$, $X^2$, $X^3$ and $X^4$. It is preferable that $X^2$ or $X^3$ is a nitrogen atom; and it is more preferable that $X^3$ is a nitrogen atom.

In the formula (1), examples of the 6-membered ring formed from two carbon atoms, $X^1$, $X^2$, $X^3$ and $X^4$ include a pyridine ring, a pyrazine ring, a pyrimidine ring, a pyridazine ring and a triazine ring. Of these, a pyridine ring, a pyrazine ring, a pyrimidine ring and a pyridazine ring are more preferable; and a pyridine ring is especially preferable. When the 6-membered ring formed from $X^1$, $X^2$, $X^3$ and $X^4$ is a pyridine ring, a pyrazine ring, a pyrimidine ring or a pyridazine ring (especially preferably a pyridine ring), the acidity of a hydrogen atom present at the position at which a metal-carbon bond is formed is enhanced as compared with a benzene ring, and a metal complex is more easily formed. Thus, such is advantageous.

Each of $X^5$, $X^6$, $X^7$, $X^8$, $X^9$ and $X^{10}$ independently represents a carbon atom or a nitrogen atom. Each of $X^5$, $X^6$, $X^7$, $X^8$, $X^9$ and $X^{10}$ is preferably a carbon atom.

In the case where each of $X^5$, $X^6$, $X^7$, $X^8$, $X^9$ and $X^{10}$ can be further substituted, each of $X^5$, $X^6$, $X^7$, $X^8$, $X^9$ and $X^{10}$ may independently have a substituent. In the case where each of $X^5$, $X^6$, $X^7$, $X^8$, $X^9$ and $X^{10}$ has a substituent, examples of the substituent include those represented by the foregoing substituent group B. As the substituent, an alkyl group, a perfluoroalkyl group, an aryl group, an aromatic heterocyclic group, a dialkylamino group, a diarylamino group, an alkyloxy group, a cyano group and a halogen atom are preferable; an alkyl group, a perfluoroalkyl group, an aryl group, a dialkylamino group, a cyano group and a fluorine atom are more preferable; and an alkyl group, a dialkylamino group, a trifluoromethyl group and a fluorine atom are further preferable. Also, if possible, the substituents may be connected to each other to form a condensed ring structure.

Each of $X^{11}$ and $X^{12}$ independently represents a carbon atom or a nitrogen atom. It is preferable that either one of $X^{11}$ or $X^{12}$ is a carbon atom, with the other being a nitrogen atom.

Each of $X^{13}$, $X^{14}$ and $X^{15}$ independently represents a carbon atom, a nitrogen atom, an oxygen atom or a sulfur atom, and preferably a carbon atom or a nitrogen atom.

The number of the nitrogen atom contained in a 5-membered ring structure represented by $X^{11}$, $X^{12}$, $X^{13}$, $X^{14}$ and $X^{15}$ is not more than 2 (0, 1 or 2), preferably 1 or 2, and more preferably 2.

In the case where each of $X^{11}$, $X^{12}$, $X^{13}$, $X^{14}$ and $X^{15}$ can be further substituted, each of $X^{11}$, $X^{12}$, $X^{13}$, $X^{14}$ and $X^{15}$ may independently have a substituent. In the case where each of $X^{11}$, $X^{12}$, $X^{13}$, $X^{14}$ and $X^{15}$ has a substituent, examples of the substituent include those represented by the foregoing substituent group B. As the substituent, an alkyl group, a perfluoroalkyl group, an aryl group, an aromatic heterocyclic group, a dialkylamino group, a diarylamino group, an alkyloxy group, a cyano group and a halogen atom are preferable; an alkyl group, a perfluoroalkyl group, an aryl group, a dialkylamino group, a cyano group and a fluorine atom are more preferable; and an alkyl group, a cyano group, a trifluoromethyl group and a fluorine atom are further preferable. Also, if possible, the substituents may be connected to each other to form a condensed ring structure.

The bond in the 5-membered ring structure represented by $X^{11}$, $X^{12}$, $X^{13}$, $X^{14}$ and $X^{15}$ may be any combination of a single bond and a double bond. Examples of the 5-membered ring formed from $X^{11}$, $X^{12}$, $X^{13}$, $X^{14}$ and $X^{15}$ include a pyrrole ring, a pyrazole ring, an imidazole ring, a furan ring and a thiophene ring. Of these, a pyrrole ring, a pyrazole ring and an imidazole ring are more preferable; and a pyrrole ring and a pyrazole ring are further preferable. When the 5-membered ring formed from $X^{11}$, $X^{12}$, $X^{13}$, $X^{14}$ and $X^{15}$ is a pyrrole ring, a pyrazole ring or an imidazole ring (further preferably a pyrrole ring or a pyrazole ring), the stability of the metal complex is enhanced, and thus, such is advantageous.

Each of $Z^1$ and $Z^2$ independently represents a nitrogen atom or a phosphorus atom, and preferably a nitrogen atom. In the formula (1), examples of each of the 6-membered ring formed from $Z^1$, a carbon atom, $X^5$, $X^6$, $X^7$ and a carbon atom and the 6-membered ring formed from $Z^2$, a carbon atom, $X^8$, $X^9$, $X^{10}$ and a carbon atom include a phosphinine ring, a pyridine ring, a pyrazine ring, a pyrimidine ring, a pyridazine group and a triazine ring. Of these, a pyridine ring, a pyrazine ring, a pyrimidine ring and a pyridazine ring are more preferable; and a pyridine ring is especially preferable. When such a 6-membered ring is a pyridine ring, a pyrazine ring, a pyrimidine ring or a pyridazine ring (especially preferably a pyridine ring), a coordinate bond which is stable against metals is formed, and the stability of the metal complex is enhanced. Above all, in the pyridine ring, the coordinating portion on the metal is a single nitrogen atom. Therefore, as compared with a pyrazine ring or a pyrimidine ring each having plural nitrogen atoms in the molecule thereof, the pyridine ring is advantageous because side reactions during the synthesis of a metal complex can be suppressed, and a metal complex can be manufactured at a high yield.

L represents a single bond or a divalent connecting group. Examples of the divalent connecting group represented by L include an alkylene group (for example, methylene, ethylene, propylene, etc.), an arylene group (for example, phenylene, naphthalenediyl, etc.), a heteroarylene group (for example, pyridinediyl, thiophenediyl, etc.), an imino group (—NR—) (for example, a phenylimino group, etc.), an oxy group (—O—), a thio group (—S—), a phosphinidene group (—PR—) (for example, a phenylphosphinidene group, etc.), a silylene group (—SiRR'—) (for example, a dimethylsilylene group, a dipehnylsilylene group, etc.) and combinations thereof. Such a connecting group may further have a substituent. In the case where such a connecting group has a substituent, examples of the substituent include those represented by the foregoing substituent group B.

L is preferably a single bond, an alkylene group, an arylene group, a heteroarylene group, an imino group, an oxy group, a thio group or a silylene group; more preferably a single bond, an alkylene group, an arylene group or an imino group; further preferably a single bond, an alkylene group or an arylene group; still further preferably a single bond, a methylene group or a phenylene group; even further preferably a single bond or a di-substituted methylene group; still even further preferably a single bond, a dimethylmethylene group, a diethylmethylene group, a diisobutylmethylene group, a dibenzylmethylene group, an ethylmethylmethylene group, a methylpropylmethylene group, an isobutylmethylmethylene group, a diphenylmethylene group, a methylphenylmethylene group, a cyclohexanediyl group, a cyclopentanediyl group, a fluorenediyl group or a fluoromethylmethylene group; especially preferably a single bond, a dimethylmethylene group, a diphenylmethylene group or a cyclohexanediyl group; and most preferably a dimethylmethylene group or a diphenylmethylene group.

Specific examples of the divalent connecting group will be given below, but it should not be construed that the invention is limited thereto.

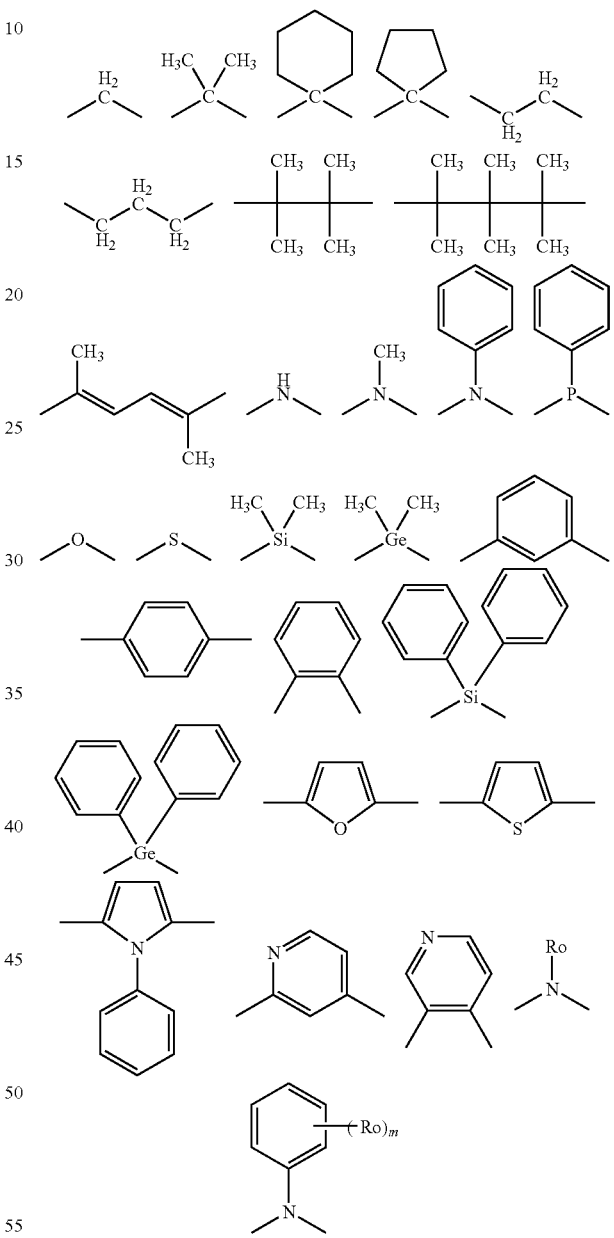

In the foregoing, Ro represents a substituent selected from those in the foregoing substituent group B. Ro is preferably an alkyl group, and more preferably an alkyl group having from 1 to 6 carbon atoms. m represents an integer of from 1 to 5. m is preferably from 2 to 5, and more preferably from 2 to 3.

M represents a divalent metal ion. Examples of the metal species include a zinc ion, a copper ion, a nickel ion, a palladium ion and a platinum ion. Of these, a copper ion, a palladium ion and a platinum ion are more preferable; a palladium ion and a platinum ion are further preferable; and a platinum ion is especially preferable.

The metal complex represented by the formula (1) is preferably a metal complex represented by the formula (2).

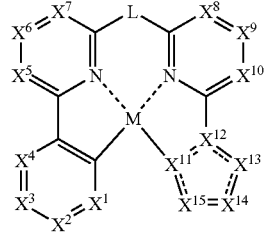

(2)

In the formula, each of $X^1$, $X^2$, $X^3$ and $X^4$ independently represents a carbon atom or a nitrogen atom; one or more of $X^1$, $X^2$, $X^3$ and $X^4$ represent a nitrogen atom; each of $X^5$, $X^6$, $X^7$, $X^8$, $X^9$ and $X^{10}$ independently represents a carbon atom or a nitrogen atom; each of $X^{11}$ and $X^{12}$ independently represents a carbon atom or a nitrogen atom; each of $X^{13}$, $X^{14}$ and $X^{15}$ independently represents a carbon atom, a nitrogen atom, an oxygen atom or a sulfur atom; the number of the nitrogen atom contained in a 5-membered ring structure represented by $X^{11}$, $X^{12}$, $X^{13}$, $X^{14}$ and $X^{15}$ is not more than 2; L represents a single bond or a divalent connecting group; and M represents a divalent metal ion.

In the formula (2), $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$, L and M are synonymous with $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$, L and M in the formula (1), and preferred ranges thereof are also the same.

The metal complex represented by the formula (2) is preferably a platinum complex represented by the formula (3).

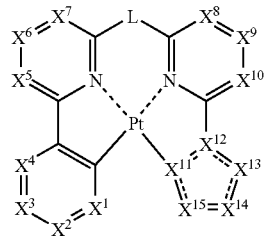

(3)

In the formula, each of $X^1$, $X^2$, $X^3$ and $X^4$ independently represents a carbon atom or a nitrogen atom; one or more of $X^1$, $X^2$, $X^3$ and $X^4$ represent a nitrogen atom; each of $X^5$, $X^6$, $X^7$, $X^8$, $X^9$ and $X^{10}$ independently represents a carbon atom or a nitrogen atom; each of $X^{11}$ and $X^{12}$ independently represents a carbon atom or a nitrogen atom; each of $X^{13}$, $X^{14}$ and $X^{15}$ independently represents a carbon atom, a nitrogen atom, an oxygen atom or a sulfur atom; the number of the nitrogen atom contained in a 5-membered ring structure represented by $X^{11}$, $X^{12}$, $X^{13}$, $X^{14}$ and $X^{15}$ is not more than 2; and L represents a single bond or a divalent connecting group.

In the formula (3), $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$ and L are synonymous with $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$ and L in the formula (2), and preferred ranges thereof are also the same.

The platinum complex represented by the formula (3) is preferably a platinum complex represented by the formula (4).

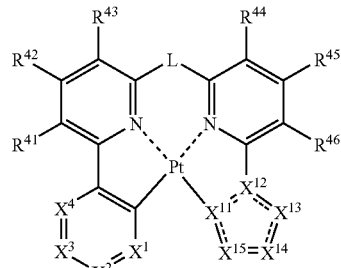

(4)

In the formula, each of $X^1$, $X^2$, $X^3$ and $X^4$ independently represents a carbon atom or a nitrogen atom; one or more of $X^1$, $X^2$, $X^3$ and $X^4$ represent a nitrogen atom; each of $R^{41}$, $R^{42}$, $R^{43}$, $R^{44}$, $R^{45}$ and $R^{46}$ independently represents a hydrogen atom or a substituent; each of $X^{11}$ and $X^{12}$ independently represents a carbon atom or a nitrogen atom; each of $X^{13}$, $X^{14}$ and $X^{15}$ independently represents a carbon atom, a nitrogen atom, an oxygen atom or a sulfur atom; the number of the nitrogen atom contained in a 5-membered ring structure represented by $X^{11}$, $X^{12}$, $X^{13}$, $X^{14}$ and $X^{15}$ is not more than 2; and L represents a single bond or a divalent connecting group.

In the formula (4), $X^1$, $X^2$, $X^3$, $X^4$, $X^{11}$, $X^{12}$, $X^{13}$, $X^{14}$, $X^{15}$ and L are synonymous with $X^1$, $X^2$, $X^3$, $X^4$, $X^{11}$, $X^{12}$, $X^{13}$, $X^{14}$, $X^{15}$ and L in the formula (2), and preferred ranges thereof are also the same.

In the formula (4), each of $R^{41}$, $R^{42}$, $R^{43}$, $R^{44}$, $R^{45}$ and $R^{46}$ independently represents a hydrogen atom or a substituent. The substituent represented by $R^{41}$, $R^{42}$, $R^{43}$, $R^{44}$, $R^{45}$ and $R^{46}$ is synonymous with the substituent group B. If possible, $R^{41}$, $R^{42}$, $R^{43}$, $R^{44}$, $R^{45}$ and $R^{46}$ may be bonded to each other to form a ring.

$R^{41}$ and $R^{46}$ are preferably a hydrogen atom, an alkyl group, an aryl group, an amino group, an alkoxy group, an aryloxy group, an acyl group, an alkoxycarbonyl group, an alkylthio group, a sulfonyl group, a hydroxyl group, a halogen atom, a cyano group, a nitro group or a heterocyclic group; more preferably a hydrogen atom, an alkyl group, an aryl group, a halogen atom, a cyano group or a heterocyclic group; further preferably a hydrogen atom, a methyl group, a t-butyl group, a trifluoromethyl group, a phenyl group, a fluorine atom, a cyano group or a pyridyl group; still further preferably a hydrogen atom, a methyl group or a fluorine atom; and especially preferably a hydrogen atom.

Preferred ranges of $R^{43}$ and $R^{44}$ are preferably synonymous with those of $R^{41}$ and $R^{46}$.

$R^{42}$ and $R^{45}$ are preferably a hydrogen atom, an alkyl group, an aryl group, an amino group, an alkoxy group, an aryloxy group, an alkylthio group, an arylthio group, a halogen atom, a cyano group or a heterocyclic group; more preferably a hydrogen atom, an alkyl group, an aryl group, an amino group, an alkoxy group, an arylthio group, a halogen atom or a heterocyclic group; further preferably a hydrogen atom, an alkyl group, an amino group, an alkoxy group, a halogen atom or a heterocyclic group; still further preferably a hydrogen atom, a methyl group, a t-butyl group, a dialkylamino group, a diphenylamino group, a methoxy group, a phenoxy group, a fluorine atom, an imidazolyl group, a pyrrolyl group or a carbazolyl group; especially preferably a hydrogen atom, a fluorine atom or a methyl group; and most preferably a hydrogen atom.

One of preferred embodiments of the platinum complex represented by the formula (4) is a platinum complex represented by the formula (4a-1).

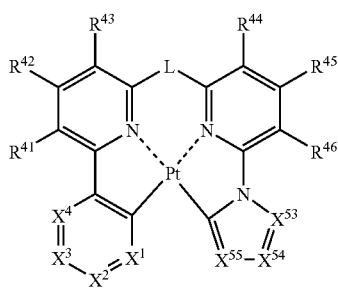

(4a-1)

In the formula, each of $X^1$, $X^2$, $X^3$ and $X^4$ independently represents a carbon atom or a nitrogen atom; one or more of $X^1$, $X^2$, $X^3$ and $X^4$ represent a nitrogen atom; each of $R^{41}$, $R^{42}$, $R^{43}$, $R^{44}$, $R^{45}$ and $R^{46}$ independently represents a hydrogen atom or a substituent; each of $X^{53}$, $X^{54}$ and $X^{55}$ independently represents a carbon atom or a nitrogen atom; the number of the nitrogen atom contained in a 5-membered ring structure containing $X^{53}$, $X^{54}$ and $X^{55}$ is 1 or 2; and L represents a single bond or a divalent connecting group.

In the formula (4a-1), $X^1$, $X^2$, $X^3$, $X^4$, $R^{41}$, $R^{42}$, $R^{43}$, $R^{44}$, $R^{45}$, $R^{46}$ and L are synonymous with $X^1$, $X^2$, $X^3$, $X^4$, $R^{41}$, $R^{42}$, $R^{43}$, $R^{44}$, $R^{45}$, $R^{46}$ and L in the formula (4), and preferred ranges thereof are also the same.

Each of $X^{53}$, $X^{54}$ and $X^{55}$ independently represents a carbon atom or a nitrogen atom. In the case where each of $X^{53}$, $X^{54}$ and $X^{55}$ can be further substituted, each of $X^{53}$, $X^{54}$ and $X^{55}$ may independently have a substituent. In the case where each of $X^{53}$, $X^{54}$ and $X^{55}$ has a substituent, examples of the substituent include those represented by the foregoing substituent group B. As the substituent, an alkyl group, a perfluoroalkyl group, an aryl group, an aromatic heterocyclic group, a dialkylamino group, a diarylamino group, an alkyloxy group, a cyano group and a halogen atom are preferable; an alkyl group, a perfluoroalkyl group, an aryl group, a dialkylamino group, a cyano group and a fluorine atom are more preferable; and an alkyl group, a trifluoromethyl group and a fluorine atom are further preferable. Also, if possible, the substituents may be connected to each other to form a condensed ring structure.

In the formula (4a-1), the number of the nitrogen atom contained in the 5-membered ring structure formed from a carbon atom, a nitrogen atom, $X^{53}$, $X^{54}$ and $X^{55}$ is 1 or 2, and preferably 2.

Examples of the 5-membered ring structure formed from a carbon atom, a nitrogen atom, $X^{53}$, $X^{54}$ and $X^{55}$ include a pyrrole ring, a pyrazole ring and an imidazole ring. Of these, a pyrrole ring and a pyrazole ring are more preferable; and a pyrazole ring is the most preferable.

The platinum complex represented by the formula (4a-1) is preferably a platinum complex represented by the formula (4a-2).

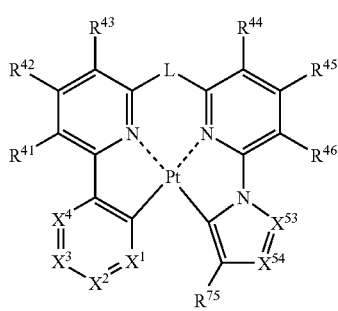

(4a-2)

In the formula, each of $X^1$, $X^2$, $X^3$ and $X^4$ independently represents a carbon atom or a nitrogen atom; one or more of $X^1$, $X^2$, $X^3$ and $X^4$ represent a nitrogen atom; each of $R^{41}$, $R^{42}$, $R^{43}$, $R^{44}$, $R^{45}$ and $R^{46}$ independently represents a hydrogen atom or a substituent; each of $R^{53}$ and $R^{54}$ independently represents a carbon atom or a nitrogen atom; the number of the nitrogen atom contained in a 5-membered ring structure containing $R^{53}$ and $R^{54}$ is 1 or 2; $R^{75}$ represents a hydrogen atom or a substituent; and L represents a single bond or a divalent connecting group.

In the formula (4a-2), $X^1$, $X^2$, $X^3$, $X^4$, $X^{53}$, $X^{54}$, $R^{41}$, $R^{42}$, $R^{43}$, $R^{44}$, $R^{45}$, $R^{46}$ and L are synonymous with $X^1$, $X^2$, $X^3$, $X^4$, $X^{53}$, $X^{54}$, $R^{41}$, $R^{42}$, $R^{43}$, $R^{44}$, $R^{45}$, $R^{46}$ and L in the formula (4a-1), and preferred ranges thereof are also the same.

$R^{75}$ represents a hydrogen atom or a substituent. Examples of the substituent include those in the foregoing substituent group B. $R^{75}$ is preferably a hydrogen atom, an alkyl group, a perfluoroalkyl group, an aryl group, an aromatic heterocyclic group, a dialkylamino group, a diarylamino group, an alkyloxy group, a cyano group or a halogen atom; more preferably a hydrogen atom, an alkyl group, a perfluoroalkyl group, an aryl group, a dialkylamino group, a cyano group or a fluorine atom; further preferably a hydrogen atom, an alkyl group, a trifluoromethyl group, a cyano group or a fluorine atom; and most preferably a cyano group, a fluorine atom or a hydrogen atom. Also, if possible, $R^{75}$ may be connected to the substituent of $X^{54}$ or $X^{53}$ to form a condensed ring structure.

The platinum complex represented by the formula (4a-2) is preferably a platinum complex represented by the formula (4a-3).

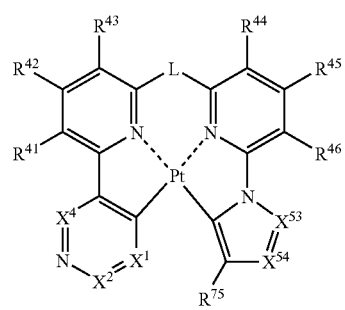

(4a-3)

In the formula, each of $X^1$, $X^2$ and $X^4$ independently represents a carbon atom or a nitrogen atom; each of $R^{41}$, $R^{42}$, $R^{43}$, $R^{44}$, $R^{45}$ and $R^{46}$ independently represents a hydrogen atom or a substituent; each of $X^{53}$ and $X^{54}$ independently represents a carbon atom or a nitrogen atom; the number of the nitrogen atom contained in a 5-membered ring structure containing $X^{53}$ and $X^{54}$ is 1 or 2; $R^{75}$ represents a hydrogen atom or a substituent; and L represents a single bond or a divalent connecting group.

In the formula (4a-3), $X^1$, $X^2$, $X^4$, $X^{53}$, $X^{54}$, $R^{41}$, $R^{42}$, $R^{43}$, $R^{44}$, $R^{45}$, $R^{46}$, $R^{75}$ and L are synonymous with $X^1$, $X^2$, $X^4$, $X^{53}$, $X^{54}$, $R^{41}$, $R^{42}$, $R^{43}$, $R^{44}$, $R^{45}$, $R^{46}$, $R^{75}$ and L in the formula (4a-2), and preferred ranges thereof are also the same.

In the formula (4a-3), the number of the nitrogen atom contained in the 6-membered ring structure formed from $X^1$, $X^2$, a nitrogen atom, $X^4$, a carbon atom and a carbon atom is preferably 1 or more and not more than 3, more preferably 1 or 2, and further preferably 1. Specific examples of the 6-membered ring include a pyridine ring, a pyrazine ring, a pyrimidine ring, a pyridazine group and a triazine ring. Of these, a pyridine ring, a pyrazine ring, a pyrimidine ring and a pyridazine ring are more preferable; a pyridine ring, a pyrazine ring and a pyrimidine ring are further preferable; and a pyridine ring is especially preferable.

The platinum complex represented by the formula (4a-3) is preferably a platinum complex represented by the following formula (4a-4). This platinum complex represented by the formula (4a-4) is a novel compound.

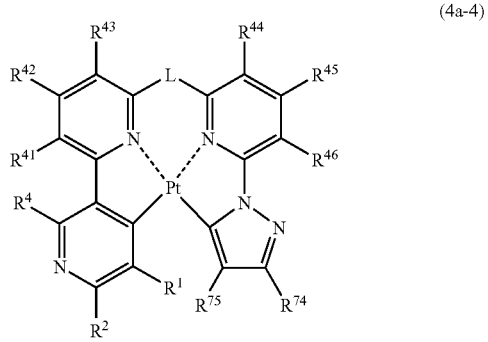

(4a-4)

In the formula, each of $R^1$, $R^2$, $R^4$, $R^{41}$, $R^{42}$, $R^{43}$, $R^{44}$, $R^{45}$, $R^{46}$, $R^{74}$ and $R^{75}$ independently represents a hydrogen atom or a substituent; and L represents a single bond or a divalent connecting group.

In the formula (4a-4), $R^{41}$, $R^{42}$, $R^{43}$, $R^{44}$, $R^{45}$, $R^{46}$, $R^{75}$ and L are synonymous with $R^{41}$, $R^{42}$, $R^{43}$, $R^{44}$, $R^{45}$, $R^{46}$, $R^{75}$ and L in the formula (4a-3), and preferred ranges also the same.

Each of $R^1$, $R^2$, $R^4$ and $R^{74}$ independently represents a hydrogen atom or a substituent. Examples of the substituent include those in the foregoing substituent group B. Also, if possible, in $R^4$ and $R^{41}$, and $R^1$ and $R^2$, the substituents may be connected to each other to form a condensed ring structure; and in $R^1$ and $R^{75}$, the substituents may be connected to each other, whereby the whole of ligands forms a cyclic structure.

$R^1$ is preferably a hydrogen atom, an alkyl group, an aryl group, an amino group, an alkoxy group, an aryloxy group, an acyl group, an alkoxycarbonyl group, an alkylthio group, a sulfonyl group, a hydroxyl group, a halogen atom, a cyano group, a nitro group or a heterocyclic group; more preferably a hydrogen atom, an alkyl group, an aryl group, an alkoxy group, an aryloxy group, an alkylthio group, a halogen atom or a cyano group; further preferably a hydrogen atom, an alkyl group, a perfluoroalkyl group, an aryl group, a halogen atom or a cyano group; still further preferably a hydrogen atom, a methyl group, a trifluoromethyl group, a fluorine atom or a cyano group; and especially preferably a hydrogen atom, a trifluoromethyl group, a fluorine atom or a cyano group.

$R^2$ and $R^4$ are preferably a hydrogen atom, a halogen atom, a fluorine atom-substituted phenyl group, a fluorine atom-substituted alkoxy group, a perfluoroalkyl group, a cyano group, a nitro group or an aryloxy group; more preferably a hydrogen atom, a fluorine atom, a fluorine atom-substituted phenyl group, a trifluoromethoxy group, a trifluoromethyl group, a cyano group or a phenoxy group; further preferably a hydrogen atom, a fluorine atom, a perfluorophenyl group, a trifluoromethyl group, a cyano group or an electron-withdrawing group-substituted phenoxy group; especially preferably a hydrogen atom or a fluorine atom; and most preferably a fluorine atom.

$R^{74}$ is preferably a hydrogen atom, an alkyl group, an aryl group, an amino group, an alkoxy group, an aryloxy group, an acyl group, an alkoxycarbonyl group, an alkylthio group, a sulfonyl group, a hydroxyl group, a halogen atom, a cyano group, a nitro group or a heterocyclic group; more preferably a hydrogen atom, an alkyl group, an aryl group, an alkoxy group, an aryloxy group, an alkylthio group, a halogen atom or a cyano group; further preferably a hydrogen atom, an alkyl group, a perfluoroalkyl group, an aryl group, a halogen atom or a cyano group; still further preferably a hydrogen atom, a methyl group, a trifluoromethyl group, a fluorine atom or a cyano group; especially preferably a hydrogen atom, a trifluoromethyl group, a fluorine atom or a cyano group; and most preferably a trifluoromethyl group or a cyano group.

The platinum complex represented by the formula (4a-4) can be used as, in addition to various materials to be used for organic EL devices, light emitting materials which can be suitably used in the fields of display devices, displays, backlights, electrophotography (xerography), illumination light sources, recording light sources, exposure light sources, read light sources, markers, signboards, interiors, etc., medical applications, fluorescent whitener, photographic materials, UV absorbing materials, laser dye, materials for use in recording media, pigments for use in inkjet printing, dyes for use in color filters, color conversion filters, analysis applications, materials for use in solar cells, materials for use in organic thin film transistors and so on.

Next, the compound represented by the formula (4a-4') is described. The compound represented by the formula (4a-4') is a novel compound which can be a ligand of the platinum complex represented by the foregoing formula (4a-4).

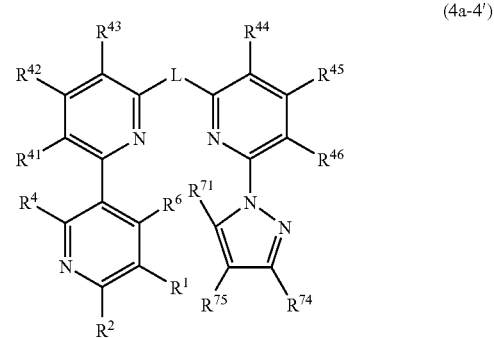

(4a-4')

In the formula, each of $R^1$, $R^2$, $R^3$, $R^4$, $R^{41}$, $R^{42}$, $R^{43}$, $R^{44}$, $R^{45}$, $R^{46}$, $R^{71}$, $R^{74}$ and $R^{75}$ independently represents a hydrogen atom or a substituent; and L represents a single bond or a divalent connecting group.

In the formula (4a-4'), $R^1$, $R^2$, $R^4$, $R^{41}$, $R^{42}$, $R^{43}$, $R^{44}$, $R^{45}$, $R^{46}$, $R^{74}$, $R^{75}$ and L are synonymous with $R^1$, $R^2$, $R^4$, $R^{41}$, $R^{42}$, $R^{43}$, $R^{44}$, $R^{45}$, $R^{46}$, $R^{74}$, $R^{75}$ and L in the formula (4a-4), and preferred ranges thereof are also the same. Each of $R^6$ and $R^{71}$ independently represents a hydrogen atom or a substituent. Examples of the substituent include those in the foregoing substituent group B. $R^6$ and $R^{71}$ are preferably a halogen atom or a hydrogen atom, and more preferably a hydrogen atom.

The compound represented by the formula (4a-4') can be utilized as, in addition to the ligand of the metal complex represented by the foregoing formula, fluorescent materials, charge transport materials, intermediates of drugs, pesticides, etc. and so on.

Another preferred embodiment of the platinum complex represented by the formula (4) is a platinum complex represented by the formula (4b-1).

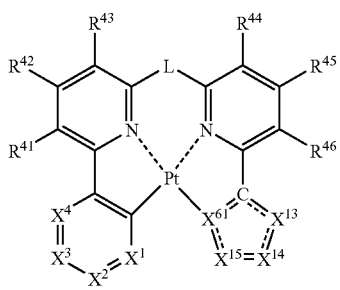

(4b-1)

In the formula, each of $X^1$, $X^2$, $X^3$ and $X^4$ independently represents a carbon atom or a nitrogen atom; one or more of $X^1$, $X^2$, $X^3$ and $X^4$ represent a nitrogen atom; each of $R^{41}$, $R^{42}$, $R^{43}$, $R^{44}$, $R^{45}$ and $R^{46}$ independently represents a hydrogen atom or a substituent; $X^{61}$ represents a carbon atom or a nitrogen atom; each of $X^{13}$, $X^{14}$ and $X^{15}$ independently represents a carbon atom, a nitrogen atom, an oxygen atom or a sulfur atom; the number of the nitrogen atom contained in a 5-membered ring structure represented by $X^{61}$, a carbon atom, $X^{13}$, $X^{14}$ and $X^{15}$ is not more than 2; and L represents a single bond or a divalent connecting group.

In the formula (4b-1), $X^1$, $X^2$, $X^3$, $X^4$, $X^{13}$, $X^{14}$, $X^{15}$, $R^{41}$, $R^{42}$, $R^{43}$, $R^{44}$, $R^{45}$, $R^{46}$ and L are synonymous with $X^1$, $X^2$, $X^3$, $X^4$, $X^{13}$, $X^{14}$, $X^{15}$, $R^{41}$, $R^{42}$, $R^{43}$, $R^{44}$, $R^{45}$, $R^{46}$ and L in the formula (4), and preferred ranges thereof are also the same.

$X^{61}$ represents a carbon atom or a nitrogen atom, and preferably a nitrogen atom.

In the formula (4b-1), the number of the nitrogen atom contained in the 5-membered ring structure formed from $X^{61}$, a carbon atom, $X^{13}$, $X^{14}$ and $X^{15}$ is 0, 1 or 2, preferably 1 or 2, and more preferably 2.

The bond in the 5-membered ring structure formed from $X^{61}$, a carbon atom, $X^{13}$, $X^{14}$ and $X^{15}$ may be any combination of a single bond and a double bond. Examples of the 5-membered ring formed from $X^{61}$, a carbon atom, $X^{13}$, $X^{14}$ and $X^{15}$ include a pyrrole ring, a pyrazole ring, an imidazole ring, a furan ring and a thiophene ring. Of these, a pyrrole ring, a pyrazole ring and an imidazole ring are more preferable; and a pyrazole ring is further preferable.

The platinum complex represented by the formula (4b-1) is preferably a platinum complex represented by the formula (4b-2).

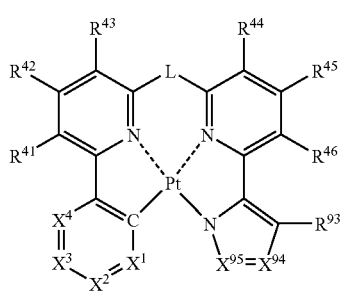

(4b-2)

In the formula, each of $X^1$, $X^2$, $X^3$ and $X^4$ independently represents a carbon atom or a nitrogen atom; one or more of $X^1$, $X^2$, $X^3$ and $X^4$ represent a nitrogen atom; each of $R^{41}$, $R^{42}$, $R^{43}$, $R^{44}$, $R^{45}$ and $R^{46}$ independently represents a hydrogen atom or a substituent; each of $X^{94}$ and $X^{95}$ independently represents a carbon atom or a nitrogen atom; at least one of $X^{94}$ and $X^{95}$ represents a carbon atom; $R^{93}$ represents a hydrogen atom or a substituent; and L represents a single bond or a divalent connecting group.

In the formula (4b-2), $X^1$, $X^2$, $X^3$, $X^4$, $R^{41}$, $R^{42}$, $R^{43}$, $R^{44}$, $R^{45}$, $R^{46}$ and L are synonymous with $X^1$, $X^2$, $X^3$, $X^4$, $R^{41}$, $R^{42}$, $R^{43}$, $R^{44}$, $R^{45}$, $R^{46}$ and L in the formula (4b-1), and preferred ranges thereof are also the same.

Each of $X^{94}$ and $X^{95}$ independently represents a carbon atom or a nitrogen atom, provided that either one of $X^{94}$ or $X^{95}$ represents a carbon atom. It is preferable that $X^{94}$ represents a carbon atom, whereas $X^{95}$ represents a nitrogen atom.

In the case where each of $X^{94}$ and $X^{95}$ can be further substituted, each of $X^{94}$ and $X^{95}$ may independently have a substituent. In the case where each of $X^{94}$ and $X^{95}$ has a substituent, examples of the substituent include those represented by the foregoing substituent group B. As the substituent, an alkyl group, a perfluoroalkyl group, an aryl group, an aromatic heterocyclic group, a dialkylamino group, a diarylamino group, an alkyloxy group, a cyano group and a halogen atom are preferable; an alkyl group, a perfluoroalkyl group, an aryl group, a dialkylamino group, a cyano group and a fluorine atom are more preferable; and an alkyl group, a trifluoromethyl group and a fluorine atom are further preferable. Also, if possible, the substituents may be connected to each other to form a condensed ring structure.

In the formula (4b-2), examples of the 5-membered ring formed from a nitrogen atom, a carbon atom, a carbon atom, $X^{94}$ and $X^{95}$ include a pyrrole ring, a pyrazole ring and an imidazole ring. Of these, a pyrazole ring and an imidazole ring are more preferable; and a pyrazole ring is further preferable.

$R^{93}$ represents a hydrogen atom or a substituent. Examples of the substituent include those represented by the foregoing substituent group B. $R^{93}$ is preferably a hydrogen atom, an alkyl group, a perfluoroalkyl group, an aryl group, an aromatic heterocyclic group, a dialkylamino group, a diarylamino group, an alkyloxy group, a cyano group or a halogen atom; more preferably a hydrogen atom, an alkyl group, a perfluoroalkyl group, an aryl group, a dialkylamino group, a cyano group or a fluorine atom; further preferably a hydrogen atom, an alkyl group, a trifluoromethyl group or a fluorine atom; and most preferably a fluorine atom or a hydrogen atom. Also, if possible, the substituents of $X^{94}$ and $X^{95}$ may be connected to each other to form a condensed ring structure.

The platinum complex represented by the formula (4b-2) is preferably a platinum complex represented by the formula (4b-3).

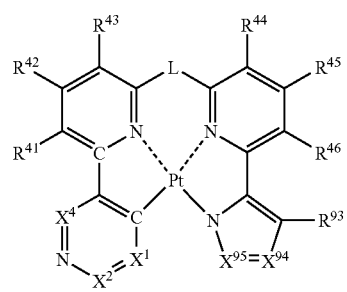

(4b-3)

In the formula, each of $X^1$, $X^2$ and $X^4$ independently represents a carbon atom or a nitrogen atom; one or more of $X^1$, $X^2$ and $X^4$ represent a nitrogen atom; each of $R^{41}$, $R^{42}$, $R^{43}$, $R^{44}$, $R^{45}$ and $R^{46}$ independently represents a hydrogen atom or a substituent; each of $X^{94}$ and $X^{95}$ independently represents a carbon atom or a nitrogen atom; at least one of $X^{94}$ and $X^{95}$ represents a carbon atom; $R^{93}$ represents a hydrogen atom or a substituent; and L represents a single bond or a divalent connecting group.

In the formula (4b-3), $X^1$, $X^2$, $X^4$, $X^{94}$, $X^{95}$, $R^{41}$, $R^{42}$, $R^{43}$, $R^{44}$, $R^{45}$, $R^{46}$, $R^{93}$ and L are synonymous with $X^1$, $X^2$, $X^4$, $X^{94}$, $X^{95}$, $R^{41}$, $R^{42}$, $R^{43}$, $R^{44}$, $R^{45}$, $R^{46}$, $R^{93}$ and L in the formula (4b-2), and preferred ranges thereof are also the same.

In the formula (4b-3), the number of the nitrogen atom contained in the 6-membered ring structure formed from $X^1$, $X^2$, a nitrogen atom, $X^4$, a carbon atom and a carbon atom is preferably 1 or more and not more than 3, more preferably 1 or 2, and further preferably 1. Specific examples of the 6-membered ring include a pyridine ring, a pyrazine ring, a pyrimidine ring, a pyridazine group and a triazine ring. Of these, a pyridine ring, a pyrazine ring, a pyrimidine ring and a pyridazine ring are more preferable; a pyridine ring, a pyrazine ring and a pyrimidine ring are further preferable; and a pyridine ring is especially preferable.

The foregoing metal complex with a specified structure may be a low molecular weight compound, or may be a polymer compound in which a residue structure is connected to a polymer chain (preferably a polymer compound having a mass average molecular weight of from 1,000 to 5,000,000, more preferably a polymer compound having a mass average molecular weight of from 5,000 to 2,000,000, and further preferably a polymer compound having a mass average molecular weight of from 10,000 to 1,000,000) or a polymer compound having a structure of the foregoing metal complex with a specified structure in a main chain thereof (preferably a polymer compound having a mass average molecular weight of from 1,000 to 5,000,000, more preferably a polymer compound having a mass average molecular weight of from 5,000 to 2,000,000, and further preferably a polymer compound having a mass average molecular weight of from 10,000 to 1,000,000). The metal complex with a specified structure is preferably a low molecular weight compound.

In the case of a polymer compound, the polymer compound may be a homopolymer or may be a copolymer with other polymer. In the case of a copolymer, the copolymer may be a random copolymer or may be a block copolymer. Furthermore, in the case of a copolymer, a compound having a light emitting function and/or a compound having a charge transport function may be present within the polymer.

When the compound represented by the formula (1) is expressed by the following formula (I), partial structures which can be used for $Q^A$, $Q^B$, $Q^C$, $Q^D$ and L are hereunder described.

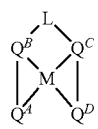

Formula (I)

A partial structure which can be used for $Q^A$ is a partial structure group represented by [QB61CC].

A partial structure which can be used for $Q^B$ is a partial structure group represented by [QT60CN].

A partial structure which can be used for $Q^C$ is a partial structure group represented by [QT60CN].

A partial structure which can be used for $Q^D$ is a partial structure group represented by [QB51CC], [QB51CN] or [QB51NC].

A partial structure which can be used for L is a partial structure group represented by [L].

In the following formulae, M and L are corresponding to M and L, respectively in the formula (I); and as to Q, Q in the [partial structure represented by $Q^A$] represents $Q^B$, Q in the [partial structure represented by $Q^B$] represents $Q^A$, Q in the [partial structure represented by $Q^C$] represents $Q^D$, and Q in the [partial structure represented by $Q^D$] represents $Q^C$.

As to two Qs in the partial structure [L] of the connecting group L, Q on the left-hand side represents $Q^B$, and Q on the right-hand side represents $Q^C$.

Partial structure which can be used for $Q^A$:

[QB61CC]

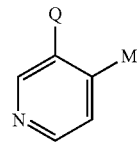

QB61CC-1

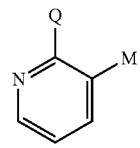

QB61CC-2

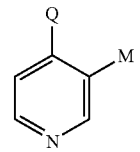

QB61CC-3

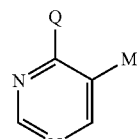

QB61CC-4

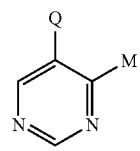

QB61CC-5

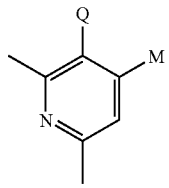

QB61CC-6

-continued
QB61CC-7
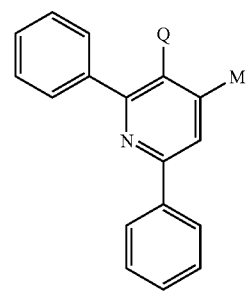
QB61CC-8
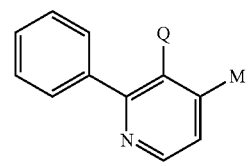
QB61CC-9
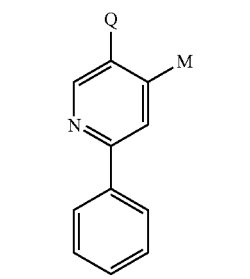
QB61CC-10
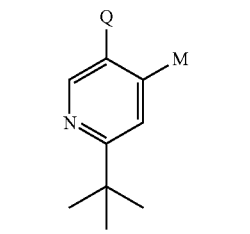
QB61CC-11
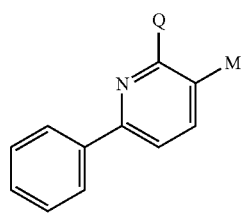
QB61CC-12
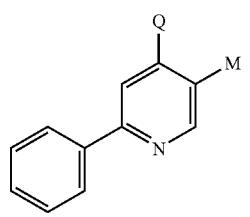
QB61CC-13
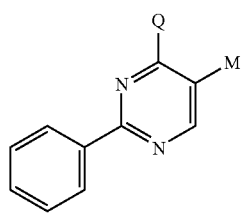
-continued
QB61CC-14
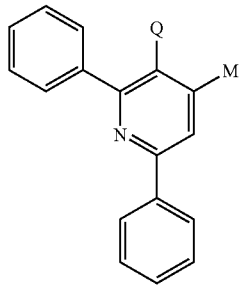
QB61CC-15
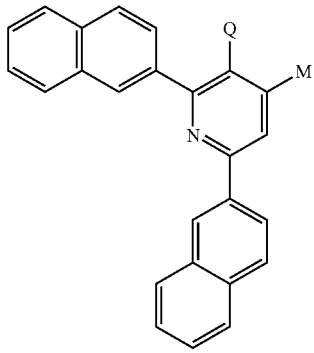
QB61CC-16
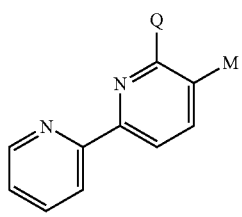
QB61CC-17
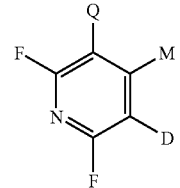
QB61CC-18
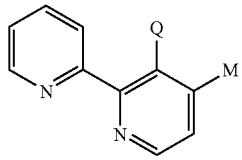
QB61CC-19
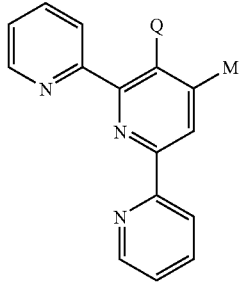

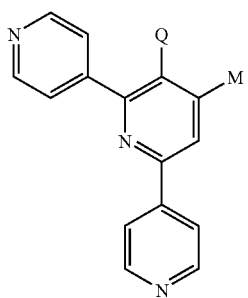 QB61CC-20
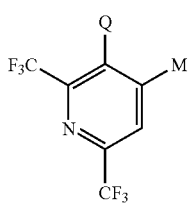 QB61CC-21
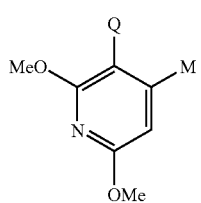 QB61CC-22
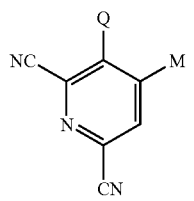 QB61CC-23
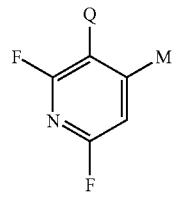 QB61CC-24
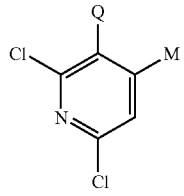 QB61CC-25
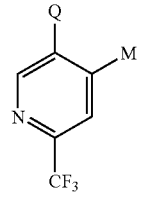 QB61CC-26
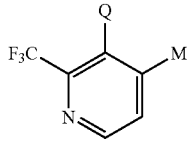 QB61CC-27
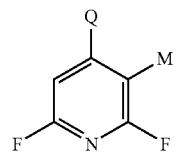 QB61CC-28
 QB61CC-29
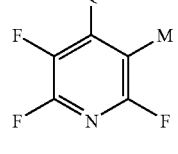 QB61CC-30
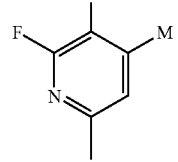 QB61CC-31
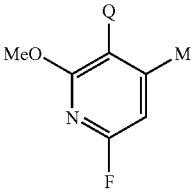 QB61CC-32
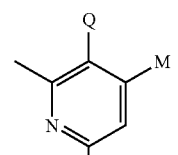 QB61CC-33
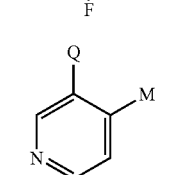 QB61CC-34
QB61CC-35

-continued
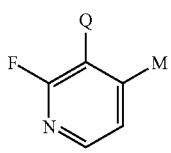
QB61CC-36
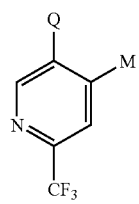
QB61CC-37
Partial structure which can be used for $Q^B$ and $Q^C$:
[QT60CN]
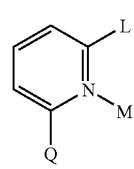
QT60CN-1
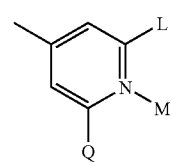
QT60CN-2
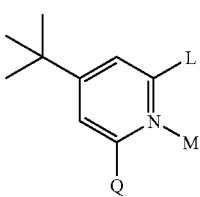
QT60CN-3
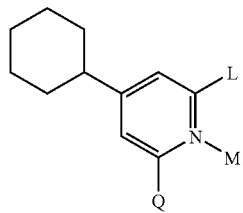
QT60CN-4
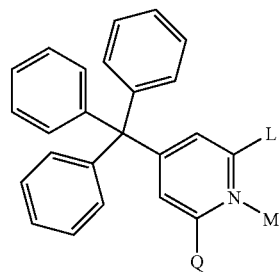
QT60CN-5
-continued
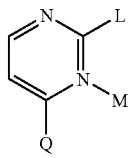
QT60CN-6
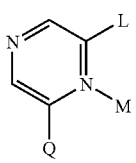
QT60CN-7
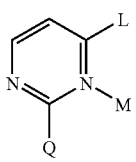
QT60CN-8
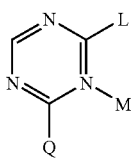
QT60CN-9
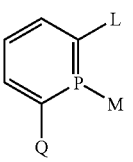
QT60CN-10
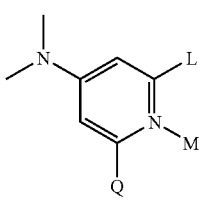
QT60CN-11
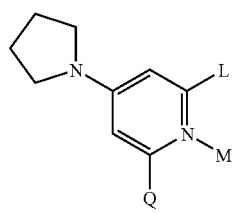
QT60CN-12
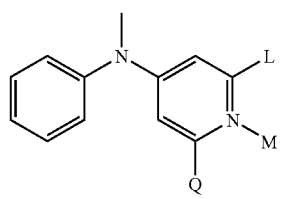
QT60CN-13

QT60CN-14
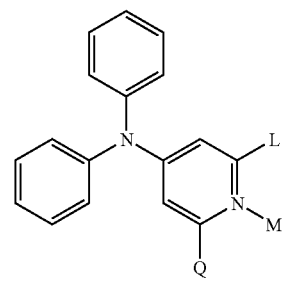
QT60CN-15
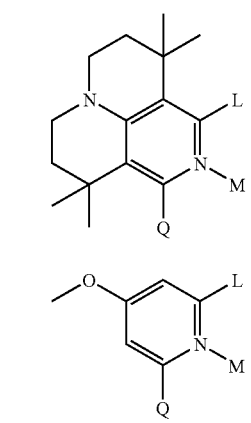
QT60CN-16
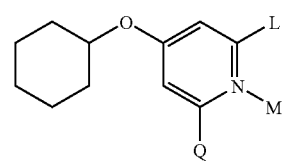
QT60CN-17
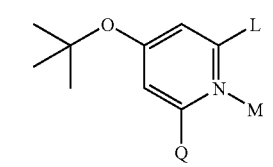
QT60CN-18
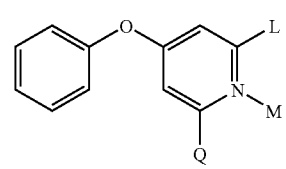
QT60CN-19
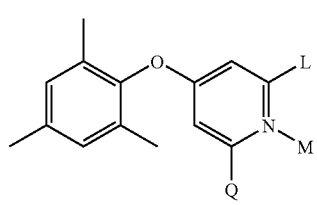
QT60CN-20
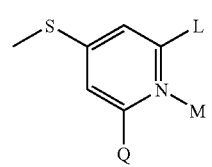
QT60CN-21
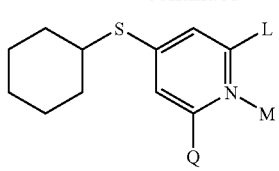
QT60CN-22
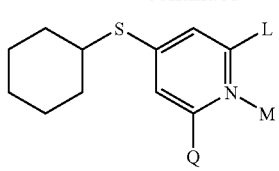
QT60CN-23
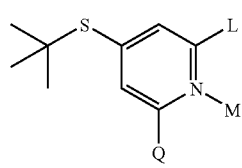
QT60CN-24
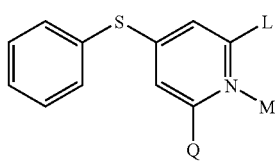
QT60CN-25
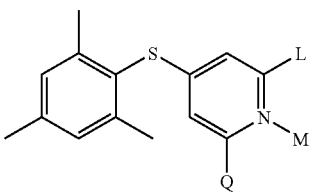
QT60CN-26
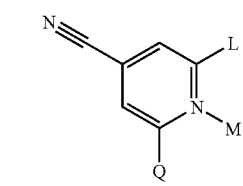
QT60CN-27
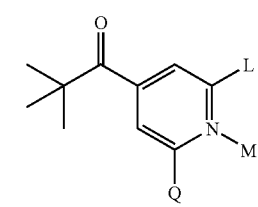
QT60CN-28
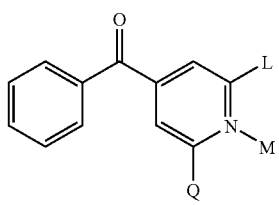
QT60CN-29
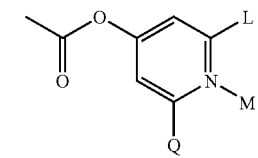
QT60CN-30
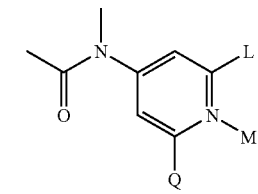

| | |
|---|---|
| QT60CN-31 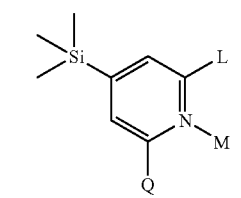 | QT60CN-38 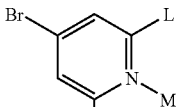 |
| QT60CN-32 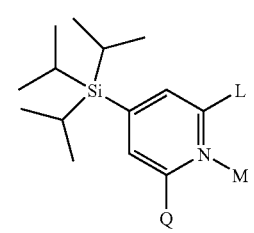 | QT60CN-39 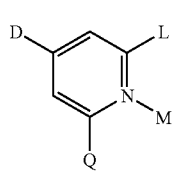 |
| QT60CN-33 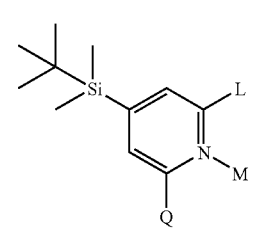 | QT60CN-40 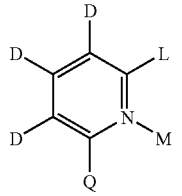 |
| QT60CN-34 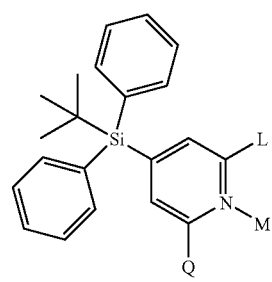 | QT60CN-41 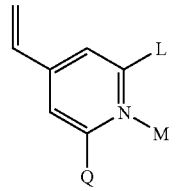 |
| QT60CN-35 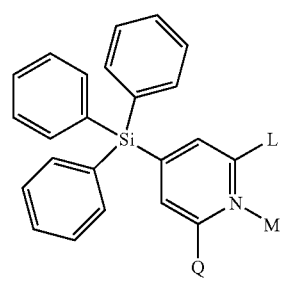 | QT60CN-42 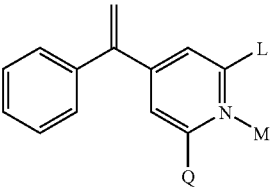 |
| QT60CN-36 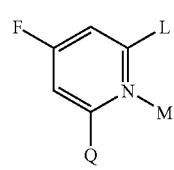 | QT60CN-43 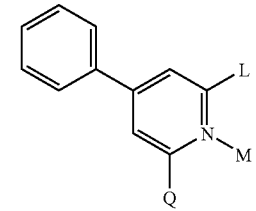 |
| QT60CN-37 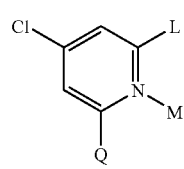 | QT60CN-44 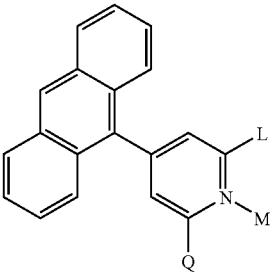 |
| | QT60CN-45 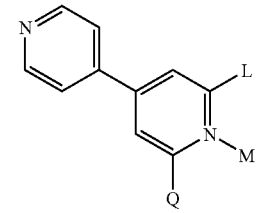 |

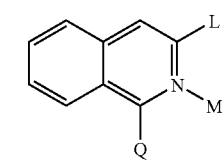 QT60CN-46
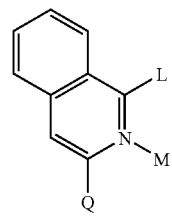 QT60CN-47
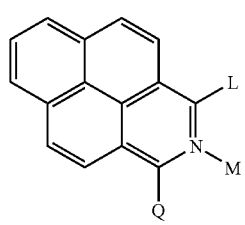 QT60CN-48
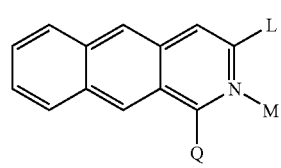 QT60CN-49
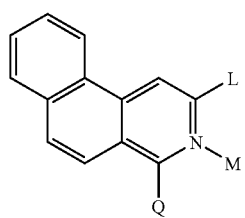 QT60CN-50
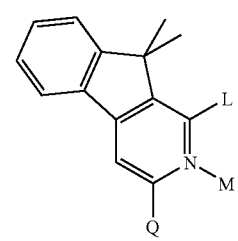 QT60CN-51
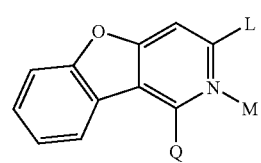 QT60CN-52
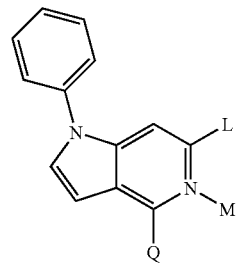 QT60CN-53
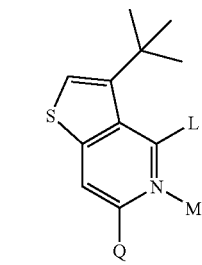 QT60CN-54
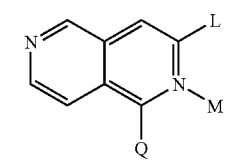 QT60CN-55
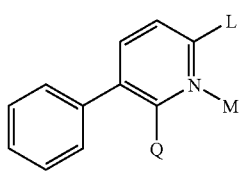 QT60CN-56
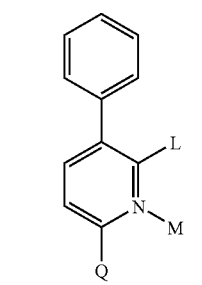 QT60CN-57
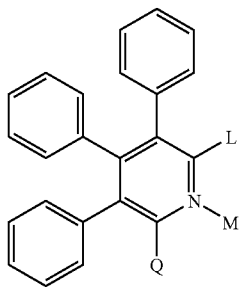 QT60CN-58
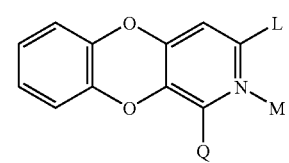 QT60CN-59

QT60CN-60
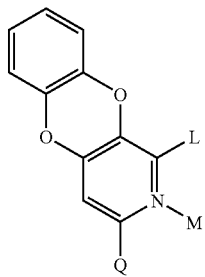
QT60CN-61
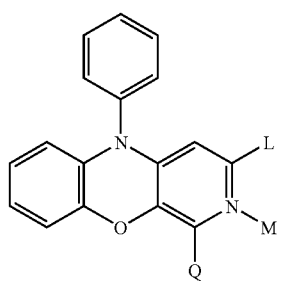
QT60CN-62
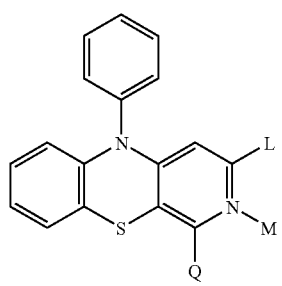
QT60CN-63
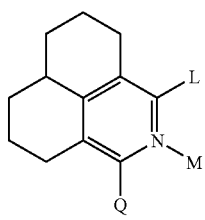
QT60CN-64
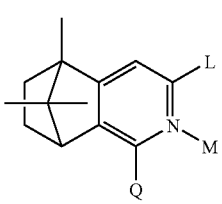
QT60CN-65
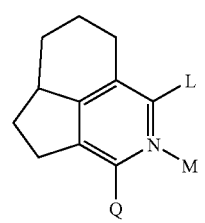
QT60CN-66
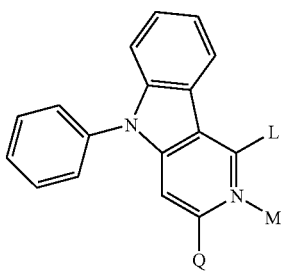
QT60CN-67
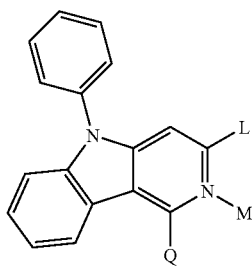
QT60CN-68
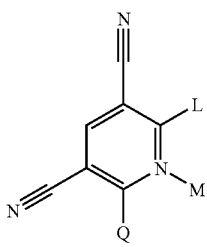
QT60CN-69
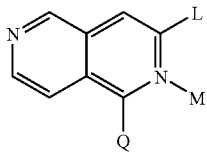
QT60CN-70
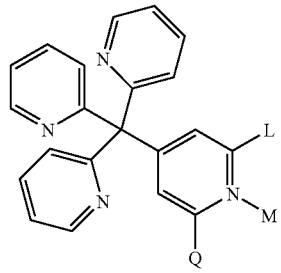
QT60CN-71
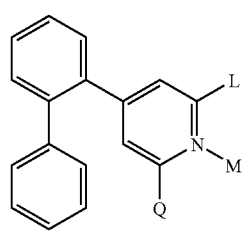

-continued
QT60CN-72
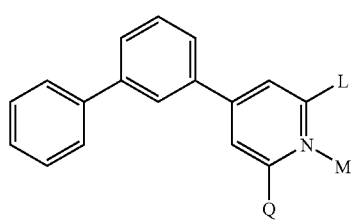
QT60CN-73
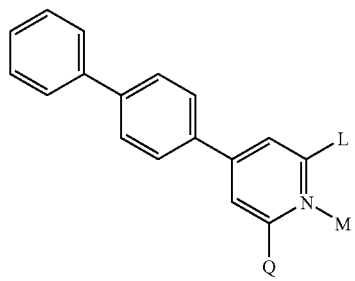
QT60CN-74
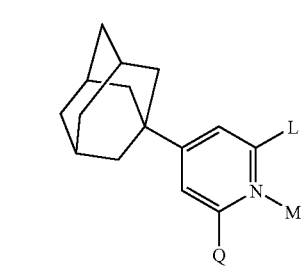
QT60CN-75
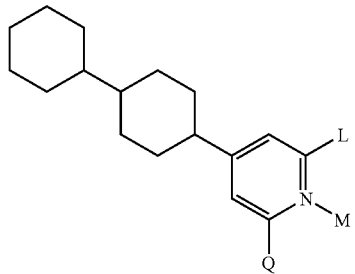
Partial structure which can be used for $Q^D$:
[QB51CC]
QB51CC-1
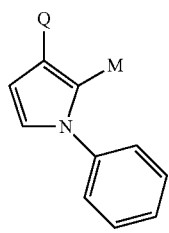
QB51CC-2
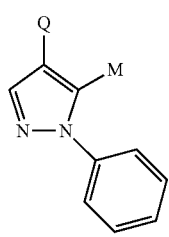
-continued
QB51CC-3
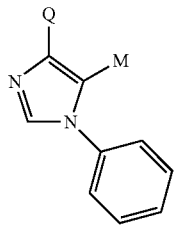
QB51CC-4
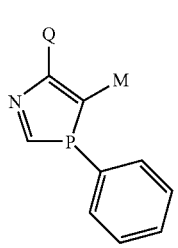
QB51CC-5
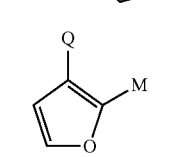
QB51CC-6
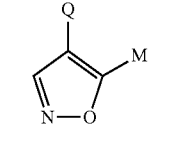
QB51CC-7
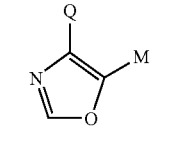
QB51CC-8
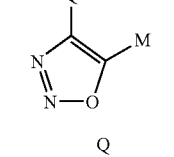
QB51CC-9
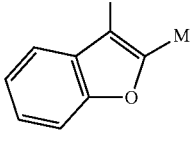
QB51CC-10
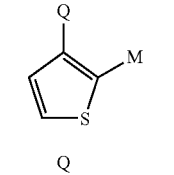
QB51CC-11
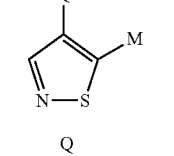
QB51CC-12
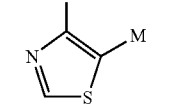

-continued

QB51CC-13

QB51CC-14

QB51CC-15

QB51CC-16

QB51CC-17

QB51CC-18

QB51CC-20

QB51CC-21

QB51CC-22

QB51CC-23

-continued

QB51CC-25

QB51CC-26

QB51CC-27

QB51CC-28

QB51CC-30

QB51CC-31

QB51CC-32

QB51CC-33

QB51CC-35

QB51CC-36
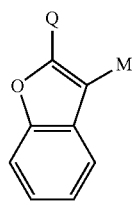
QB51CC-37
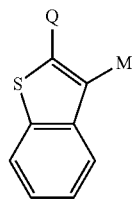
QB51CC-38
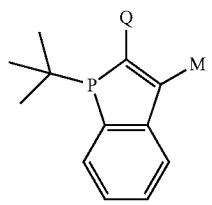
QB51CC-39
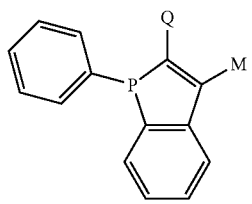
QB51CC-40
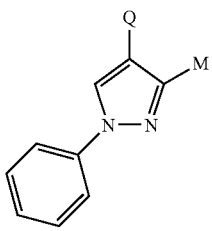
QB51CC-41
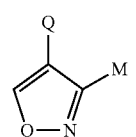
QB51CC-42
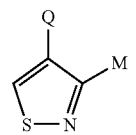
QB51CC-43
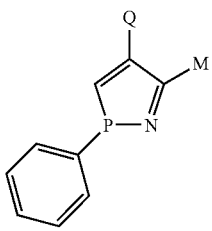
QB51CC-45
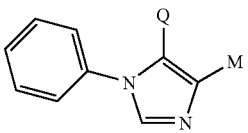
QB51CC-46
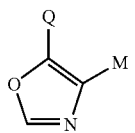
QB51CC-47
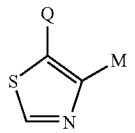
QB51CC-48
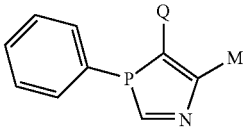
QB51CC-50
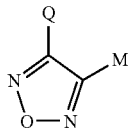
QB51CC-51
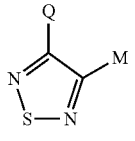
QB51CC-52
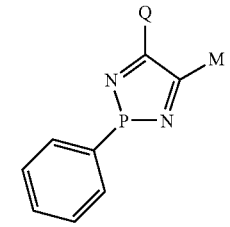
QB51CC-54
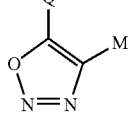
QB51CC-55
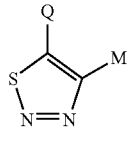
QB51CC-56
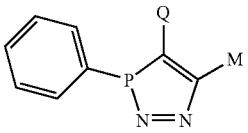

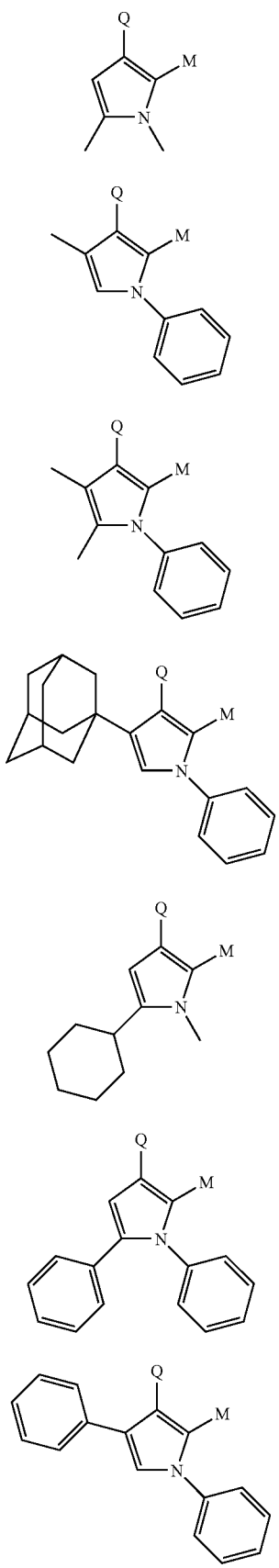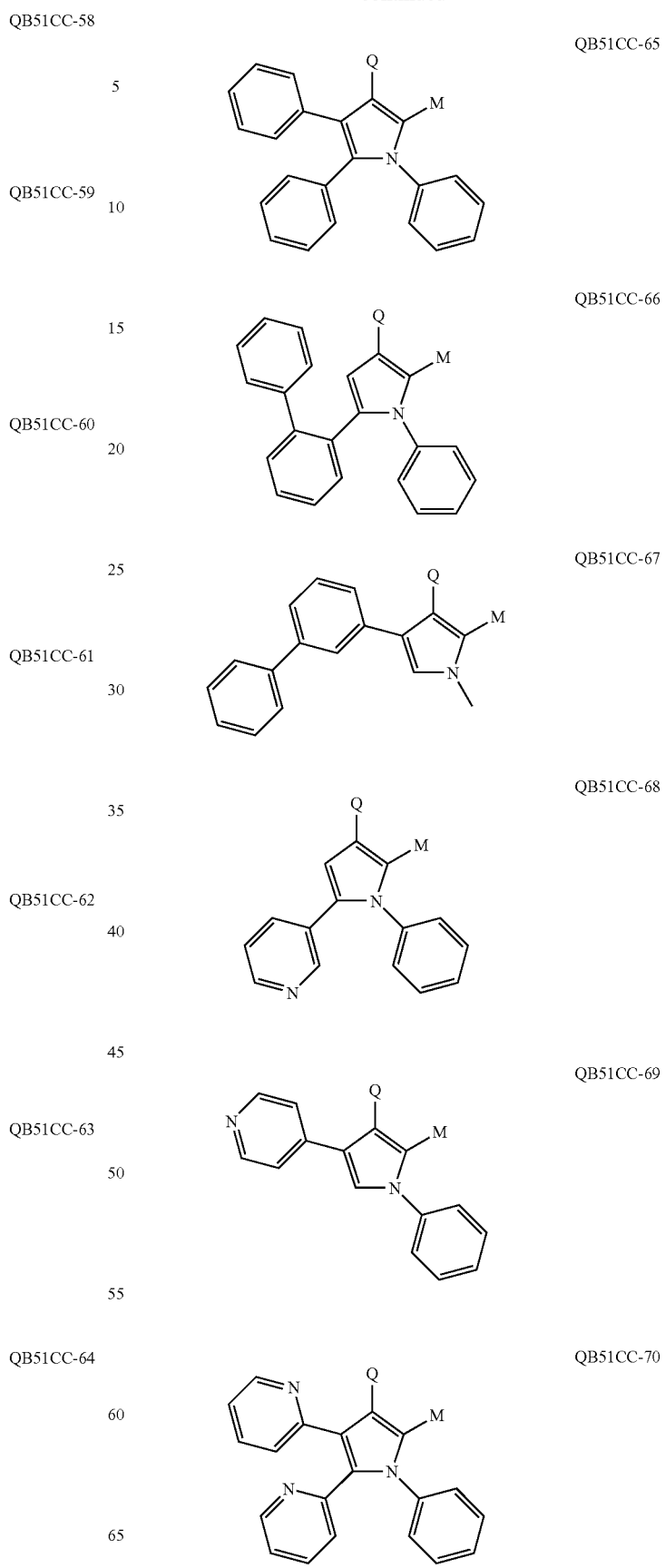

-continued
QB51CC-71
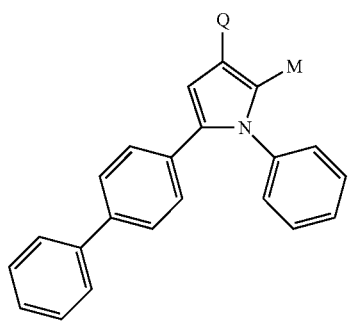
QB51CC-72
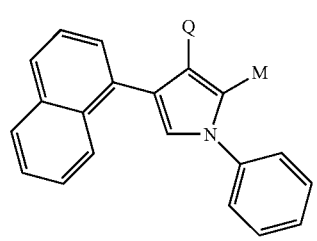
QB51CC-73
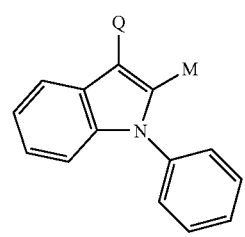
QB51CC-74
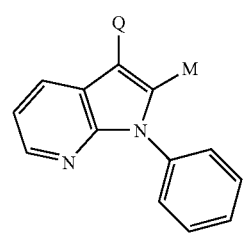
QB51CC-75
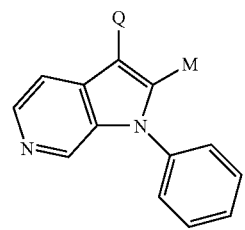
QB51CC-76
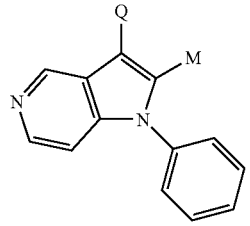
-continued
QB51CC-77
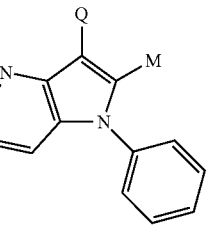
QB51CC-78
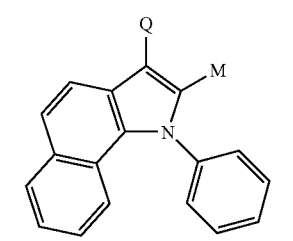
QB51CC-79
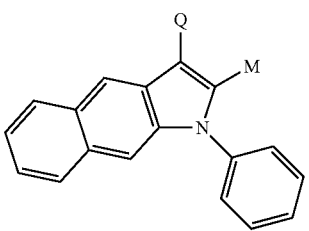
QB51CC-80
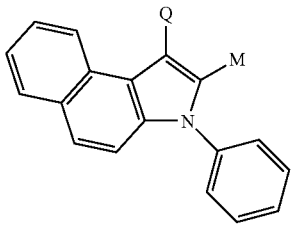
QB51CC-81
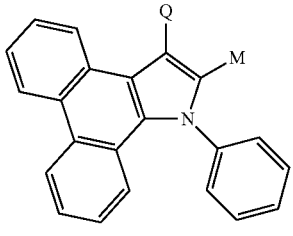
QB51CC-82
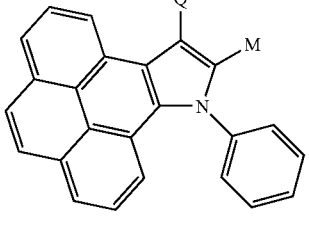
QB51CC-83
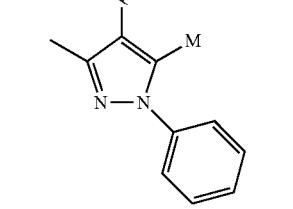

QB51CC-84
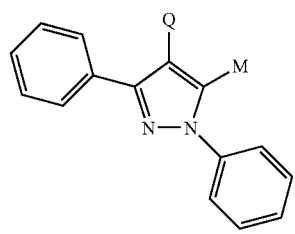
QB51CC-85
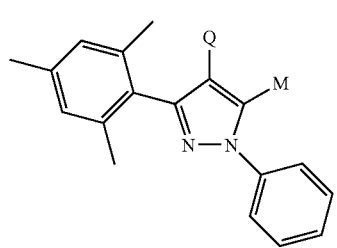
QB51CC-86
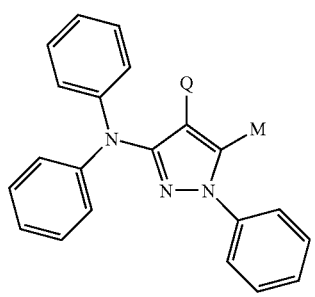
QB51CC-87
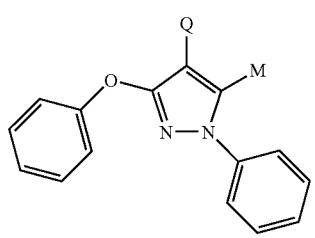
QB51CC-88
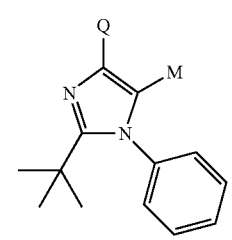
QB51CC-89
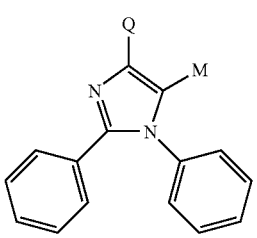
QB51CC-90
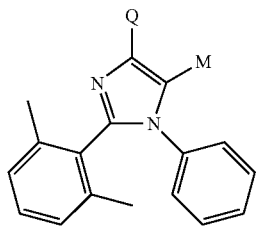
QB51CC-91
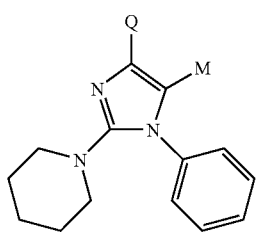
QB51CC-92
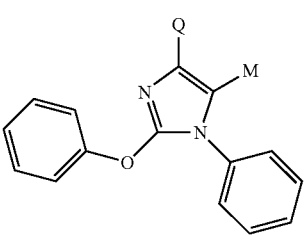
QB51CC-93
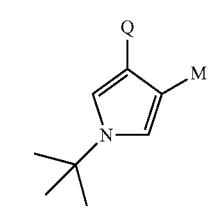
QB51CC-94
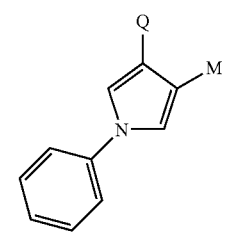
QB51CC-95
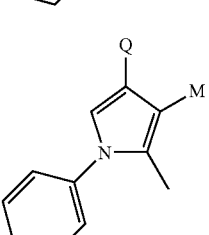
QB51CC-96
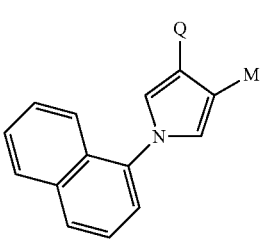

QB51CC-97
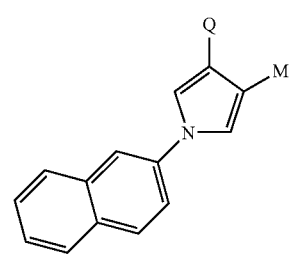
QB51CC-98
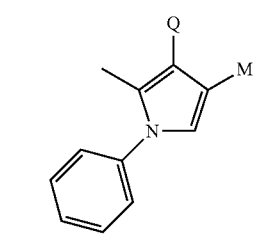
QB51CC-99
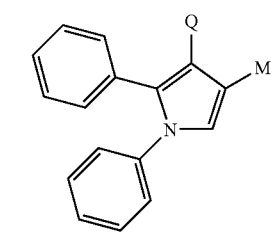
QB51CC-100
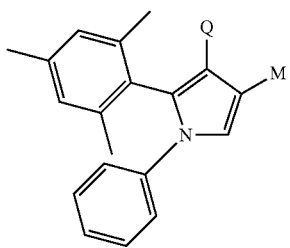
QB51CC-101
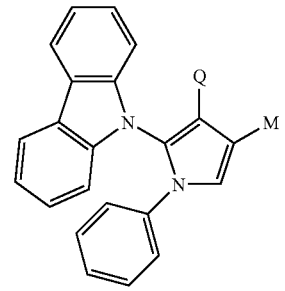
QB51CC-102
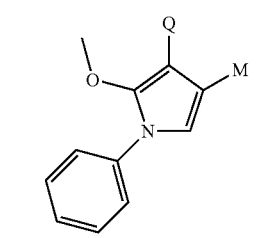
QB51CC-103
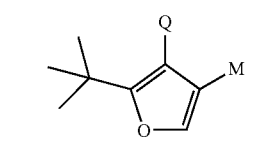
QB51CC-104
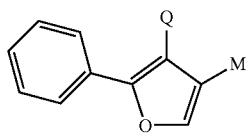
QB51CC-105
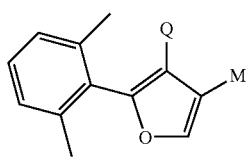
QB51CC-106
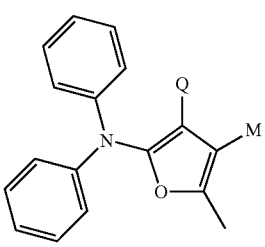
QB51CC-107
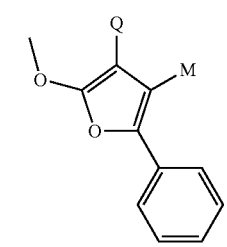
QB51CC-108
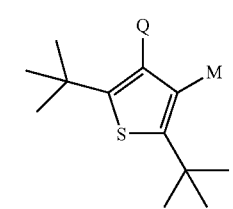
QB51CC-109
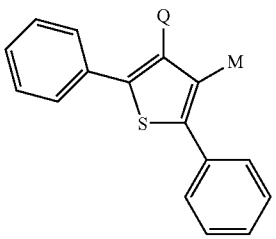
QB51CC-110
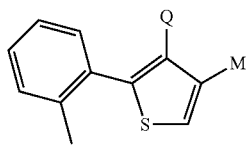
QB51CC-111
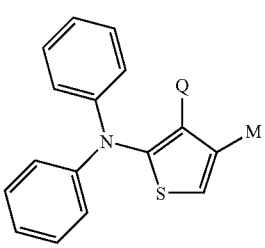

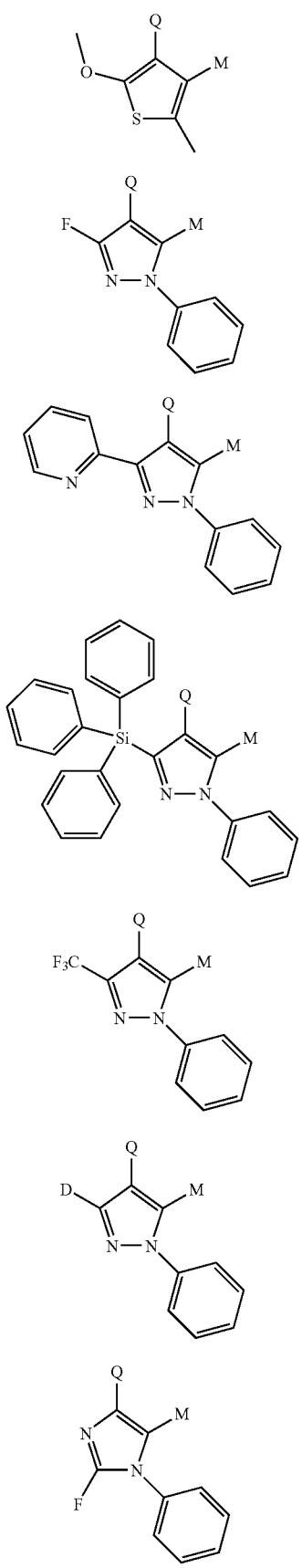
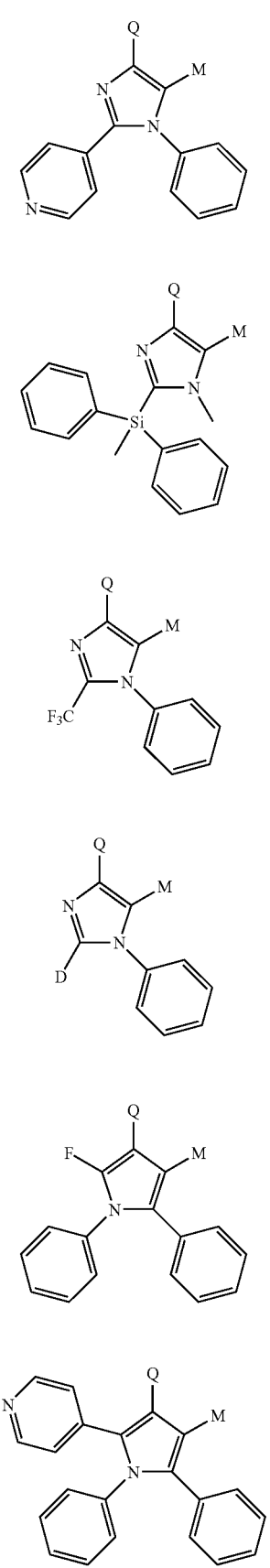

QB51CC-125
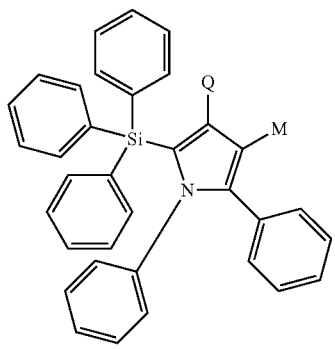
QB51CC-126
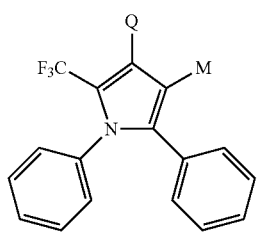
QB51CC-127
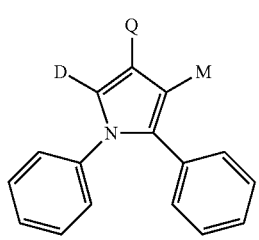
QB51CC-128
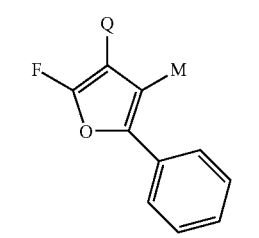
QB51CC-129
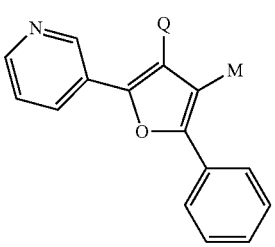
QB51CC-130
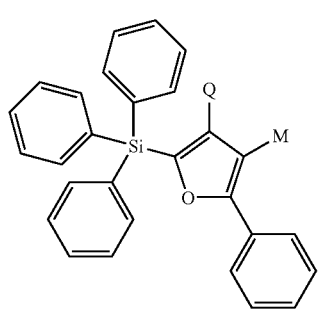
QB51CC-131
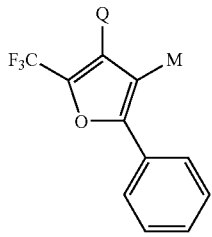
QB51CC-132
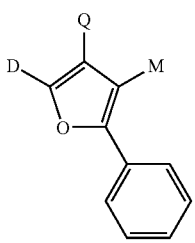
QB51CC-133
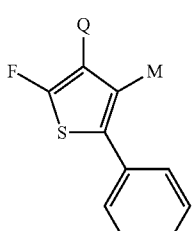
QB51CC-134
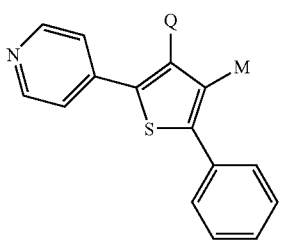
QB51CC-135
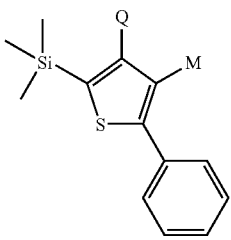
QB51CC-136
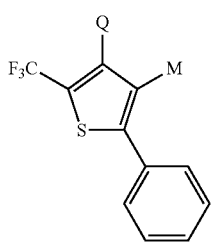

-continued
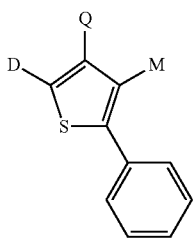
QB51CC-137
[QB51CN]
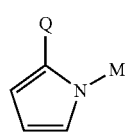
QB51CN-1
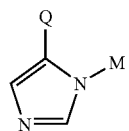
QB51CN-2
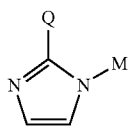
QB51CN-3
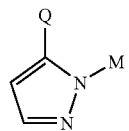
QB51CN-4
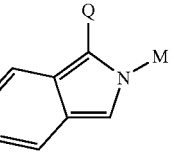
QB51CN-5
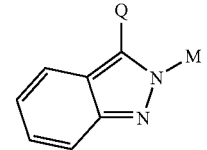
QB51CN-6
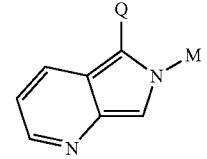
QB51CN-7
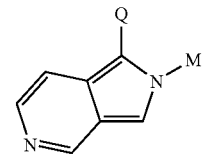
QB51CN-8
-continued
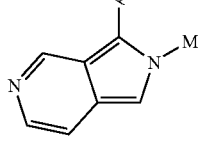
QB51CN-9
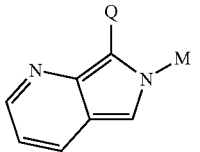
QB51CN-10
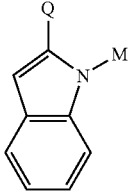
QB51CN-11
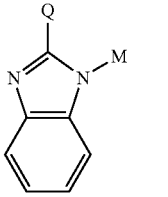
QB51CN-12
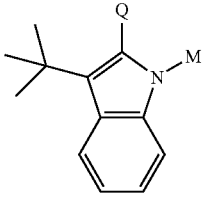
QB51CN-13
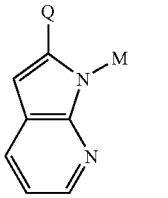
QB51CN-14
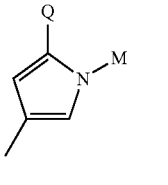
QB51CN-15
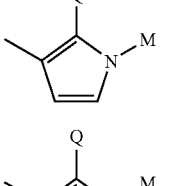
QB51CN-16
QB51CN-17

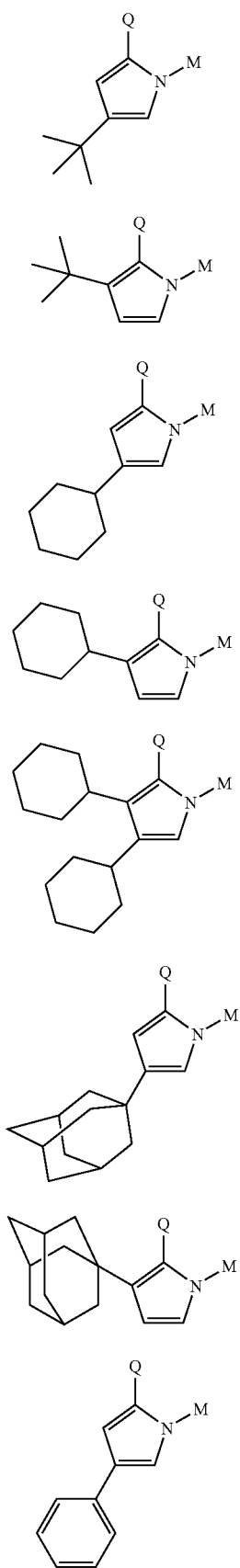
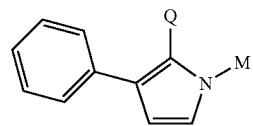

QB51CN-33
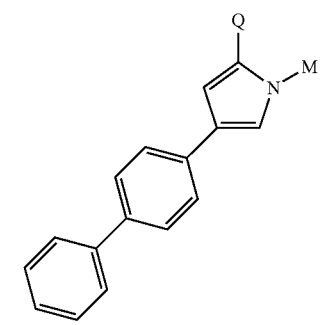
QB51CN-34
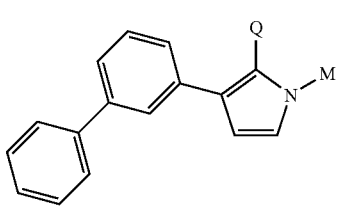
QB51CN-35
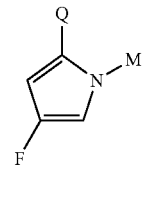
QB51CN-36
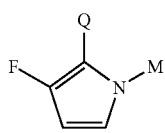
QB51CN-37
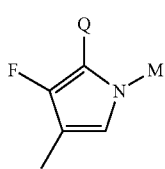
QB51CN-38
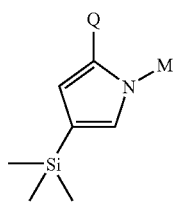
QB51CN-39
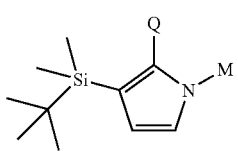
QB51CN-40
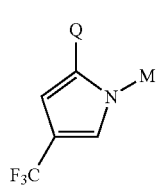
QB51CN-41
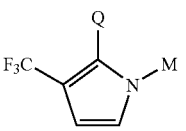
QB51CN-42
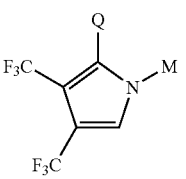
QB51CN-43
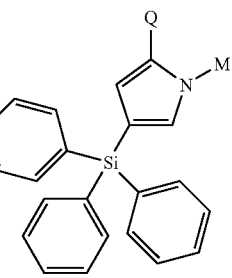
QB51CN-44
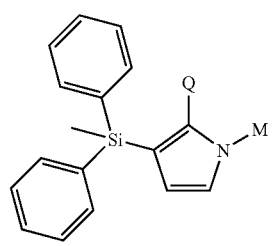
[QB51NC]
QB51NC-1
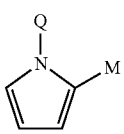
QB51NC-2
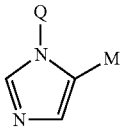
QB51NC-3
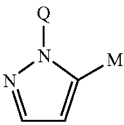
QB51NC-4
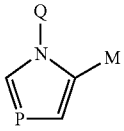
QB51NC-5
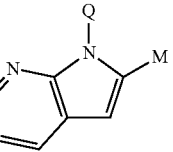

-continued
QB51NC-6
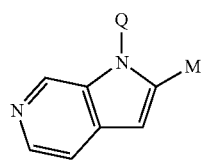
QB51NC-7
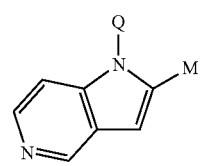
QB51NC-8
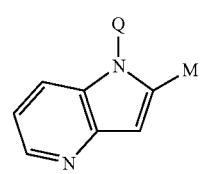
QB51NC-9
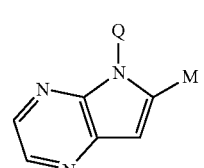
QB51NC-10
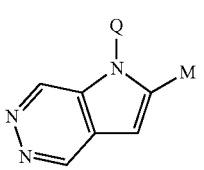
QB51NC-11
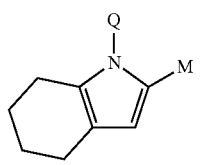
QB51NC-12
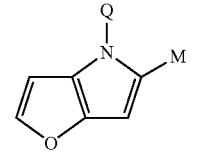
QB51NC-13
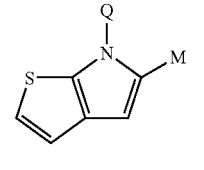
QB51NC-14
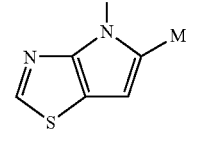
-continued
QB51NC-15
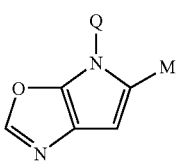
QB51NC-16
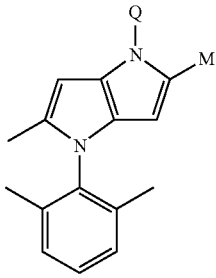
QB51NC-17
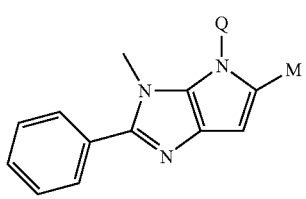
QB51NC-18
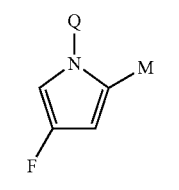
QB51NC-19
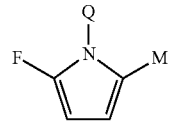
QB51NC-20
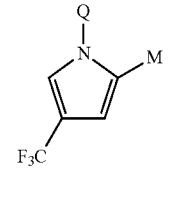
QB51NC-21
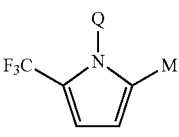
QB51NC-22
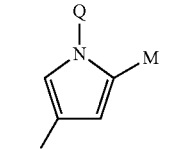
QB51NC-23
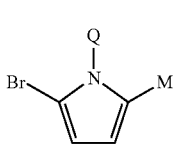

QB51NC-24
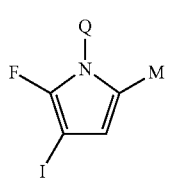
QB51NC-25
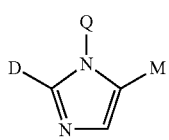
QB51NC-26
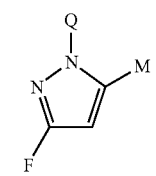
QB51NC-27
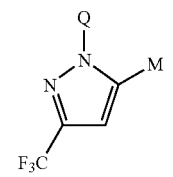
QB51NC-28
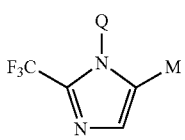
QB51NC-29
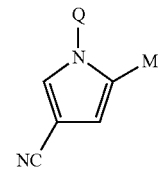
QB51NC-30
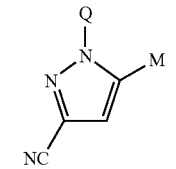
QB51NC-31
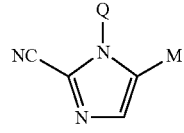
QB51NC-32
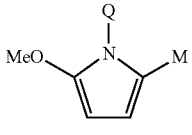
QB51NC-33
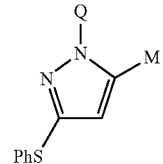
QB51NC-34
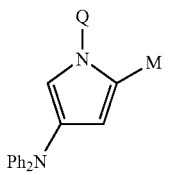
QB51NC-35
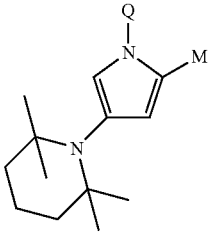
QB51NC-36
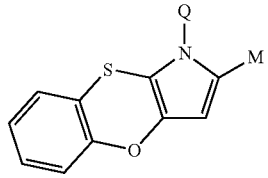
QB51NC-37
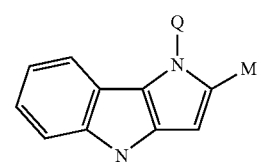
QB51NC-38
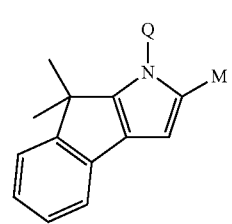
QB51NC-39
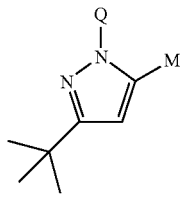
QB51NC-40
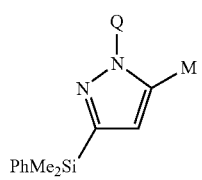
QB51NC-41
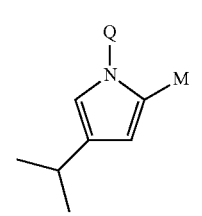

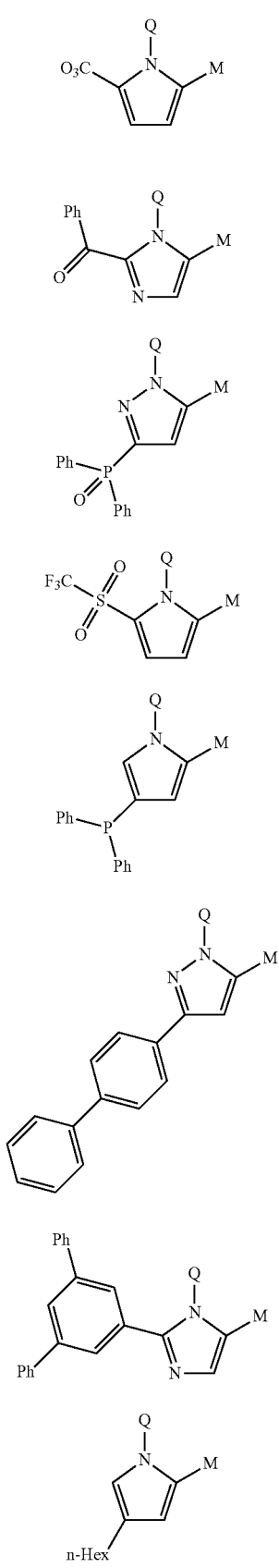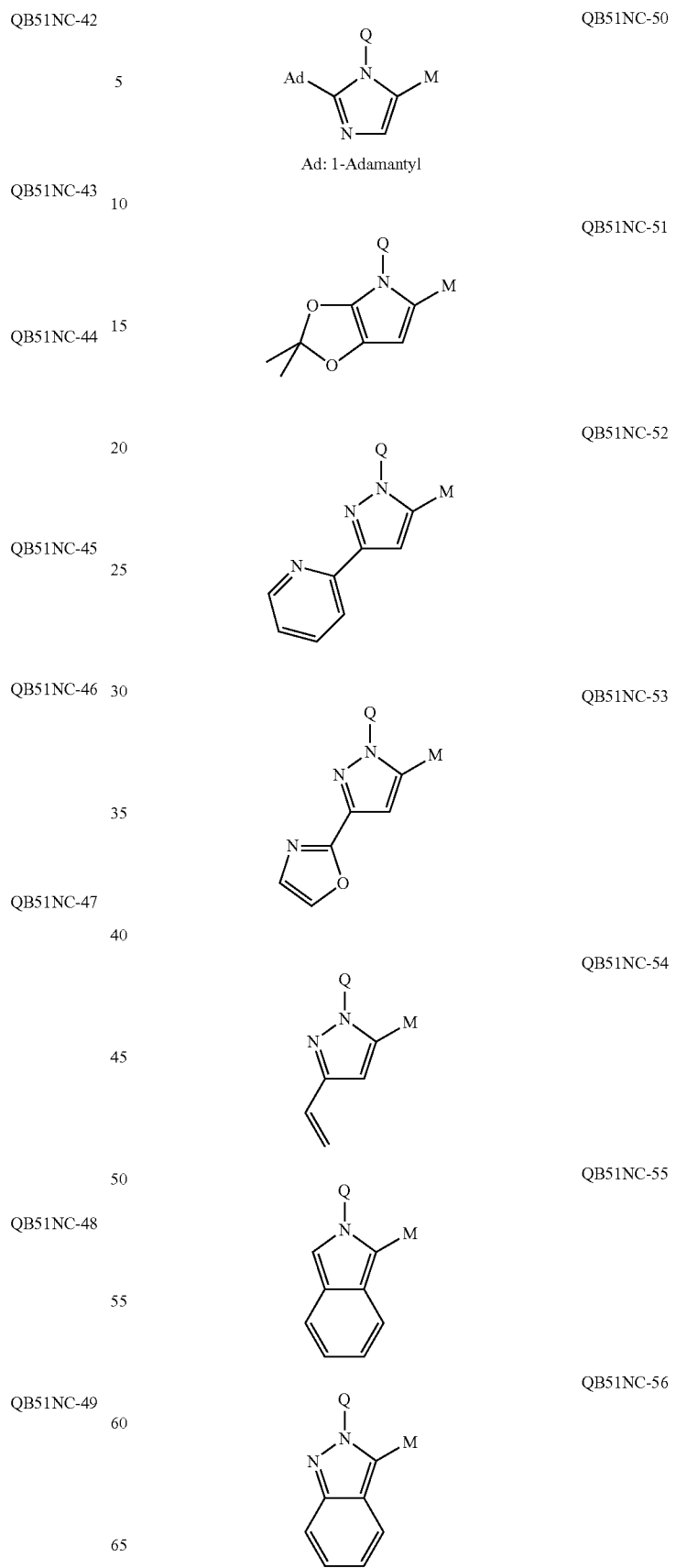

QB51NC-57 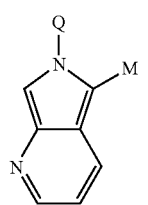
QB51NC-58 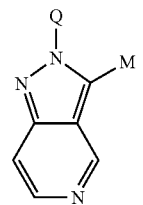
QB51NC-59 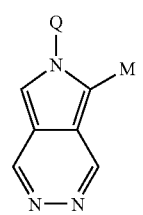
QB51NC-60 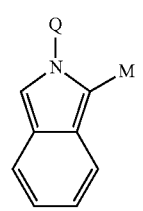
QB51NC-64 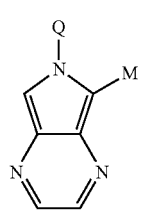
QB51NC-65 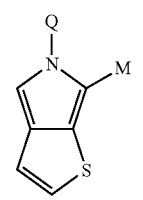
QB51NC-66 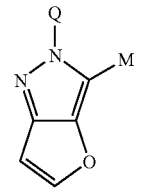
QB51NC-67 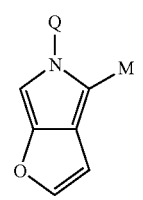
QB51NC-68 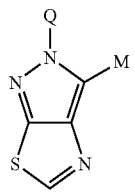
QB51NC-69 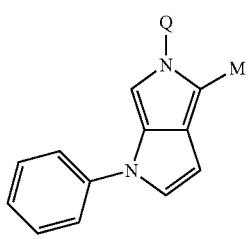
QB51NC-70 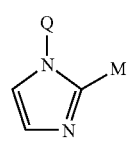
QB51NC-71 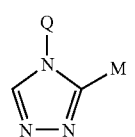
QB51NC-72 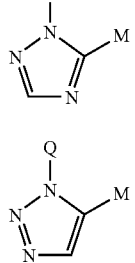
QB51NC-73 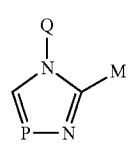
QB51NC-74 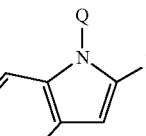
QB51NC-75 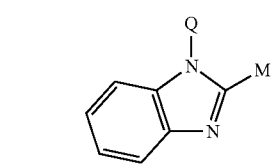
QB51NC-76 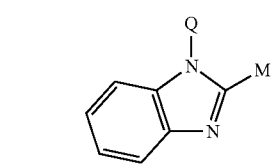
Partial structure which can be used for the connecting group L:

[L]
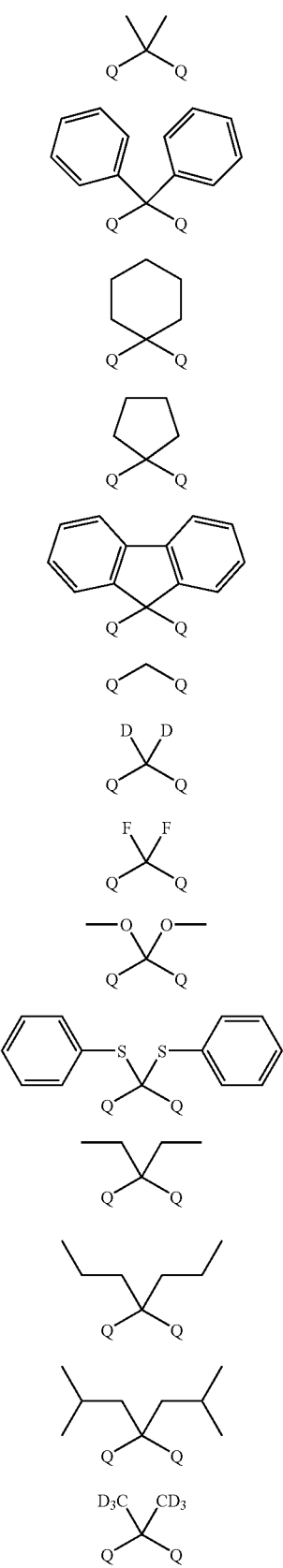
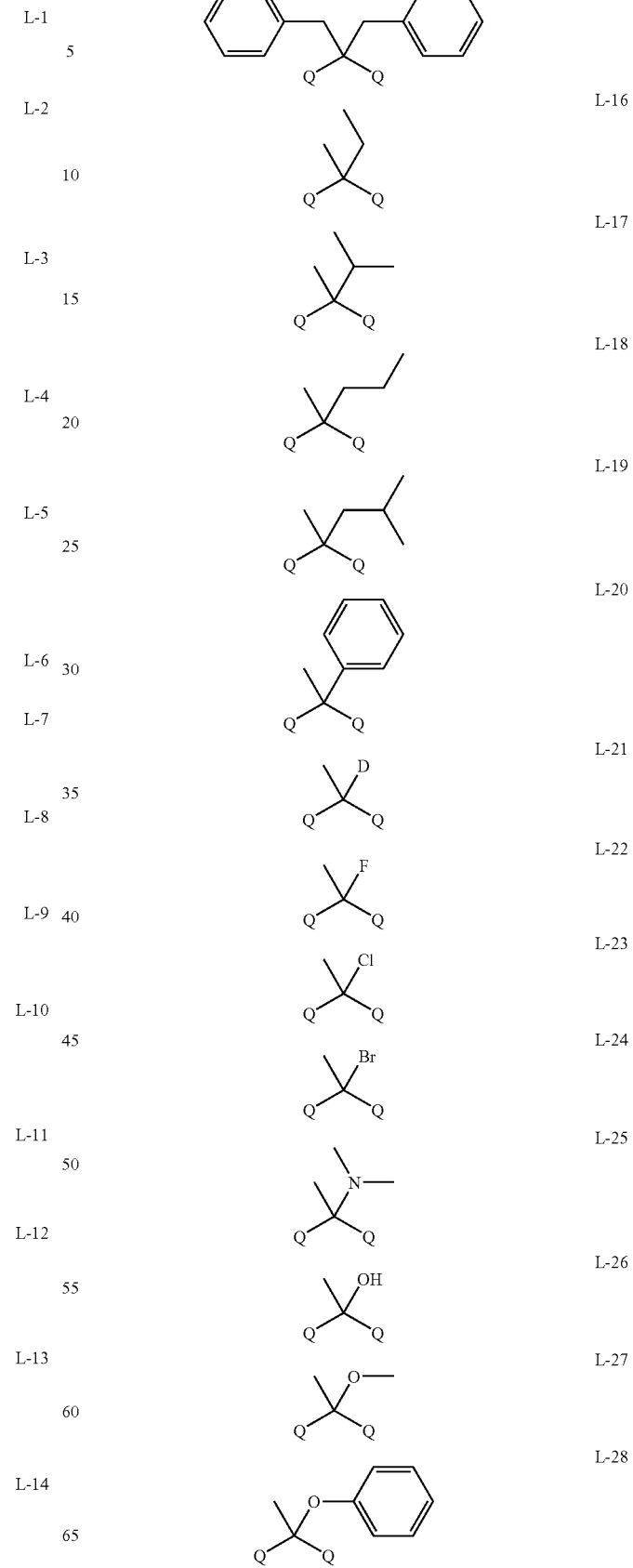

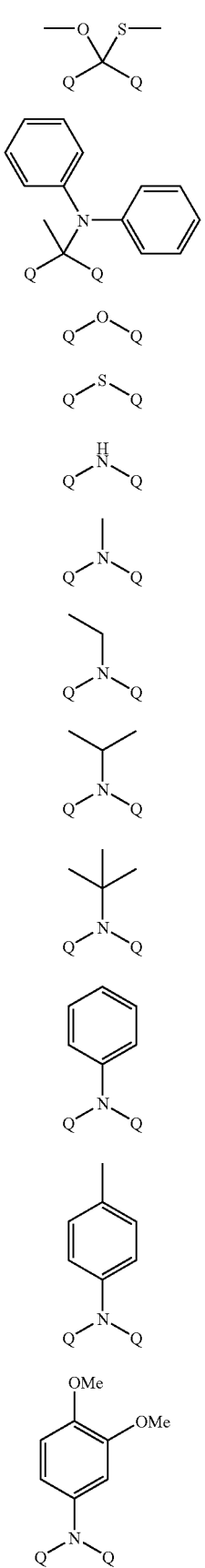
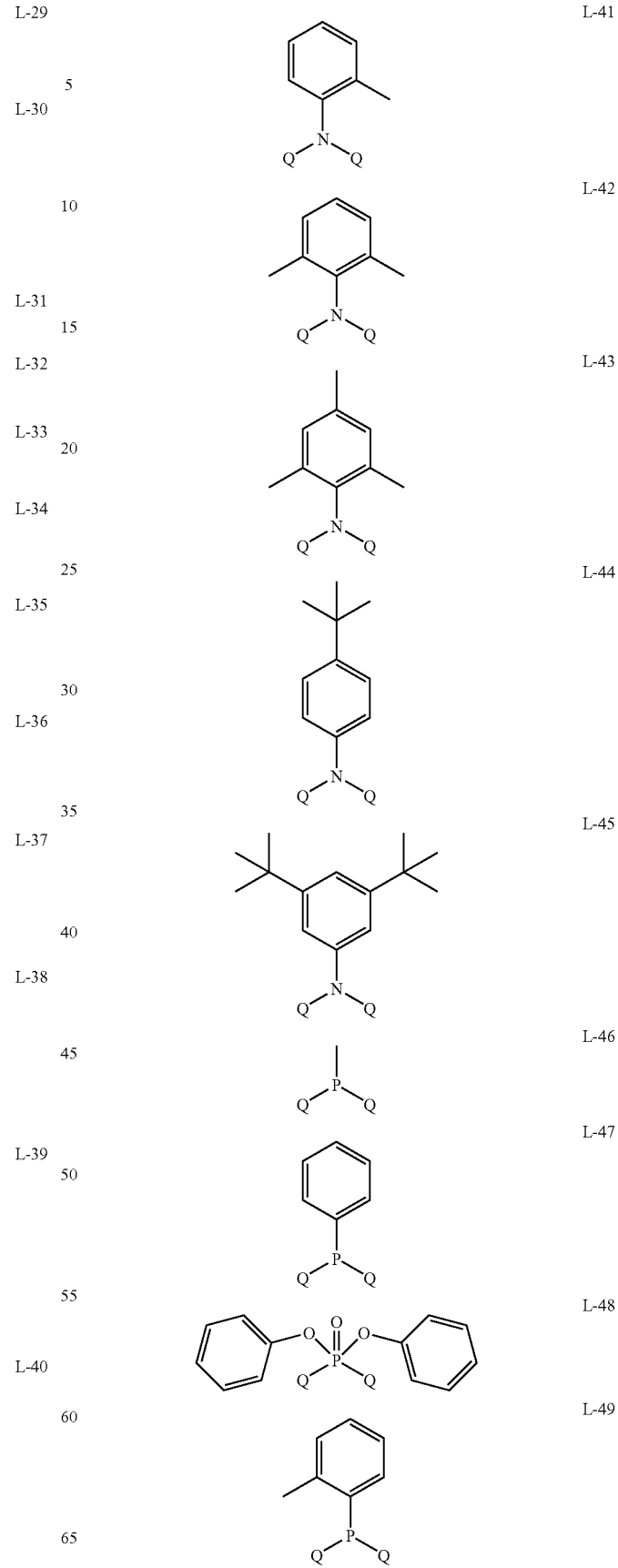

-continued
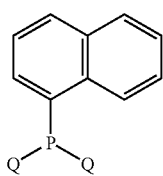
L-50
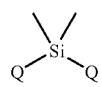
L-51
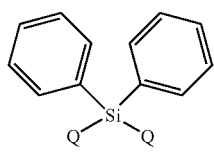
L-52
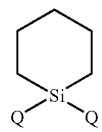
L-53
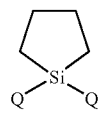
L-54
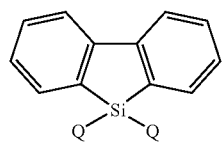
L-55
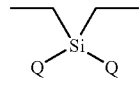
L-56
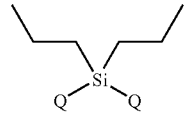
L-57
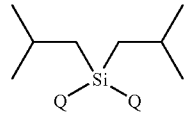
L-58
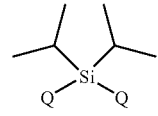
L-59
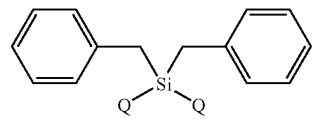
L-60
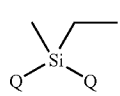
L-61
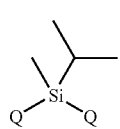
L-62
-continued
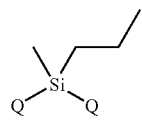
L-63
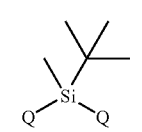
L-64
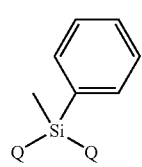
L-65
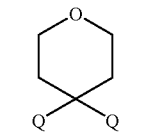
L-66
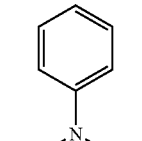
L-67
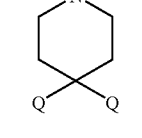
L-68
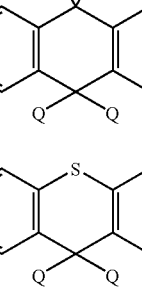
L-70
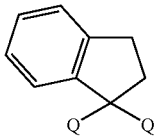
L-71
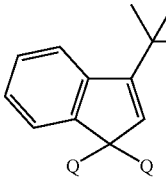
L-72

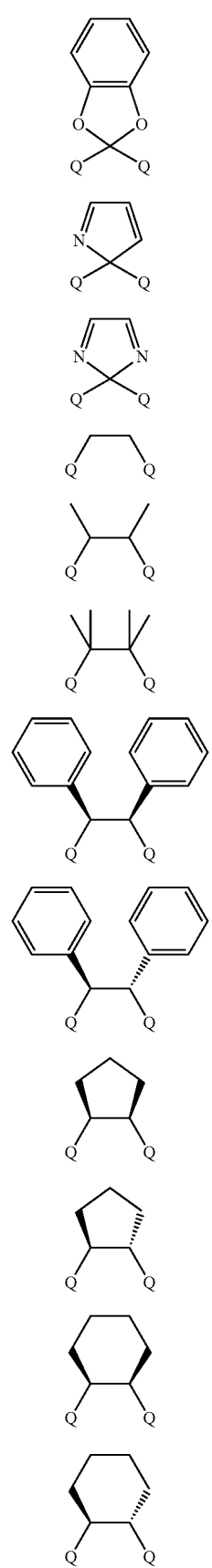
L-73
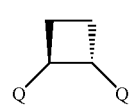
L-74
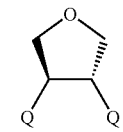
L-75
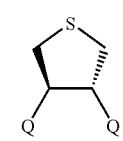
L-76
L-77
L-78
L-79
L-80
L-81
L-82
L-83
L-84
L-85 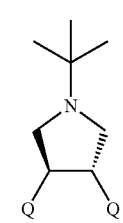
L-86 
L-87 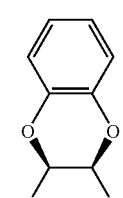
L-88 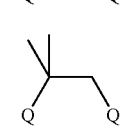
L-89 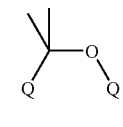
L-90 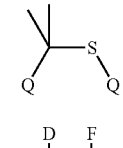
L-91 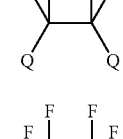
L-92 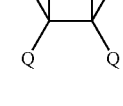
L-93
L-94
L-95

-continued
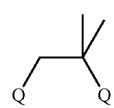 L-96
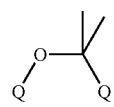 L-97
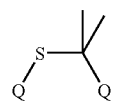 L-98
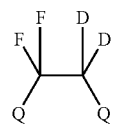 L-99
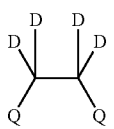 L-100
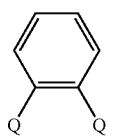 L-101
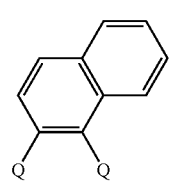 L-102
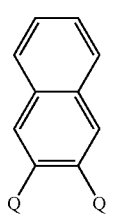 L-103
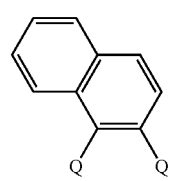 L-104
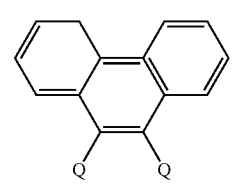 L-105
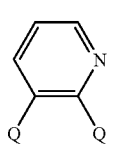 L-106
-continued
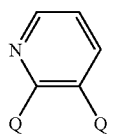 L-107
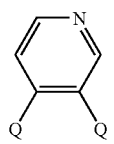 L-108
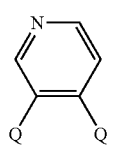 L-109
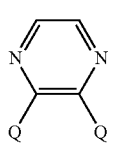 L-110
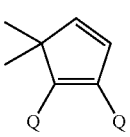 L-111
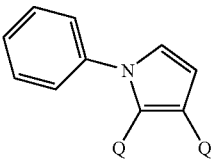 L-112
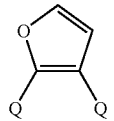 L-113
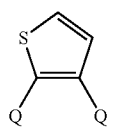 L-114
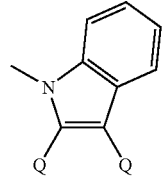 L-115
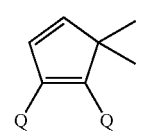 L-116
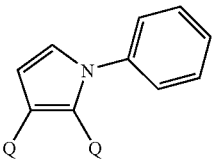 L-117

L-118 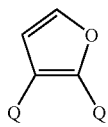

L-119 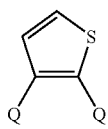

L-120 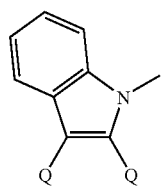

L-121 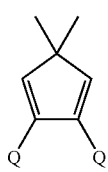

L-122 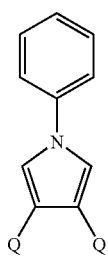

L-123 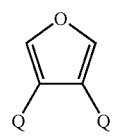

L-124 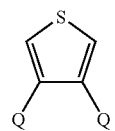

L-125 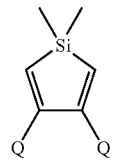

The compound represented by the formula (1) according to the invention can be expressed by any of combinations 1 to 3 of the partial structure groups corresponding to $Q^A$, $Q^B$, $Q^C$ and $Q^D$ shown in Table 1 in the formula (I).

TABLE 1

|  | $Q^A$ | $Q^B$ | $Q^C$ | $Q^D$ |
| --- | --- | --- | --- | --- |
| Combination 1 | QB61CC | QT60CN | QT60CN | QB51CC |
| Combination 2 | QB61CC | QT60CN | QT60CN | QB51CN |
| Combination 3 | QB61CC | QT60CN | QT60CN | QB51NC |

Preferred specific examples of the metal complex represented by the formula (1) will be given below, but it should not be construed that the invention is limited thereto.

In this specification, the "compound number described in metal species—compound example" is used as the compound number. For example, in the case where the compound number described in the compound example is "1", and the metal species is "platinum", the compound is expressed as "Pt-1".

1

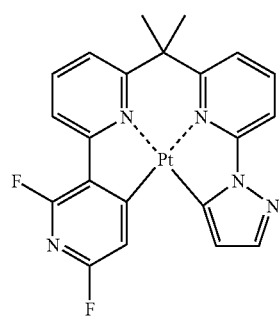

2

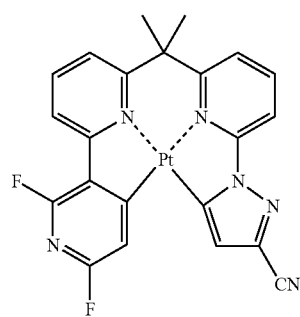

-continued
3
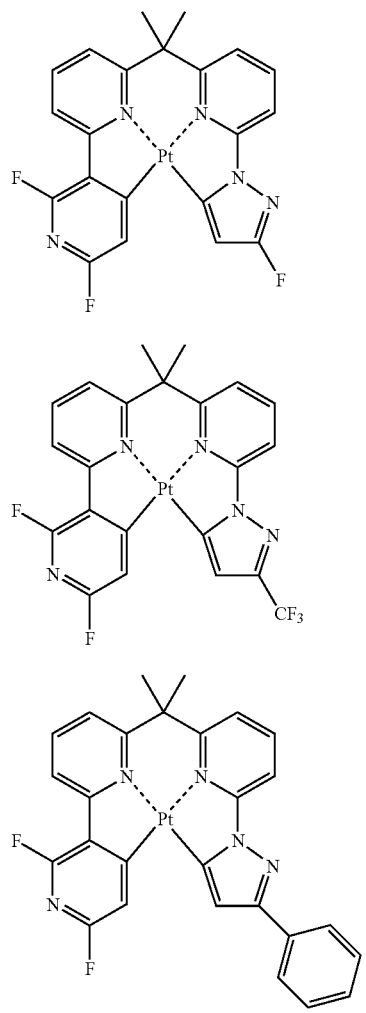
4
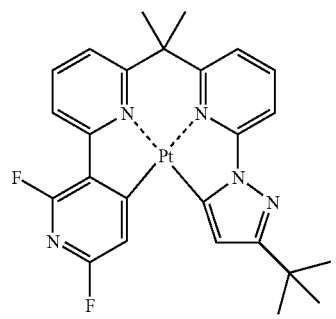
5
6
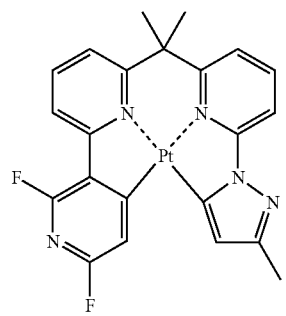
7
8
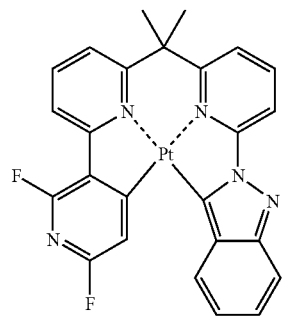
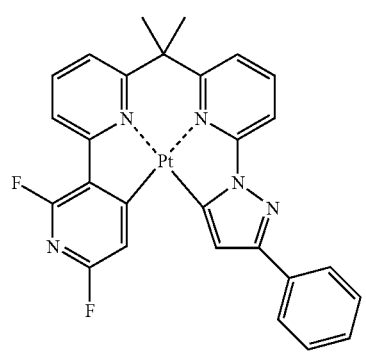
9
10
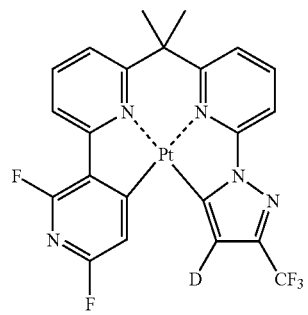
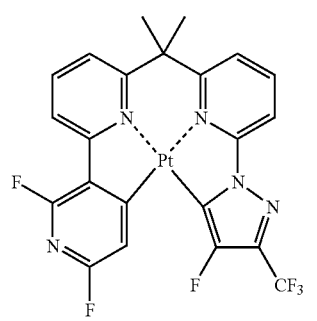
11
12
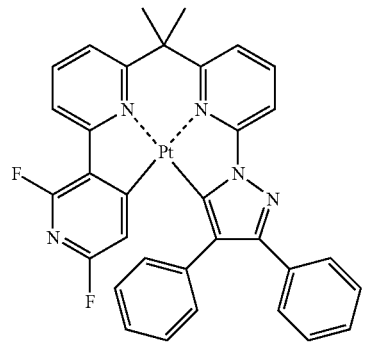
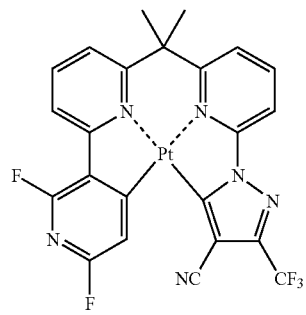

-continued
13 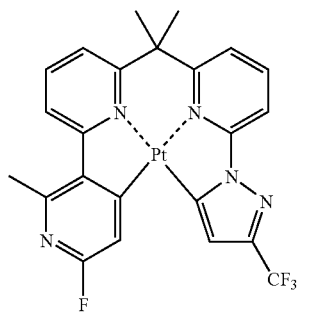
14 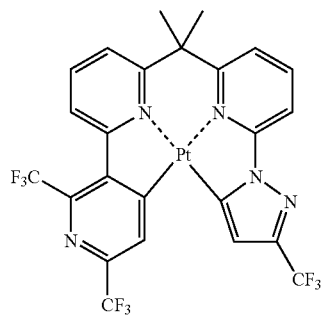
15
16 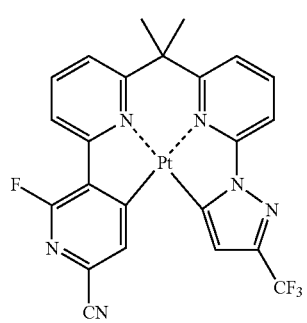
17
18 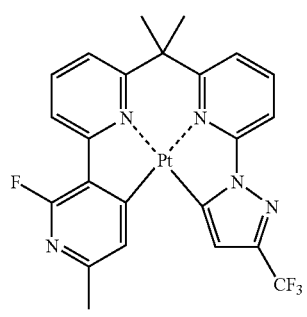
19
20 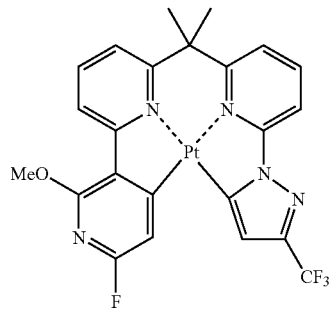
21
22 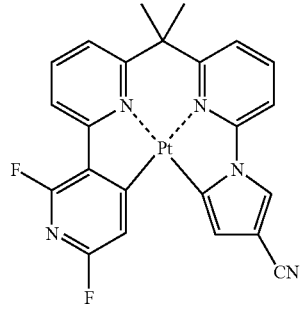

-continued
23
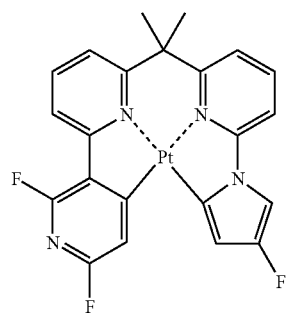
24
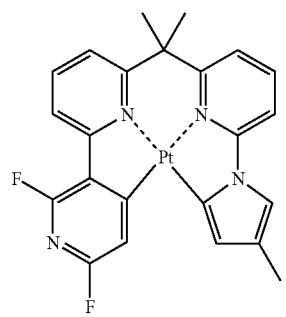
25
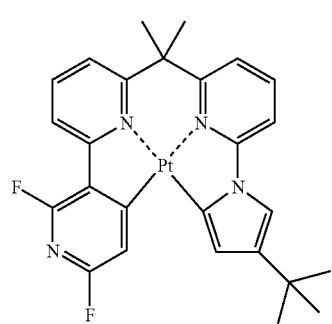
26
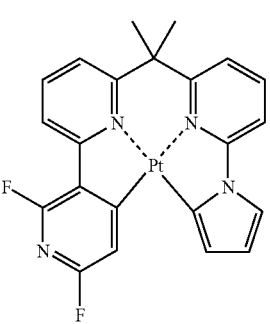
27
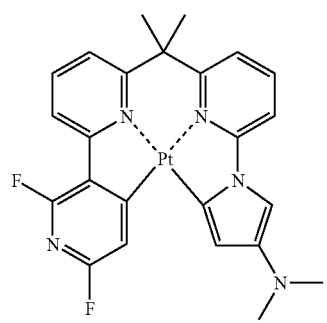
28
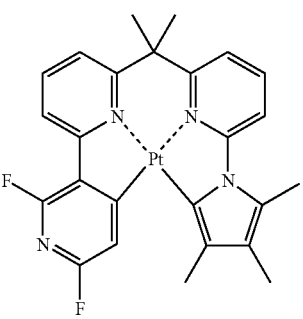
29
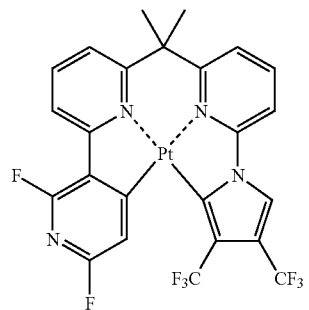
30
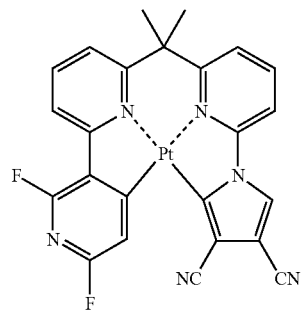
31
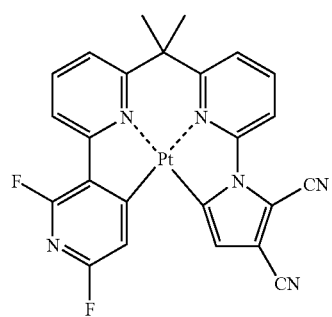
32
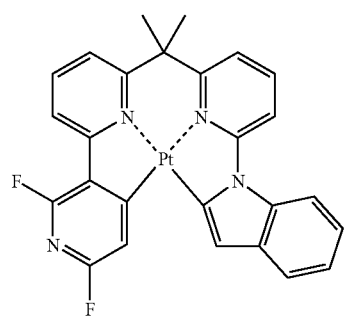

-continued
| | |
|---|---|
| 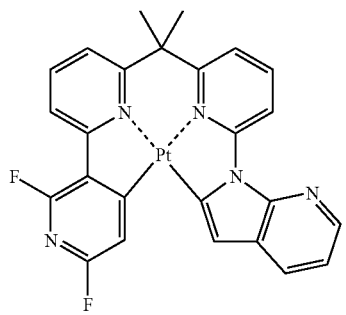 33 | 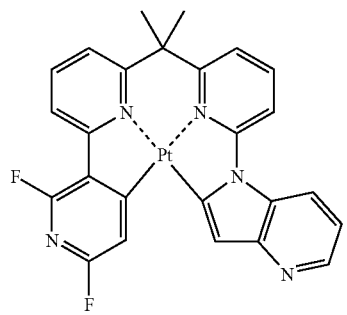 34 |
| 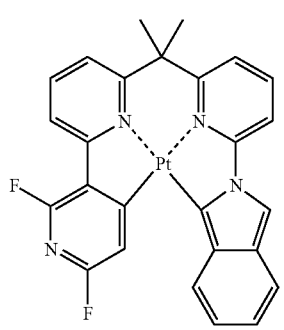 35 | 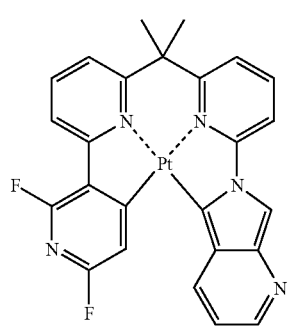 36 |
| 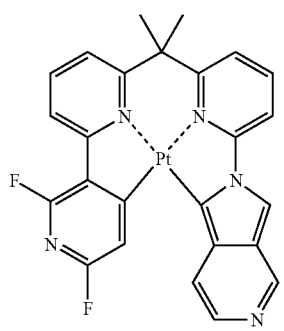 37 | 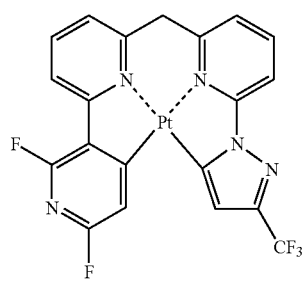 38 |
| 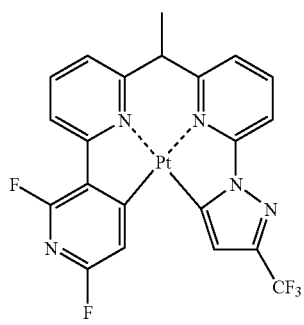 39 | 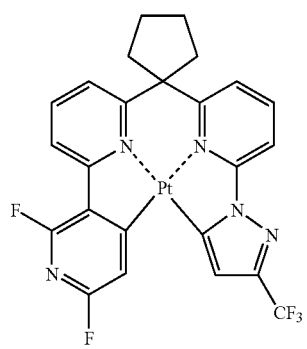 40 |

-continued
41
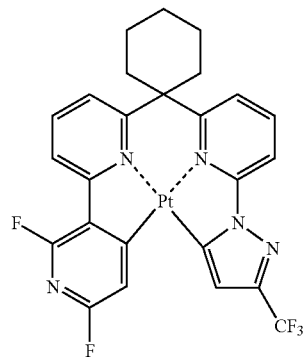
42
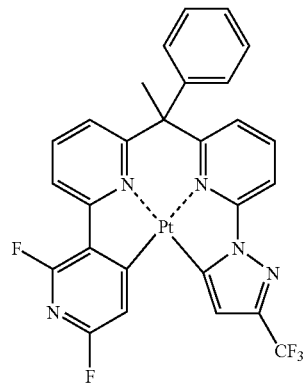
43
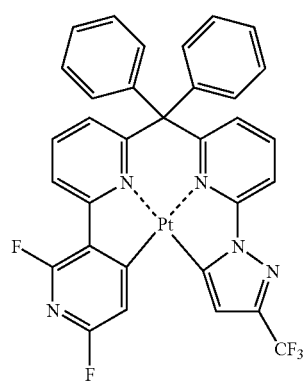
44
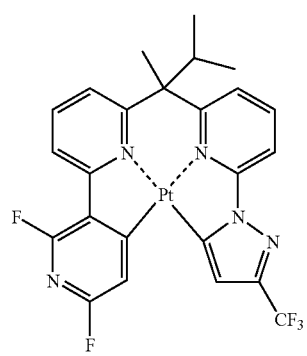
45
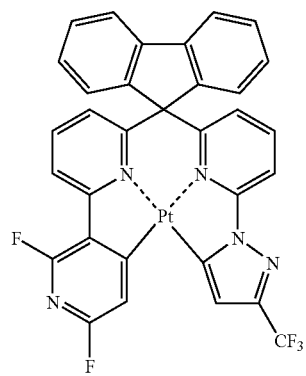
46
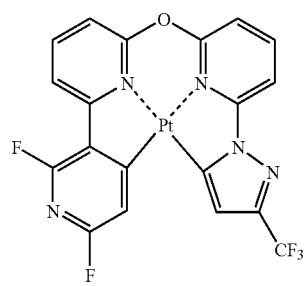
47
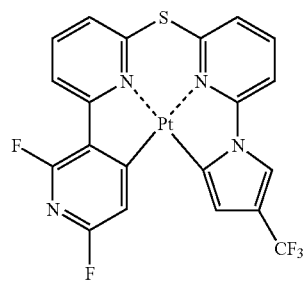
48
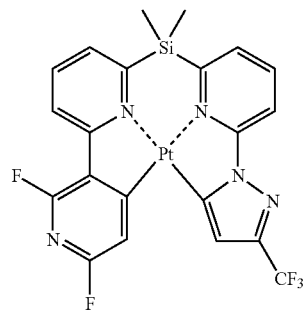

-continued
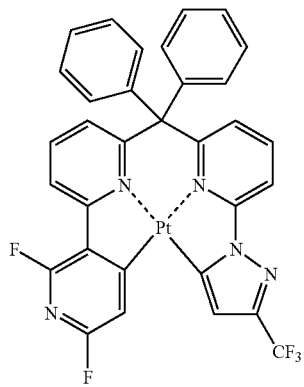
49
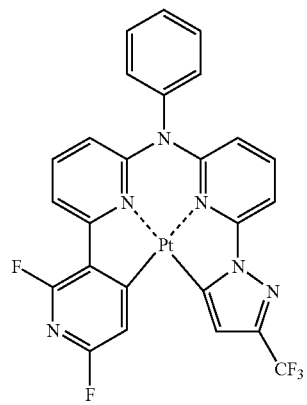
50
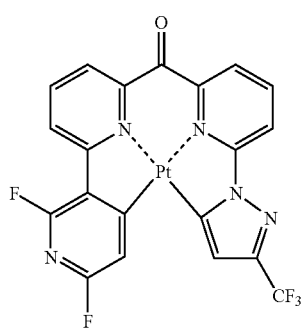
51
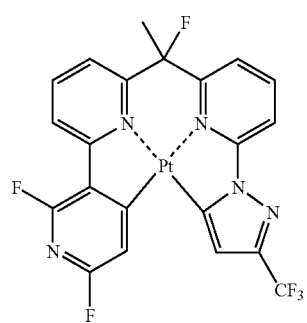
52
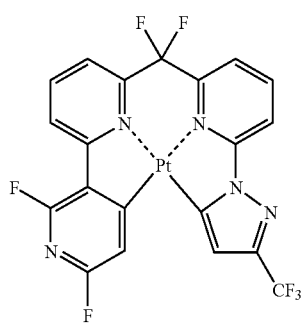
53
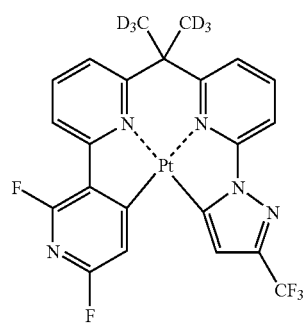
54
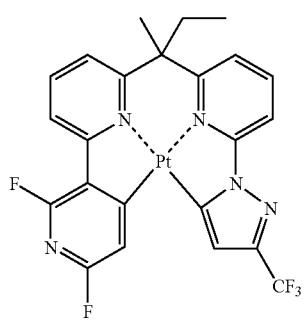
55
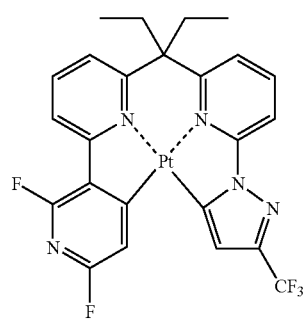
56

57
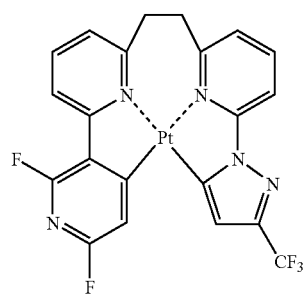
58
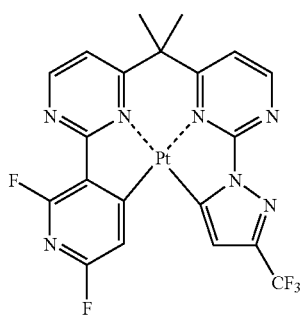
59
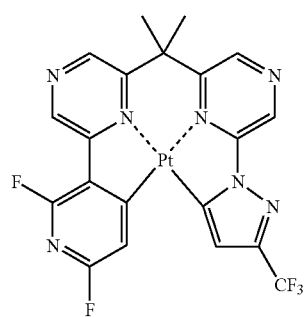
60
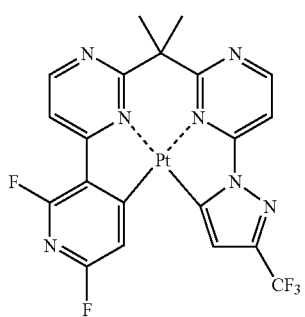
61
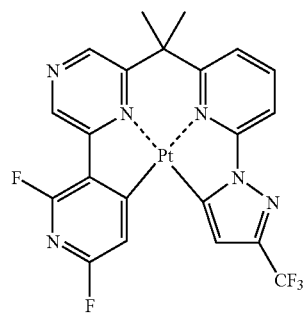
62
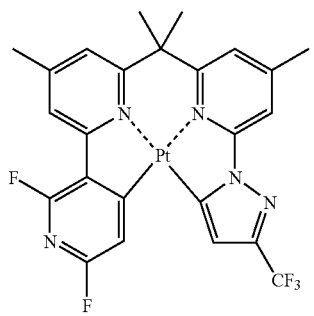
63
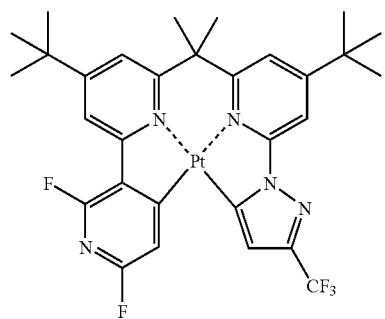
64
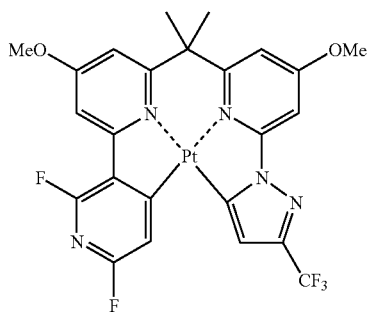
65
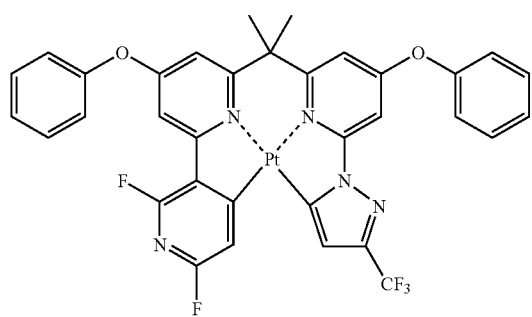
66
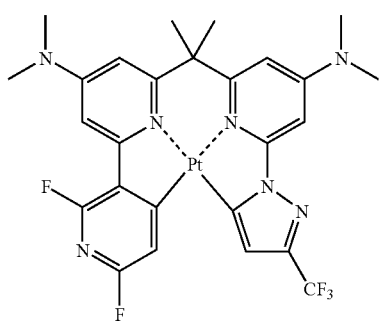

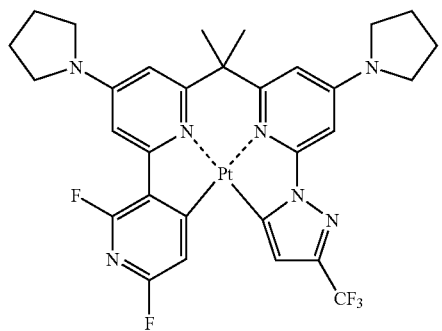 67
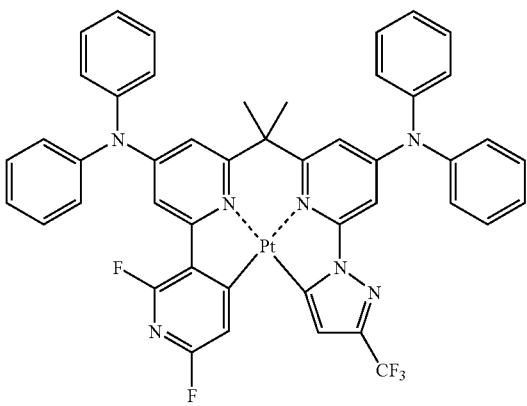 68
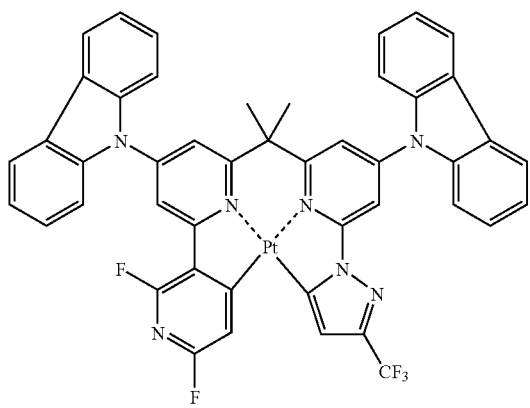 69
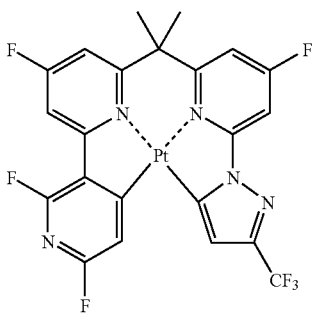 70
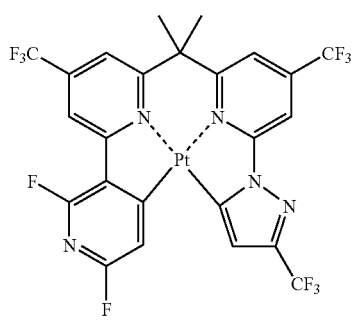 71
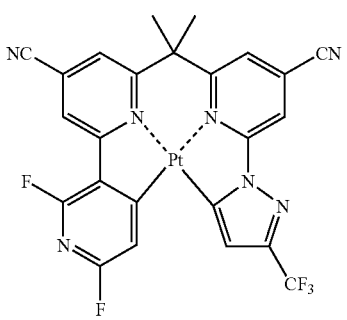 72
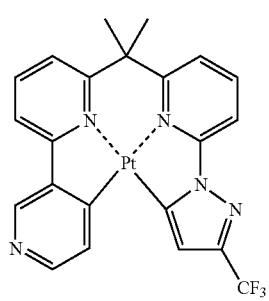 73
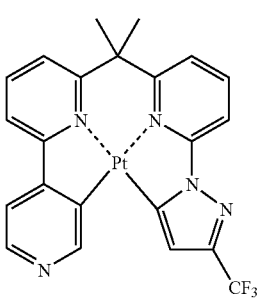 74

-continued
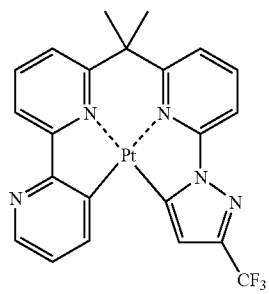
75
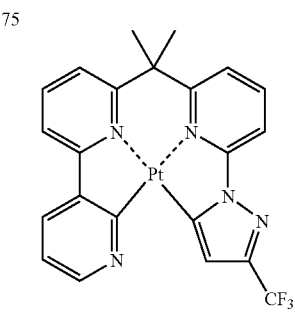
76
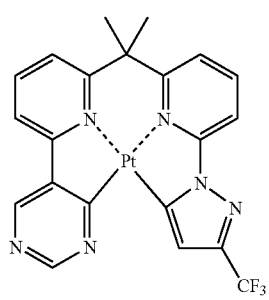
77
78
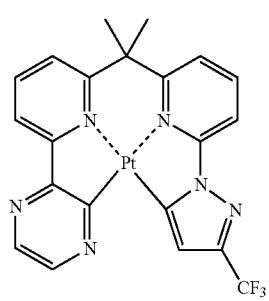
79
80
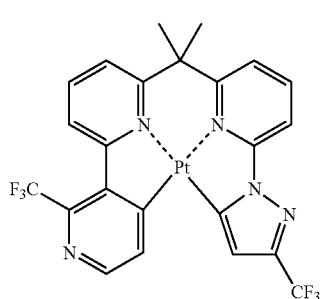
81
82
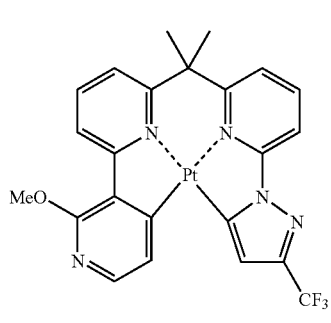
83
84

-continued
85
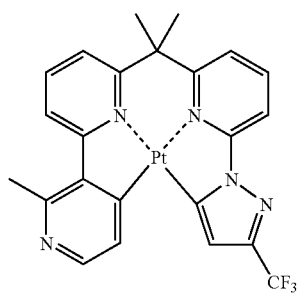
86
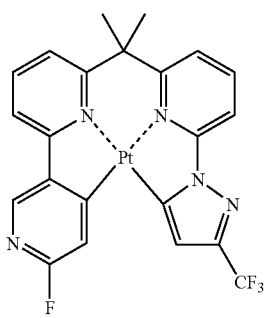
87
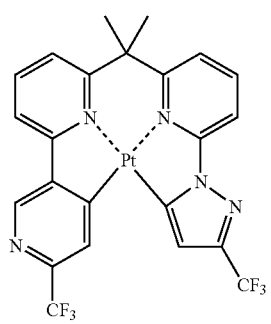
88
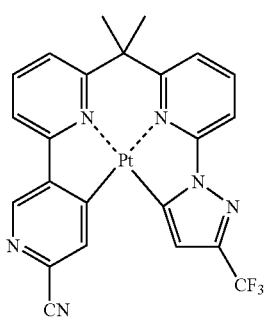
89
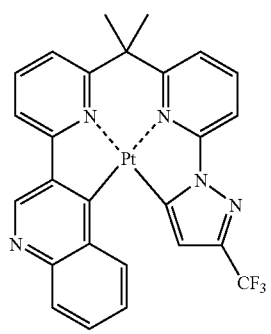
90
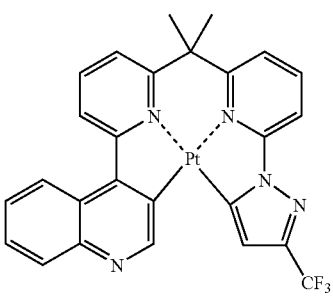
91
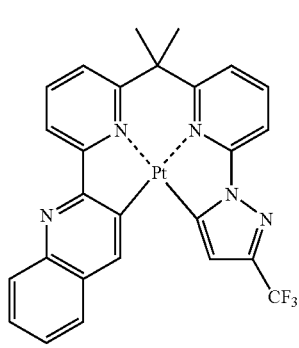
92
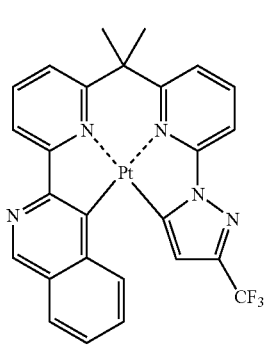
93
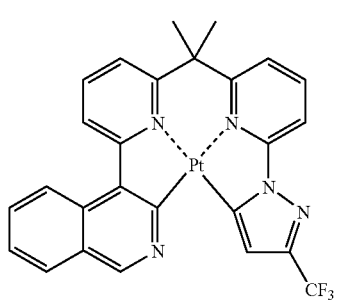
94
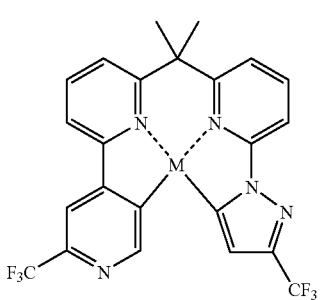

-continued
95
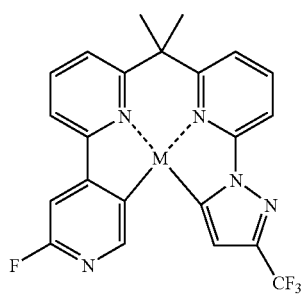
96
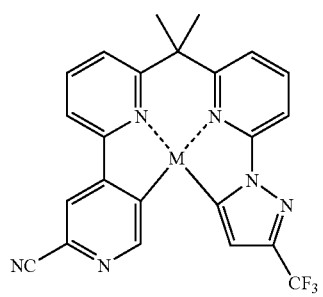
97
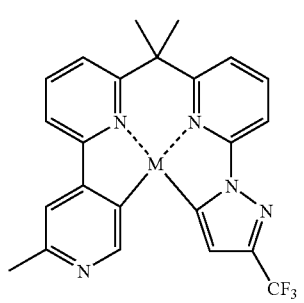
98
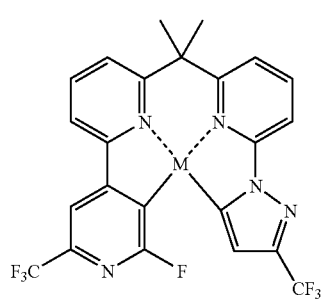
99
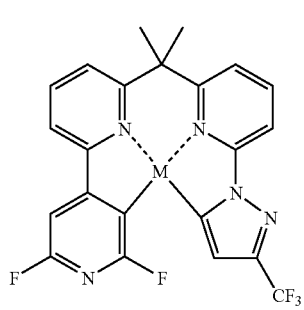
100
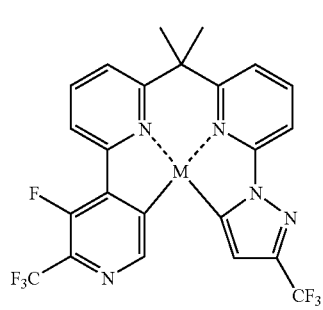
102
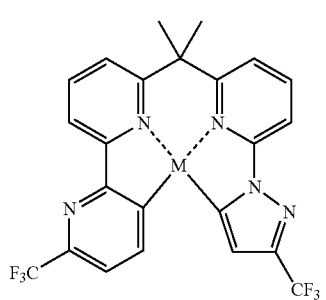
103
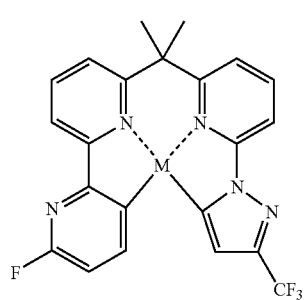
104
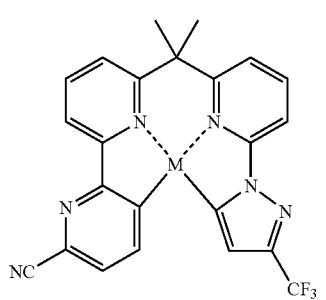
105
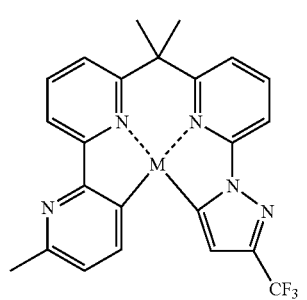

-continued
106
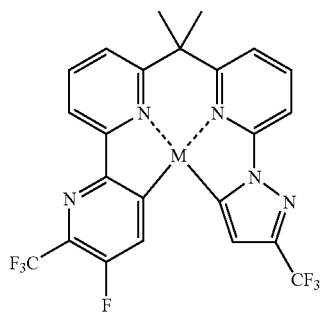
107
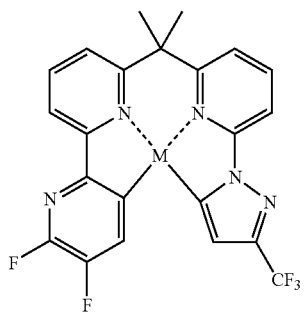
108
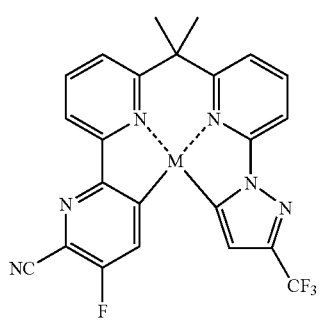
109
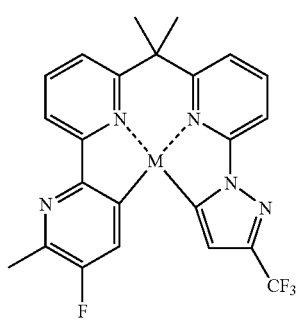
110
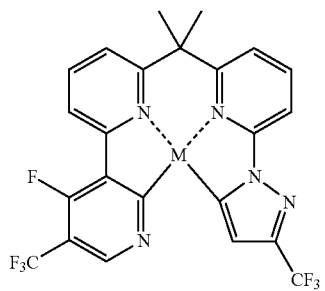
111
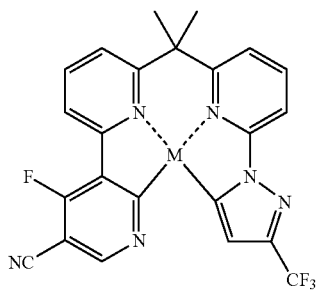
112
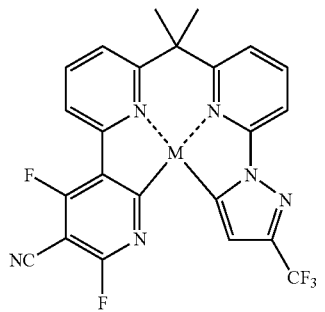
113
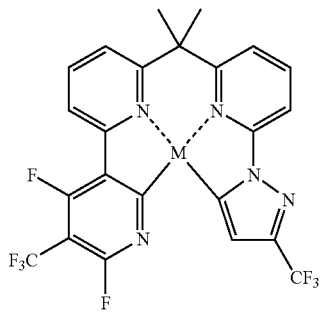
114
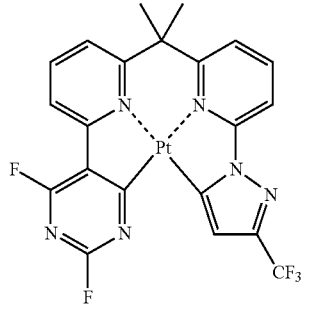
115
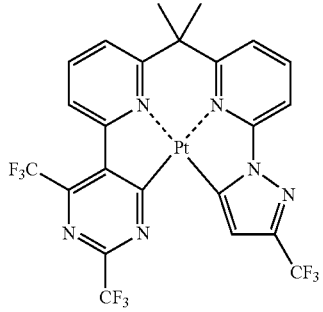

-continued
116 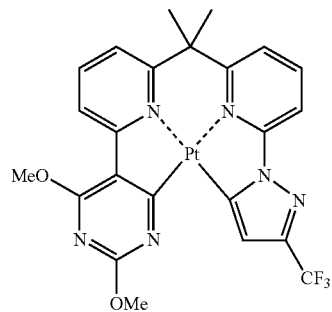
117 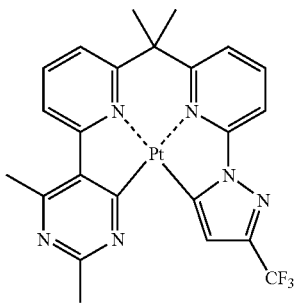
118 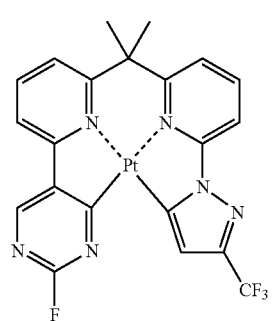
119 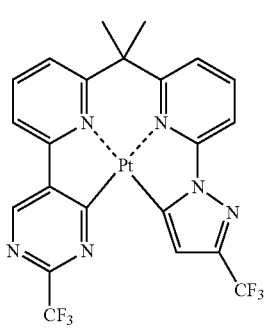
120 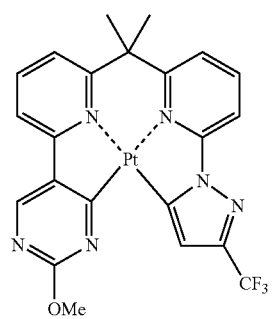
121 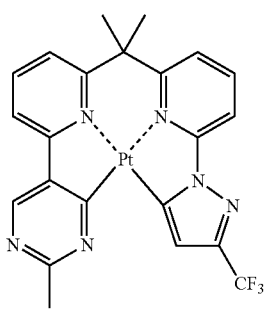
122 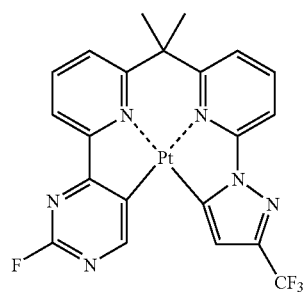
123 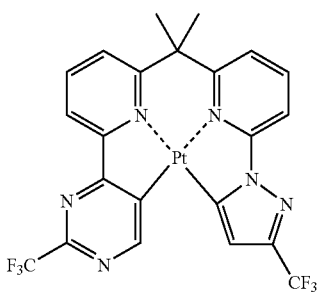
124 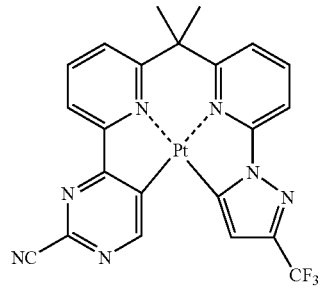
125 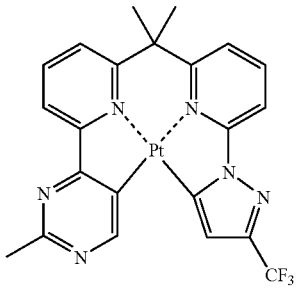

-continued
126
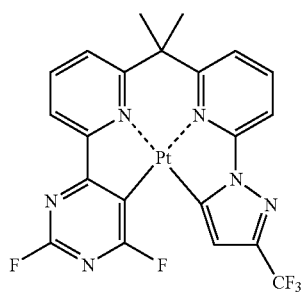
127
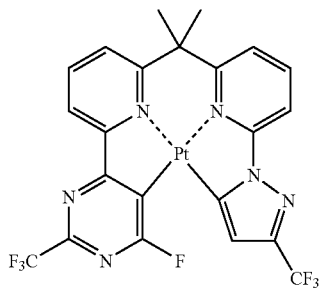
128
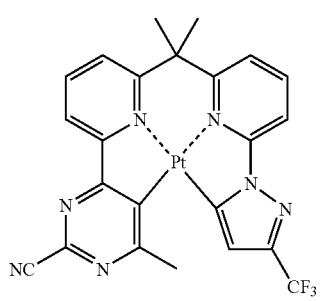
129
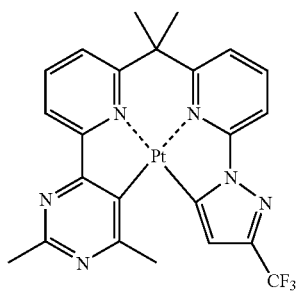
130
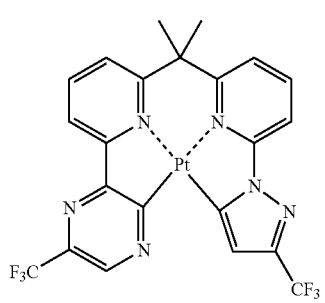
131
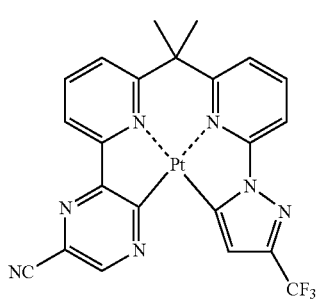
132
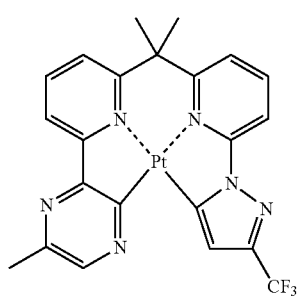
133
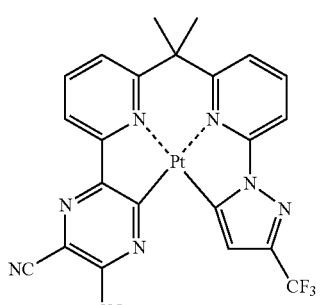
134
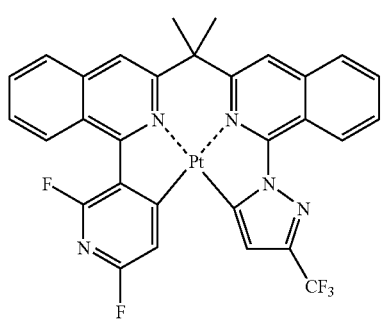
135
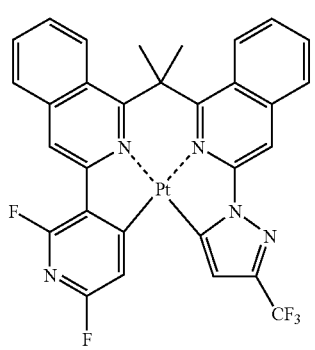

-continued
136
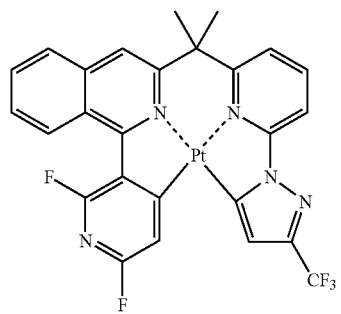
137
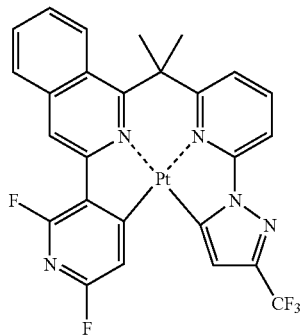
138
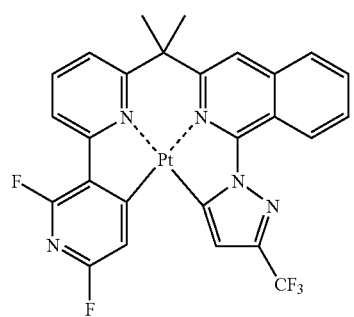
139
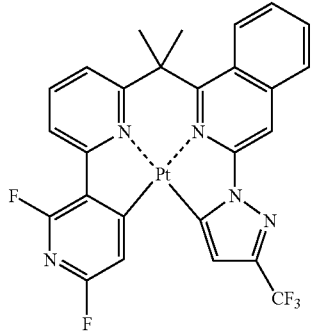
140
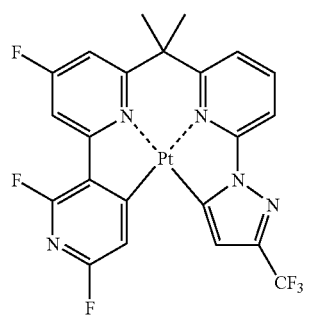
141
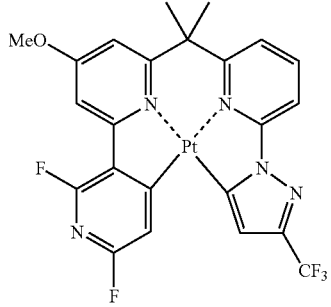
142
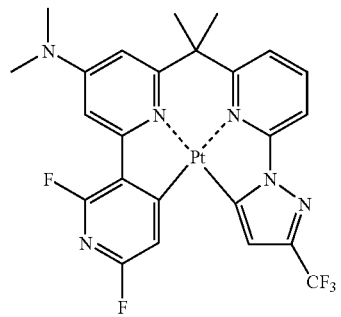
143
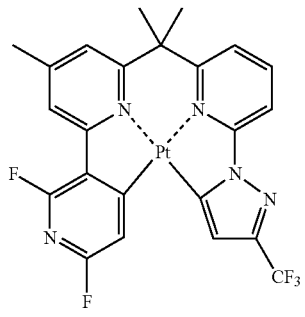
144
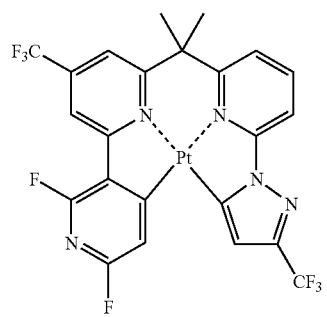
145
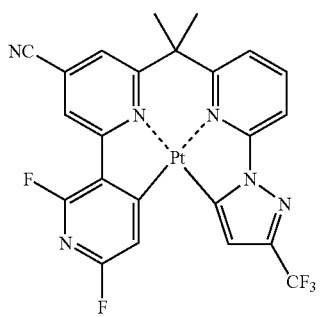

-continued
146
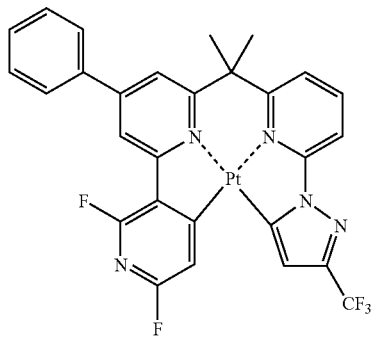
147
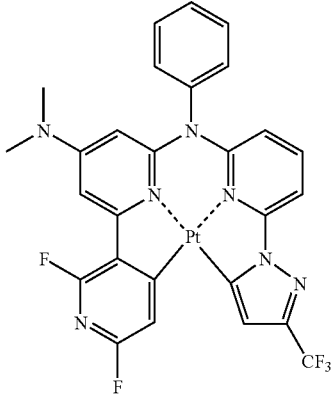
148
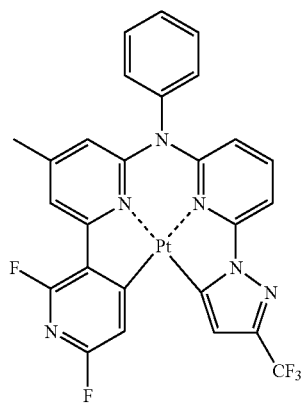
149
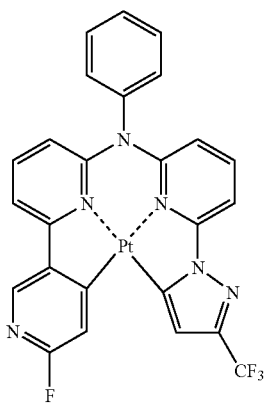
150
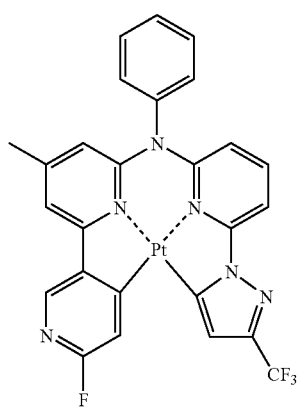
151
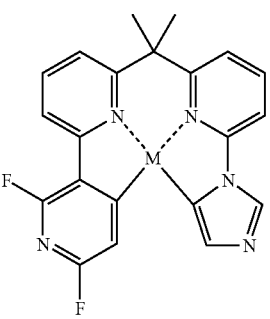
152
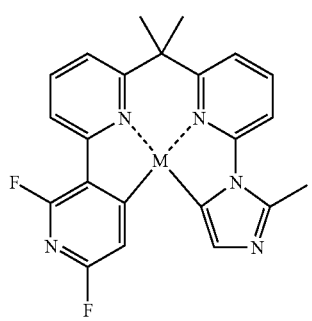
153
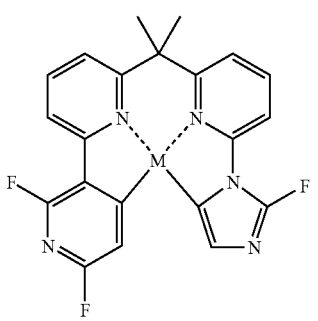

-continued
154
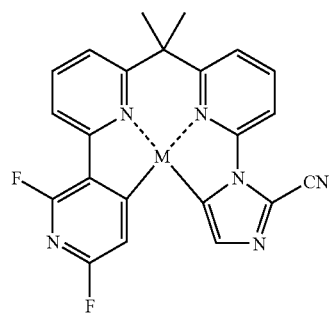
155
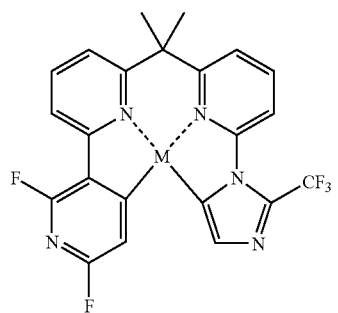
156
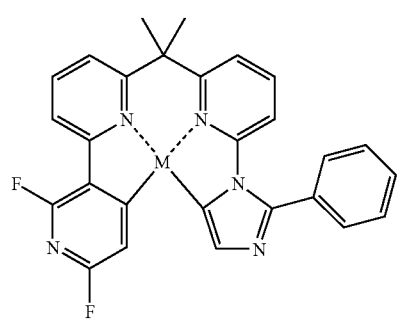
157
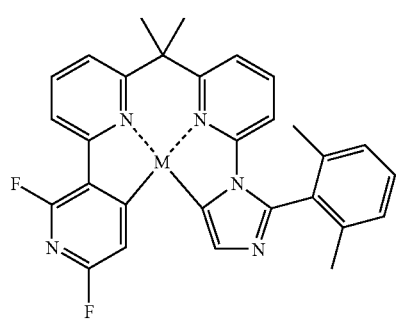
158
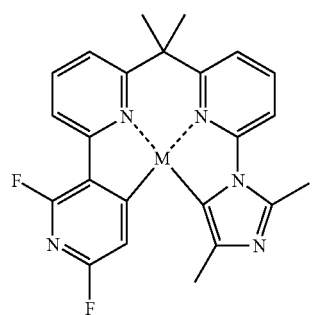
159
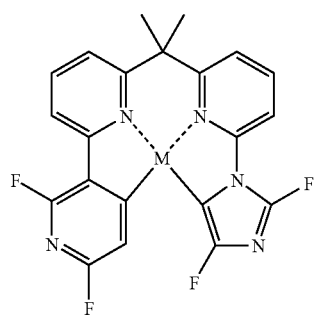
160
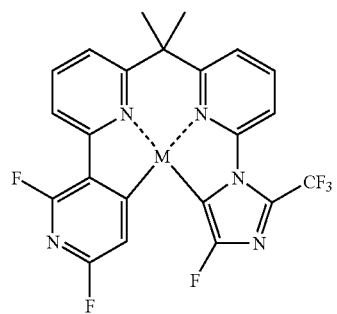
161
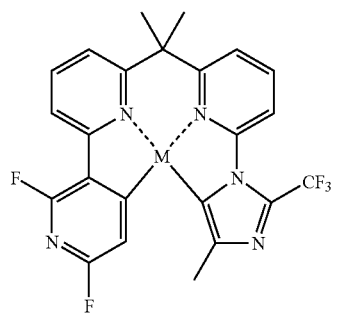
162
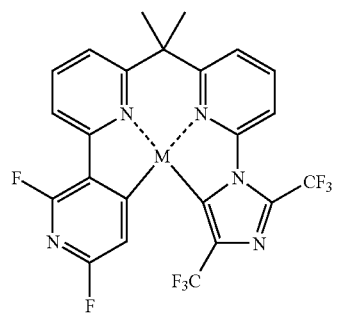
163
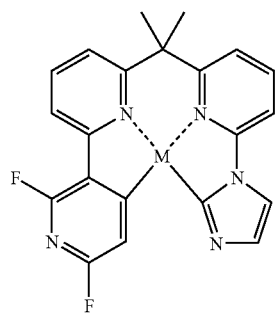

164
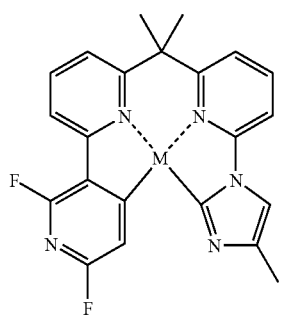
165
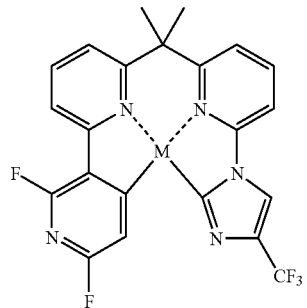
166
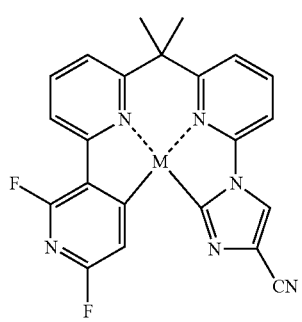
167
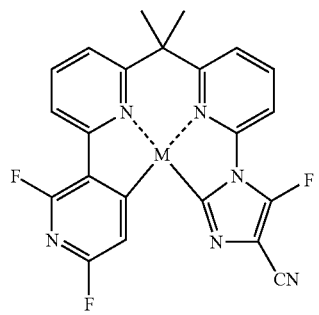
168
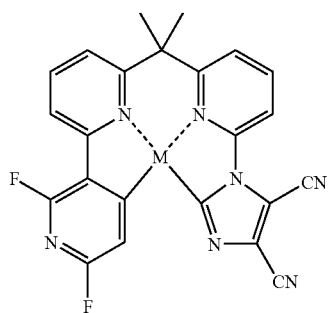
169
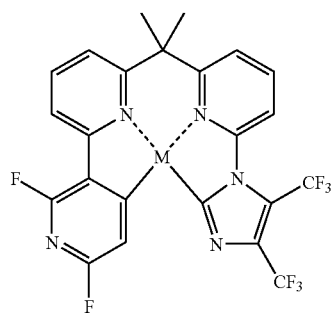
170
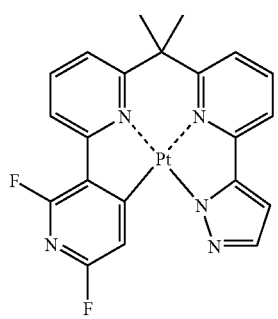
171
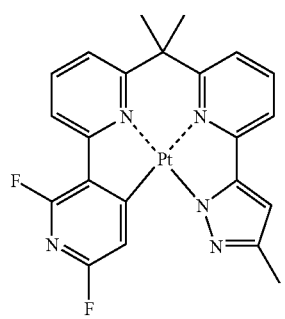
172
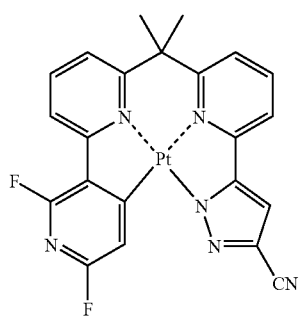
173
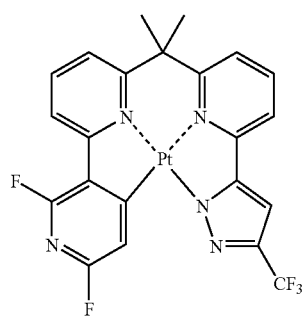

-continued
| | |
|---|---|
| 174 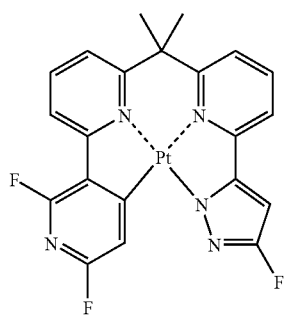 | 175 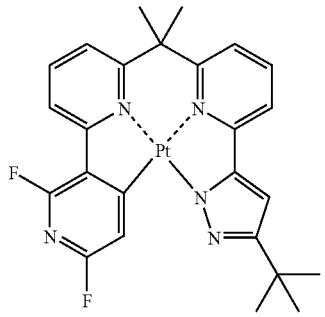 |
| 176 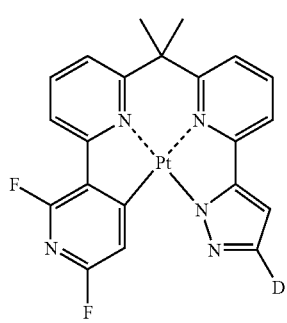 | 177 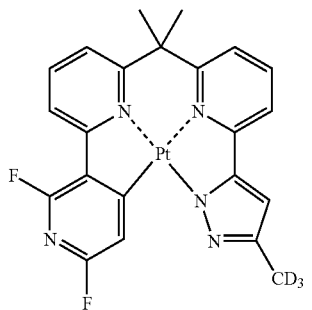 |
| 178 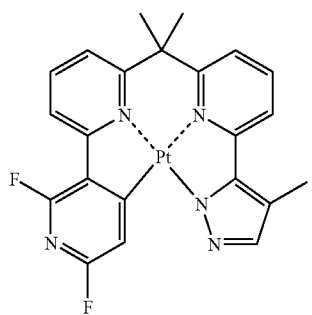 | 179 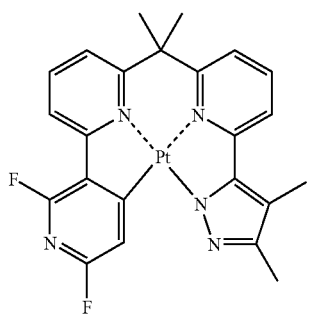 |
| 180 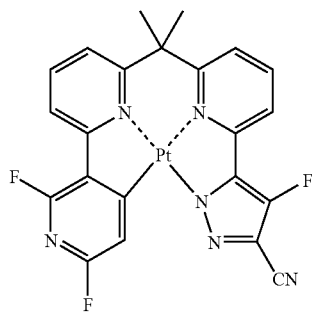 | 181 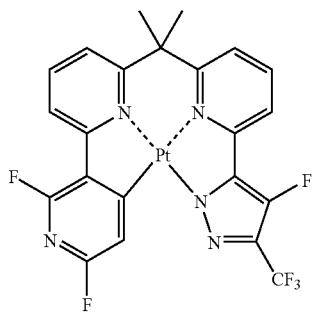 |
| 182 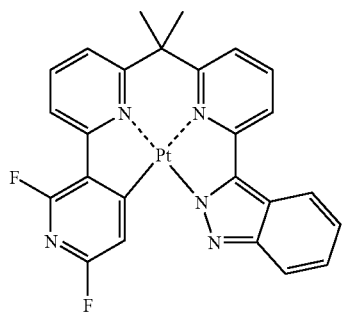 | 183 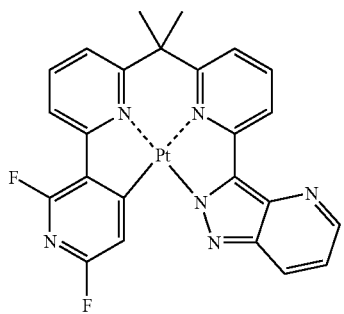 |

-continued
| | |
|---|---|
| 184 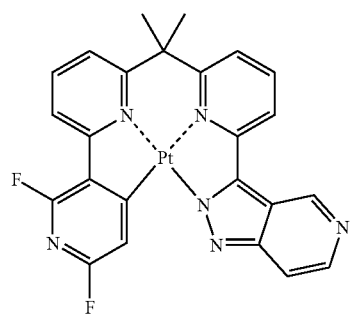 | 185 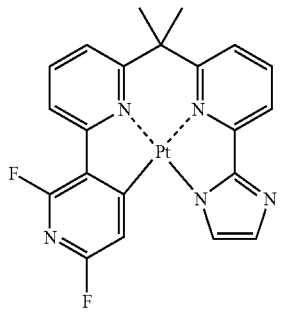 |
| 186 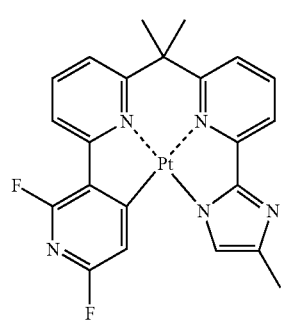 | 187 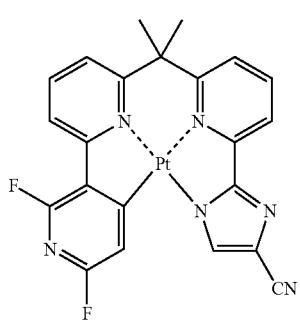 |
| 188 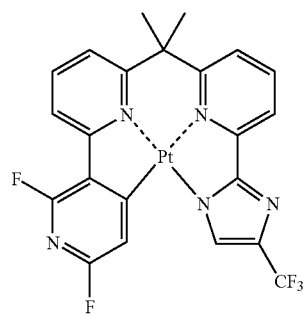 | 189 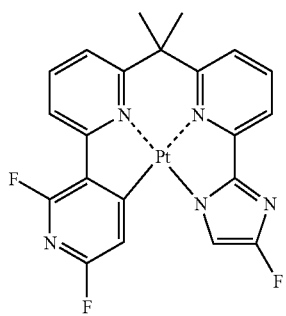 |
| 190 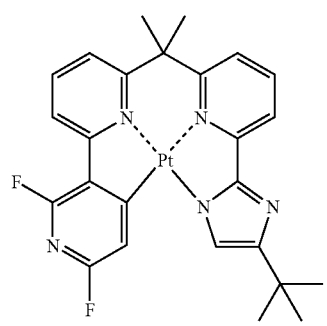 | 191 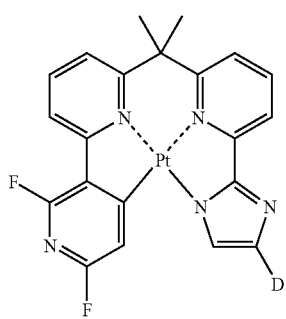 |
| 192 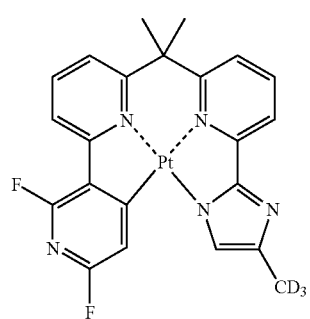 | 193 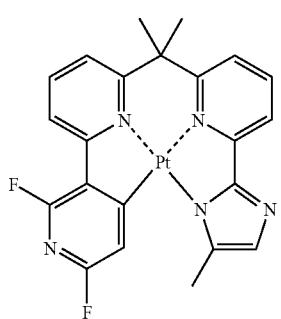 |

-continued
193
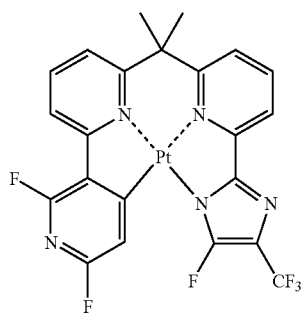
194
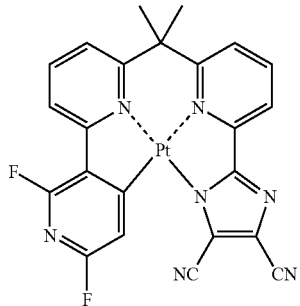
195
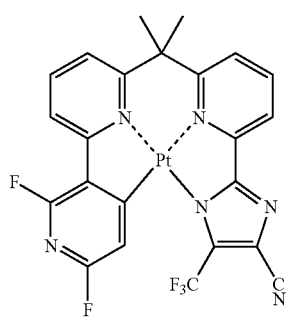
196
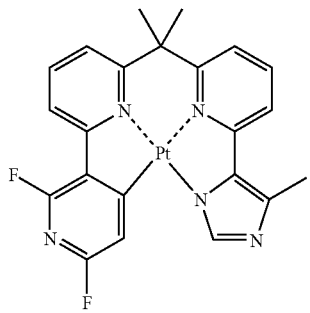
197
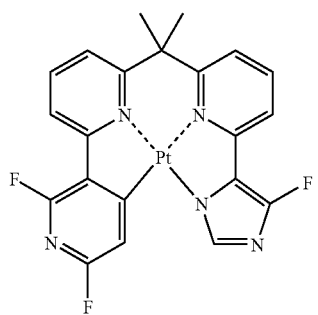
198
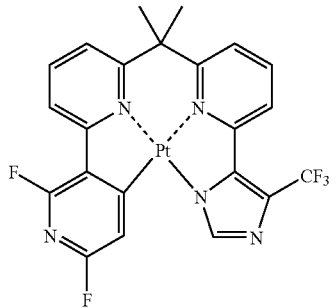
199
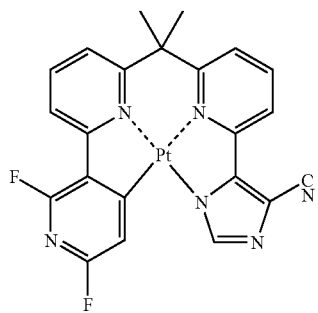
200
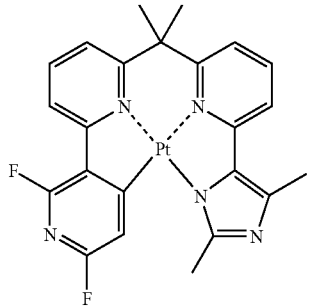
201
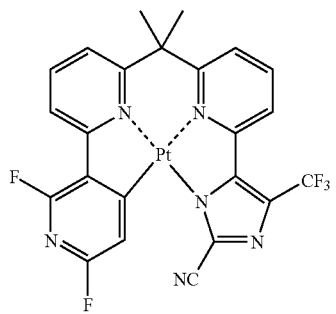
202
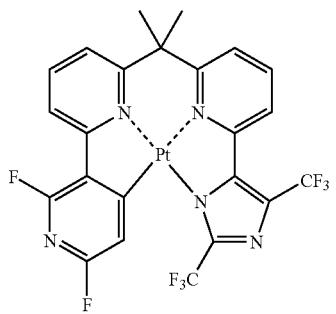
203

204
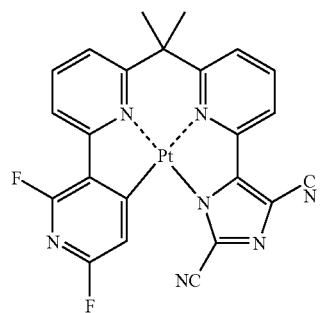
205
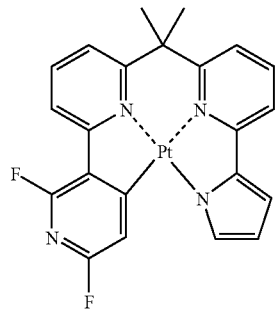
206
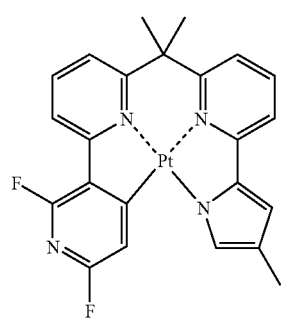
207
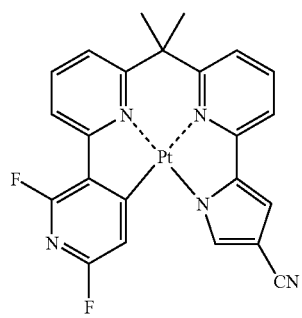
208
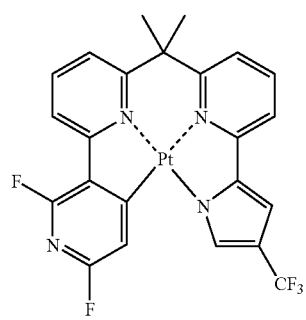
209
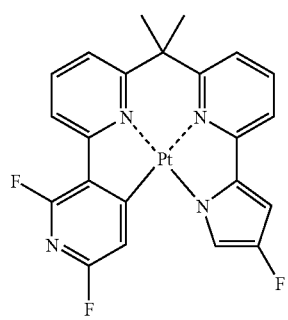
210
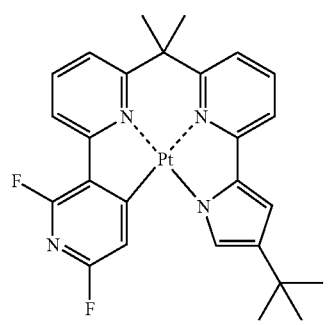
211
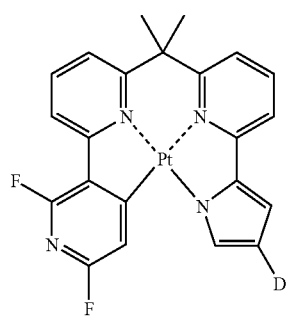
212
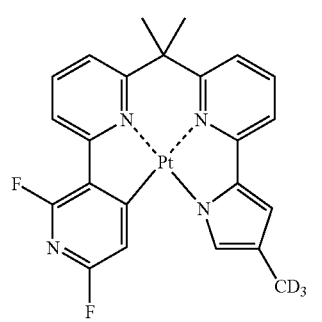
213
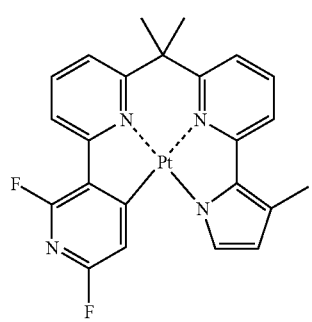

-continued
| | |
|---|---|
| 214 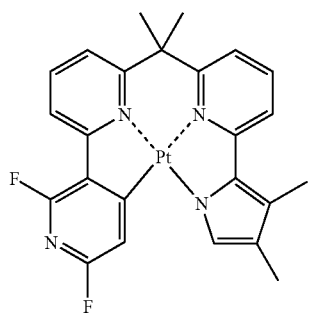 | 215 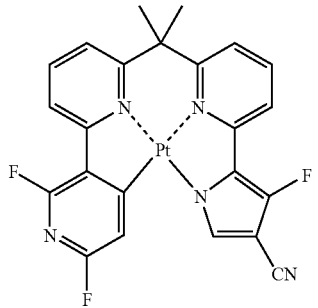 |
| 216 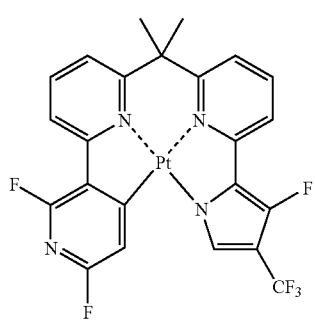 | 217 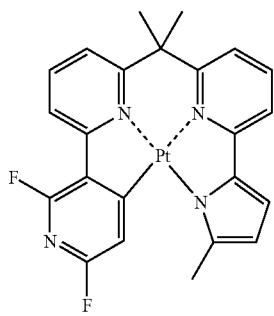 |
| 218 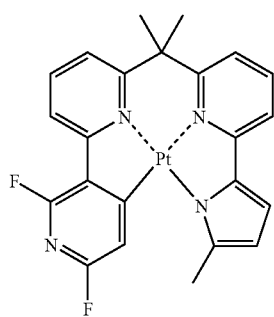 | 219 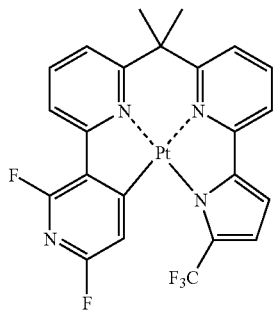 |
| 220 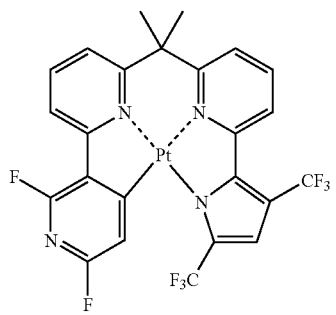 | 221 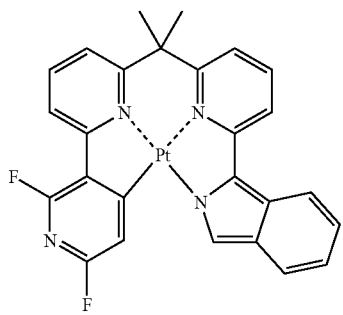 |
| 222 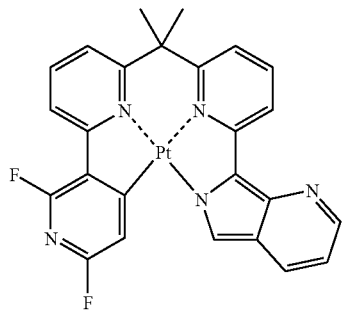 | 223 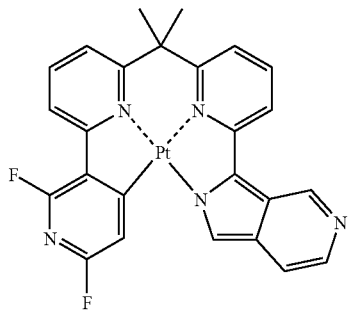 |

-continued
224
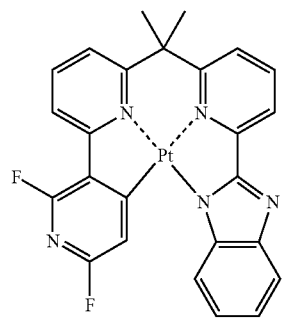
225
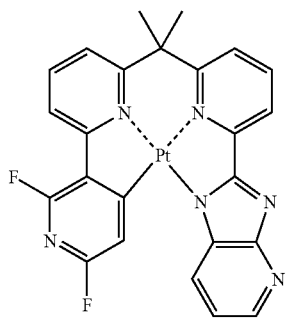
226
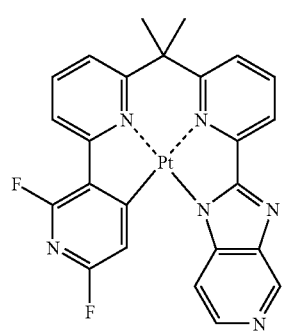
227
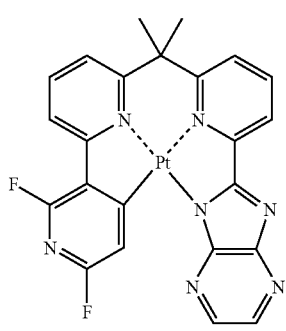
228
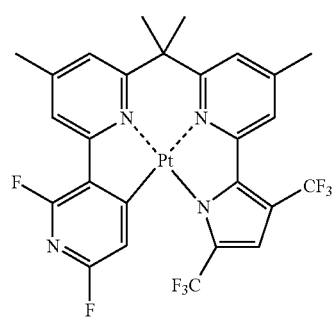
229
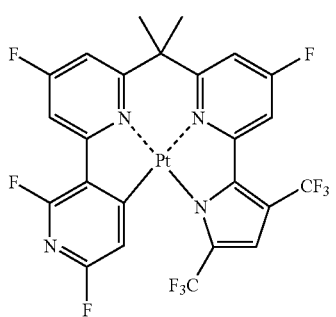
230
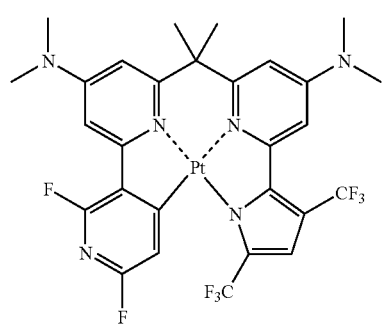
231
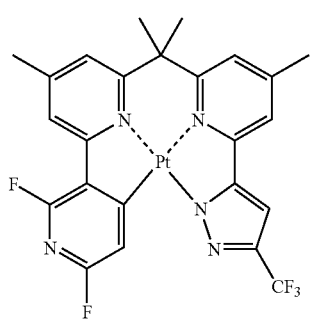
232
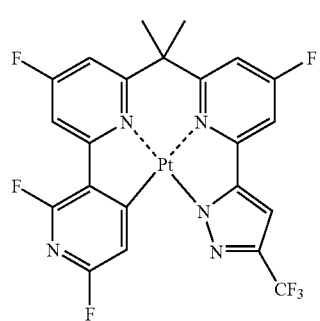
234
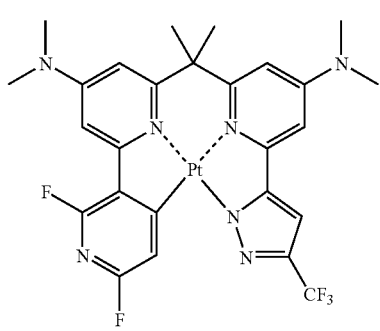

-continued
235 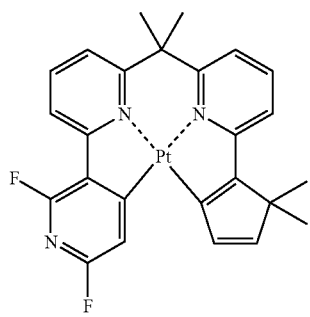 236 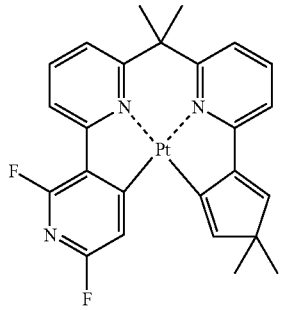
237 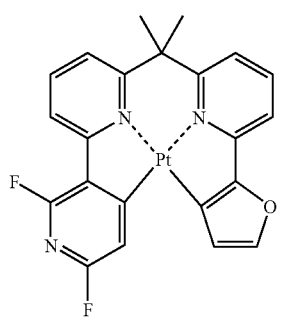 238 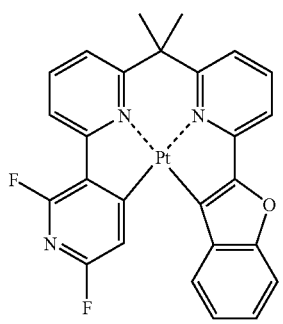
239 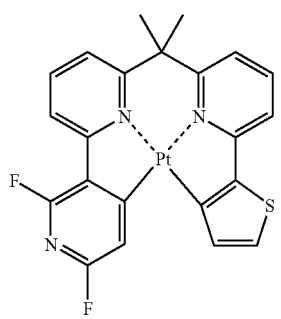 240 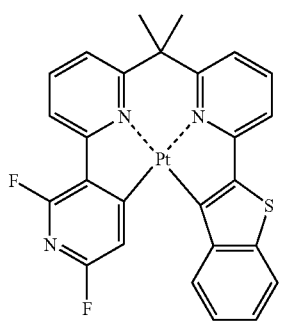
241 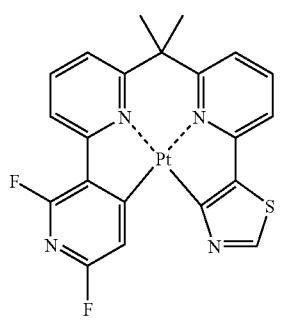 242 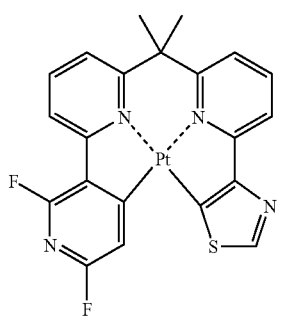
243 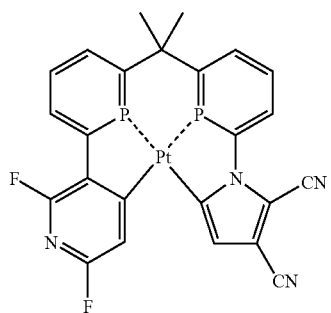 244 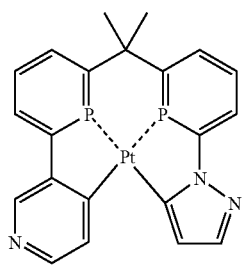

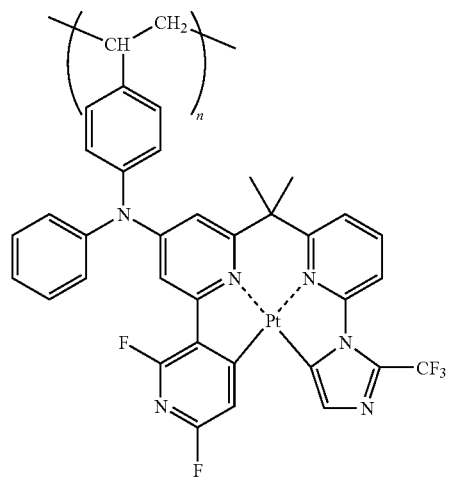
n: Natural number
245
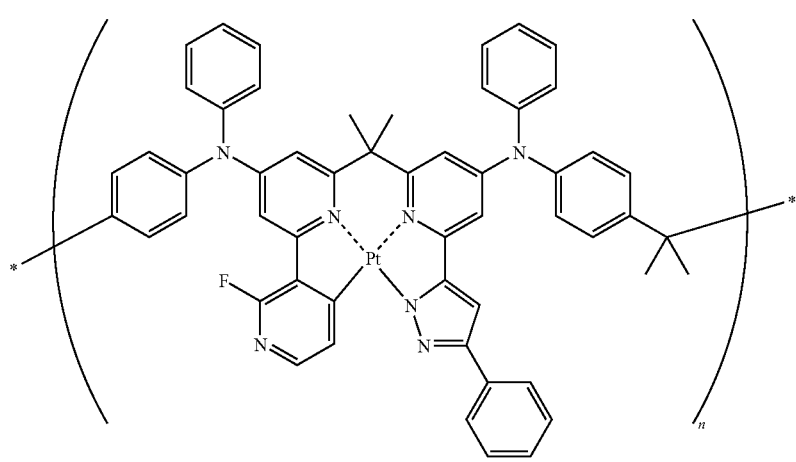
n: Natural number
246
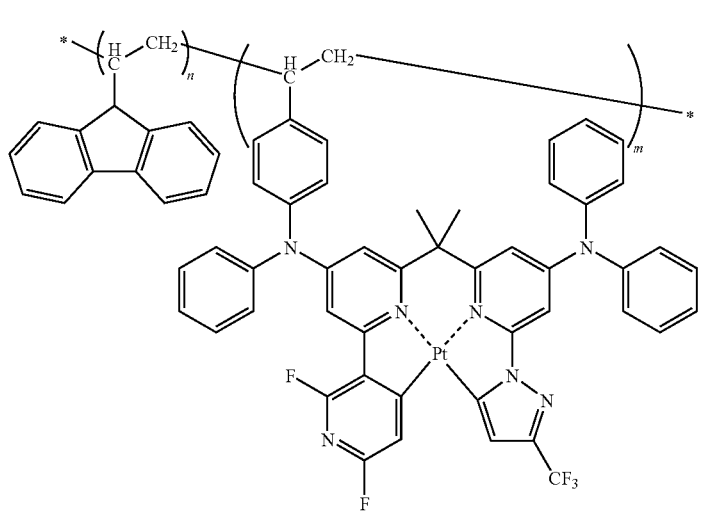
n, m: Natural number
247

248
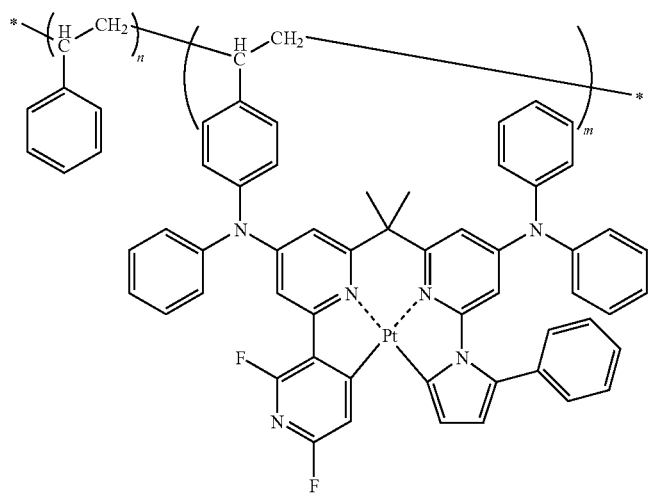
n, m: Natural number
249
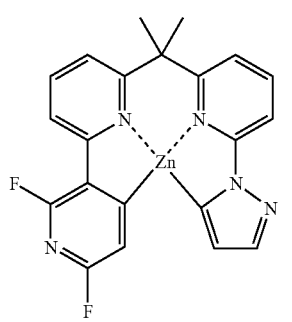
250
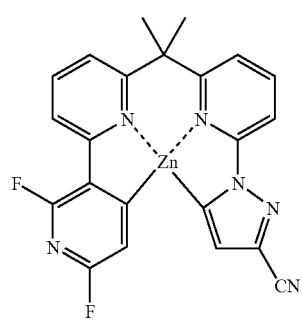
251
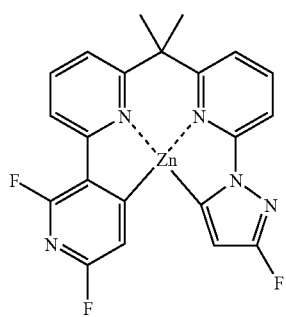
252
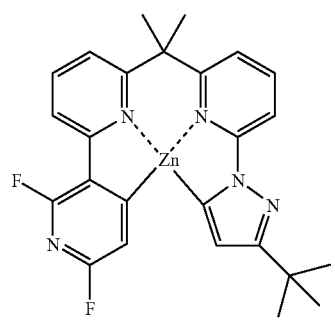
253
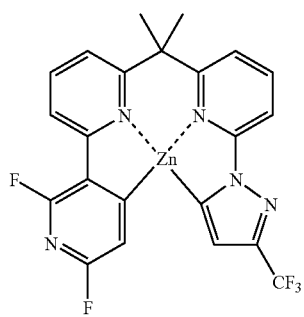
254
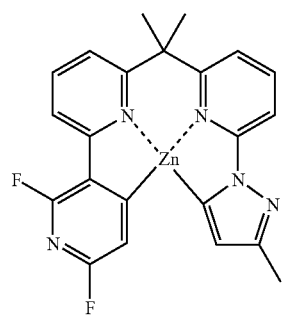

-continued
| 255 | 256 |
|---|---|
| 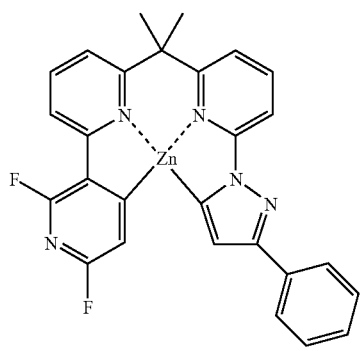 | 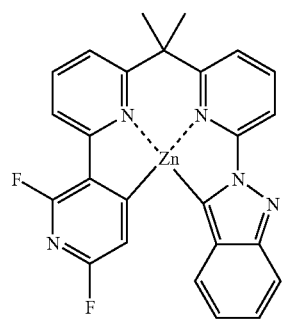 |
| 257 | 258 |
| 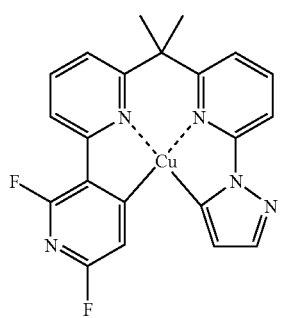 | 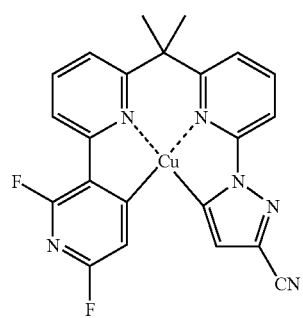 |
| 259 | 260 |
| 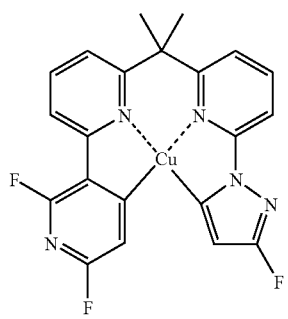 | 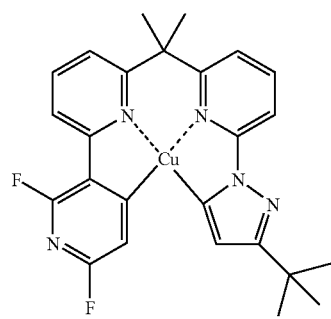 |
| 261 | 262 |
| 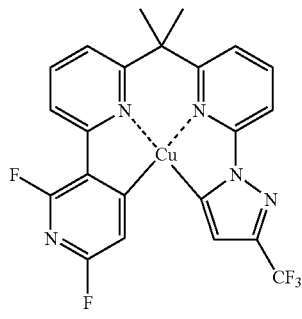 | 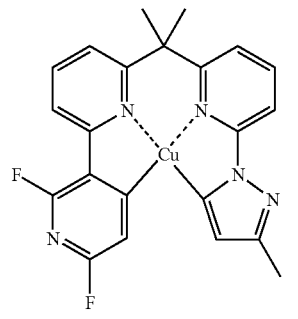 |
| 263 | 264 |
| 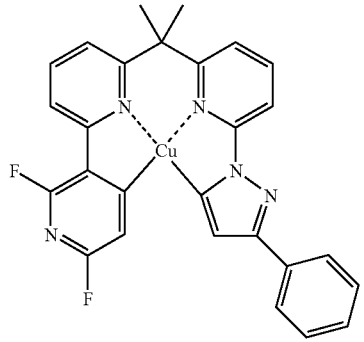 | 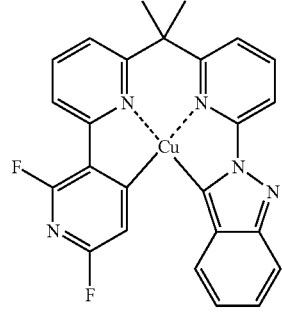 |

-continued
265
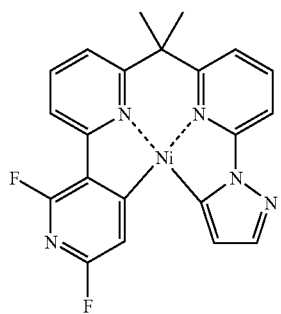
266
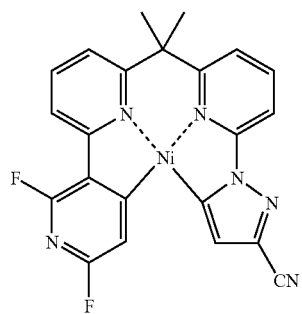
267
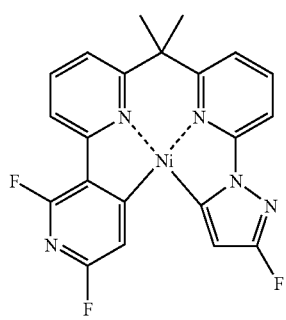
268
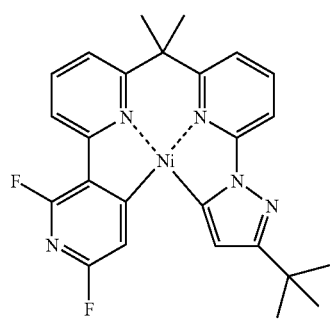
269
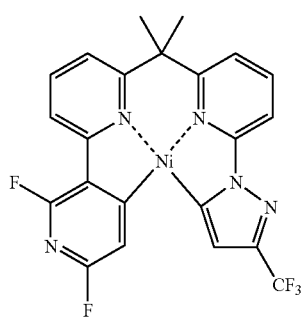
270
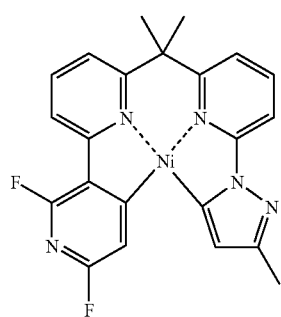
271
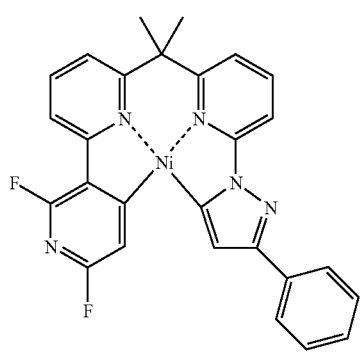
272
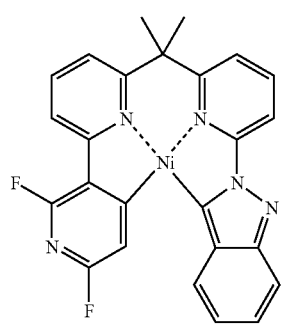
273
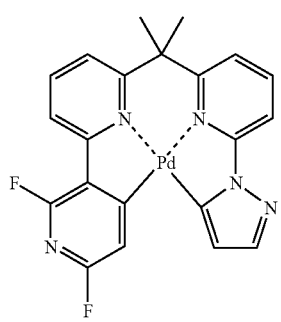
274
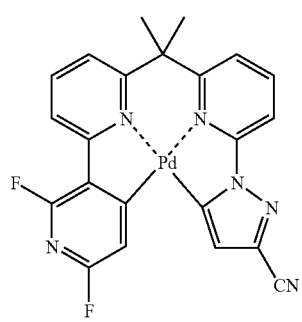

275

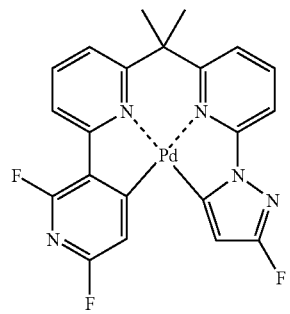

276

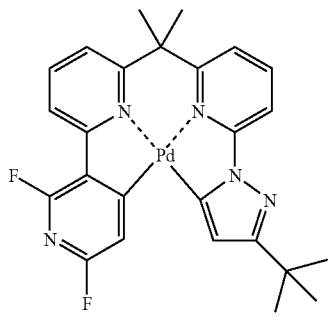

277

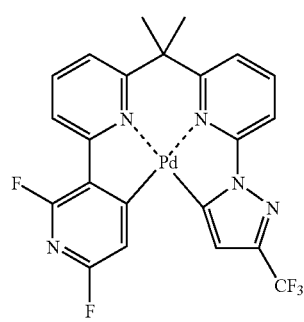

278

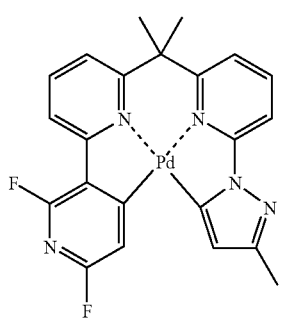

279

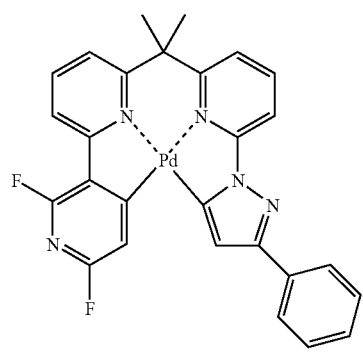

280

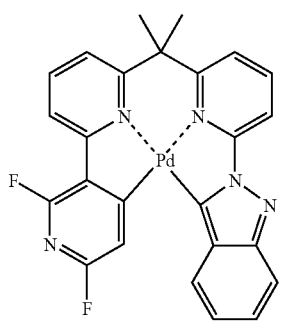

Next, a method for synthesis the metal complex represented by the formula (1) is described.

The metal complex represented by the formula (1) can be obtained by allowing a compound represented by the formula (C-0) (hereinafter referred to as "ligand") to react with a metal salt in the presence of a solvent.

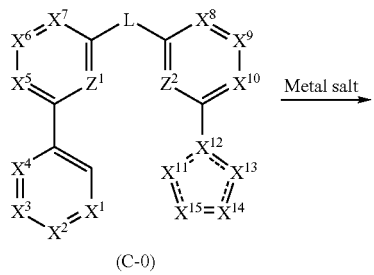

(C-0)

-continued

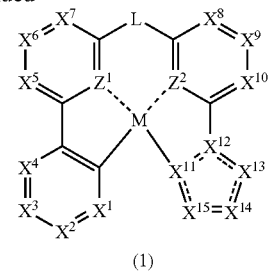

(1)

In the formula (C-0), $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$, $Z^1$, $Z^2$, L and M are synonymous with $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, $X^{15}$, $Z^1$, $Z^2$, L and M in the foregoing formula (1), and preferred ranges thereof are also the same.

In the synthesis of the metal complex, examples of a compound containing divalent zinc which is used at the time of a complex forming reaction with the ligand include dichloro (N,N,N',N'-tetramethylenediamine)zinc, zinc acetate, zinc acetylacetonate, zinc bromide, zinc chloride and zinc fluoride. More preferred examples of the zinc salt include zinc halides such as zinc bromide and zinc chloride.

In the synthesis of the metal complex, examples of a compound containing divalent copper which is used at the time of a complex forming reaction with the ligand include copper acetate, copper acetylacetonate, copper bromide, copper chloride, copper fluoride, copper carbonate, copper cyanide, copper hydroxide, copper oxide, copper sulfate and copper trifluoroacetate. More preferred examples of the copper salt include copper halides such as copper bromide, copper chloride and copper fluoride.

In the synthesis of the metal complex, examples of a compound containing divalent nickel which is used at the time of a complex forming reaction with the ligand include nickel acetate, nickel acetylacetonate, nickel chloride, nickel bromide, nickel fluoride, nickel iodide, nickel nitrate and nickel sulfate. More preferred examples of the nickel salt include nickel halides such as nickel chloride and nickel bromide.

In the synthesis of the metal complex, examples of a compound containing divalent palladium which is used at the time of a complex forming reaction with the ligand include palladium chloride, palladium bromide, palladium iodide, palladium acetate, palladium acetylacetonate, palladium hexafluoroacetylacetonate, palladium trifluoroacetate, allyl palladium chloride dimer, (2,2'-bipyridine)dichloropalladium, bis(benzonitrile)dichloropalladium, bis(acetonitrile)dichloropalladium, (bicyclo[2.2.1]hepta-2,5-diene)dichloropalladium, dichloro(1,5-cyclooctadiene)palladium, dibromobis(triphenylphosphine)palladium, dichloro(N,N,N',N'-tetramethylethylenediamine)palladium, dichloro(1,10-phenathroline)palladium, dichlorobis(triphenylphosphinepalladium), ammonium tetrachloropalladate, diaminedibromopalladium, diaminedichloropalladium, diaminediiodopalladium, potassium tetrabromopalladate, potassium tetrachloropalladate and sodium tetrachloropalladate; and examples of a compound containing zero-valent palladium include tetrakis(triphenylphosphine)palladium and tris(dibenzylideneacetone)palladium.

More preferred examples of the palladium salt include palladium halides such as palladium chloride and palladium bromide; nitrile complexes such as bis(benzonitrile)dichloropalladium and bis(acetonitrile)dichloropalladium; and olefin complexes such as (bicyclo[2.2.1]hepta-2,5-diene)dichloropalladium and dichloro(1,5-cyclooctadiene)palladium. Of these, palladium halides such as palladium chloride and palladium bromide; and nitrile complexes such as bis(benzonitrile)dichloropalladium and bis(acetonitrile)dichloropalladium are further preferable.

In the synthesis of the metal complex, as to a platinum salt which is used at the time of a complex forming reaction with the ligand, examples of a compound containing divalent platinum include platinum chloride, platinum bromide, platinum iodide, platinum acetylacetonate, bis(benzonitrile)dichloroplatinum, bis(acetonitrile)dichloroplatinum, dichloro(1,5-cyclooctadiene)platinum, dibromobis(triphenylphosphine)platinum, dichloro(1,10-phenanthroline)platinum, dichlorobis(triphenylphosphine)platinum, ammonium tetrachloroplatinate, diamminedibromoplatinum, diamminedichloroplatinum, diamminediiodoplatinum, potassium tetrabromoplatinate, potassium tetrachloroplatinate, sodium tetrachloroplatinate, dimethyl bis(dimethyl sulfoxide)platinum, dimethyl bis(dimethyl sulfide)platinum and dimethyl (bicyclo[2.2.1]hepta-2,5-diene)platinum.

More preferred examples of the platinum salt include platinum halides such as platinum chloride, platinum bromide and platinum iodide; nitrile complexes such as bis(benzonitrile) dichloroplatinum and bis(acetonitrile)dichloroplatinum; and olefin complexes such as dichloro(1,5-cyclooctadiene)platinum. Of these, platinum halides such as platinum chloride and platinum bromide; and nitrile complexes such as bis (benzonitrile)dichloroplatinum and bis(acetonitrile)dichloroplatinum are further preferable.

The metal salt which is used in the manufacture of the metal complex may contain water of crystallization, a solvent of crystallization or a coordinating solvent. Though the valence of the metal is not particularly limited, the metal is preferably divalent or zero-valent, and more preferably divalent.

In the manufacture of the metal complex, as to the amount of the metal salt which is used at the time of a complex forming reaction with the ligand, in the case where one metal atom capable of forming a complex is contained in the metal salt, it is usually from 0.1 to 10 moles, preferably from 0.5 to 5 moles, and more preferably from 1 to 3 moles based on one mole of the ligand. In the case where the metal atom capable of forming a metal salt is contained in the number of "n", its amount may be 1/n times.

In the manufacture of the metal complex, examples of a solvent which is used at the time of a complex forming reaction between the metal salt and the ligand include amides such as N,N-dimethylformamide, formamide and N,N-dimethylacetamide; nitriles such as acetonitrile, propionitrile, butyronitrile and benzonitrile; halogenated hydrocarbons such as dichloromethane, 1,2-dichloroethane, chloroform, carbon tetrachloride, chlorobenzene and o-dichlorobenzene; aliphatic hydrocarbons such as pentane, hexane, octane and decane; aromatic hydrocarbons such as benzene, toluene, xylene and mesitylene; ethers such as diethyl ether, diisopropyl ether, butyl ether, tert-butyl methyl ether, 1,2-dimethoxyethane, tetrahydrofuran and 1,4-dioxane; ketones such as acetone, methyl ethyl ketone and methyl isobutyl ketone; alcohols such as methanol, ethanol, 1-propanol, 2-propanol, tert-butyl alcohol, 2-methoxyethanol, 2-ethoxyethanol, ethylene glycol and glycerin; and water.

More preferred examples of the solvent include nitriles such as acetonitrile, propionitrile, butyronitrile and benzonitrile; aromatic hydrocarbons such as benzene, toluene, xylene and mesitylene; and alcohols such as methanol, ethanol, 1-propanol, 2-propanol, tert-butyl alcohol, 2-methoxyethanol, 2-ethoxyethanol, ethylene glycol and glycerin. Of these, nitriles such as acetonitrile, propionitrile, butyronitrile and benzonitrile; and aromatic hydrocarbons such as benzene, toluene, xylene and mesitylene are further preferable.

Such a solvent may be used singly or may be used in admixture of two or more kinds thereof.

In the synthesis of the metal complex, the amount of the solvent which is used at the time of a complex forming reaction between the metal salt and the ligand is not particularly limited so as far it is sufficient for thoroughly achieving the reaction. It is usually from 1 to 200 times by volume, and preferably from 5 to 100 times by volume relative to the ligand to be used.

In the synthesis of the metal complex, in the case where an acidic substance such as a hydrogen halide is formed at the time of a complex forming reaction between the metal salt and the ligand, the reaction may be carried out in the presence of a basic substance. Examples of the basic substance include tertiary amines such as triethylamine, diisopropylethylamine, pyridine and 1,8-dimethylaminonaphthalene; metal alkoxides such as sodium methoxide and sodium ethoxide; and inorganic bases such as sodium hydroxide, potassium hydroxide, potassium carbonate and sodium hydrogencarbonate.

In the synthesis of the metal complex, it is preferable that the complex forming reaction between the metal salt and the ligand is carried out in an inert gas atmosphere. Examples of the inert gas include nitrogen and argon.

In the synthesis of the metal complex, the reaction temperature, reaction time and reaction pressure at the time of a complex forming reaction between the metal salt and the ligand vary depending upon the raw materials, solvent and the like. The reaction temperature is usually in the range of from 20° C. to 300° C., preferably from 50° C. to 250° C., and more preferably from 80° C. to 220° C. The reaction time is usually from 30 minutes to 24 hours, preferably from 1 to 12 hours, and more preferably from 2 to 10 hours. Though the reaction pressure is usually atmospheric pressure, it may be an elevated pressure or a reduced pressure, if desired.

In the synthesis of the metal complex, a heating measure at the time of a complex forming reaction between the metal salt and the ligand is not particularly limited. Specifically, heating by an oil bath or a mantle heater, or heating by means of irradiation with microwaves is useful.

The thus obtained metal complex can be isolated and purified, if desired. Examples of a method for achieving the isolation and purification include column chromatography, recrystallization, reprecipitation and sublimation. These methods may be employed singly or in combinations.

Among the metal complexes represented by the formula (1), the metal complex represented by the formula (4a-1) can also be synthesized according to the following manufacturing method. However, it should not be construed that the invention is limited to the following method.

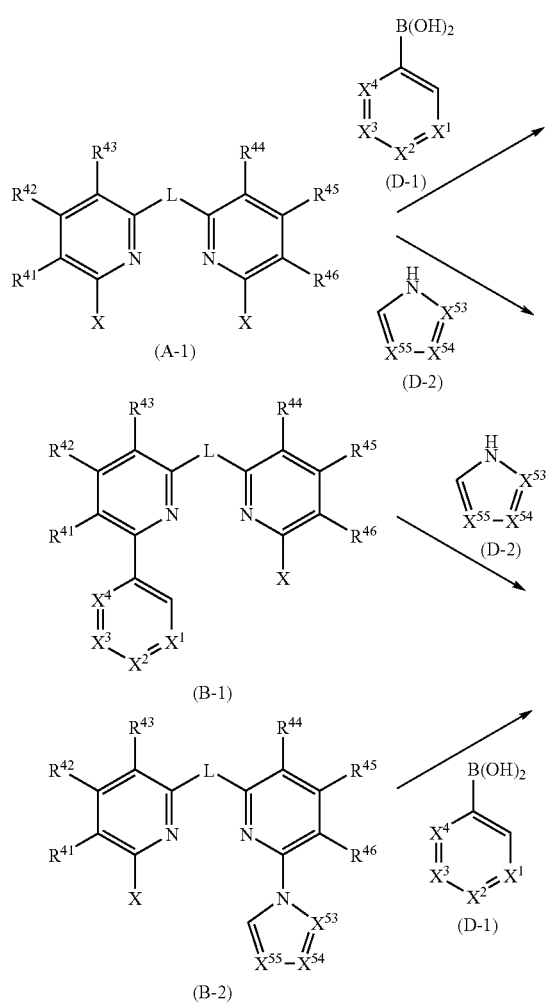

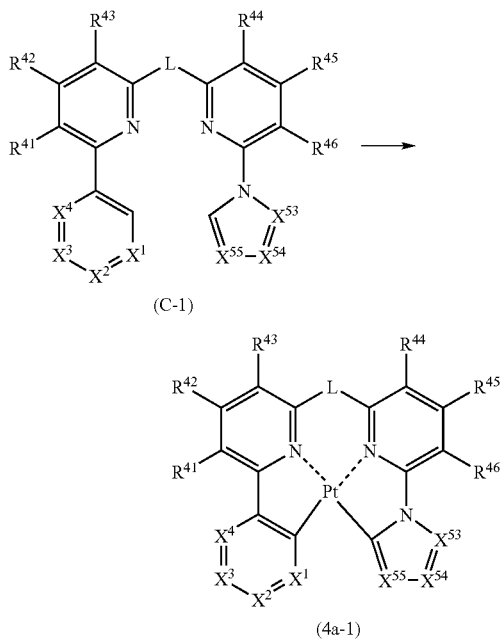

In the foregoing formulae, $X^1$, $X^2$, $X^3$, $X^4$, $X^{53}$, $X^{54}$, $X^{55}$, $R^{41}$, $R^{42}$, $R^{43}$, $R^{44}$, $R^{45}$, $R^{46}$ and L are synonymous with those in the foregoing formula (4a-1). X represents a halogen atom, preferably chlorine atom, iodine atom or bromine atom, and more preferably iodine atom or bromine atom, and most preferably iodine atom.

As the step of obtaining (B-1) from (A-1) and the step of obtaining (C-1) from (B-2), each of the desired compounds can be synthesized by employing a method described in Synth. Commun., 11, 513 (1981) or the like.

As the step of obtaining (C-1) from (B-1) and the step of obtaining (B-2) from (A-1), each of the desired compounds can be synthesized by utilizing a method described in Angew. Chem. Int. Ed., 42, 2051-2053 (2003) or the like.

A compound (A'-1) represented by the foregoing formula (A-1), wherein the connecting group L is a methylene group can be obtained by a method described in Journal of Organic Chemistry, 53, 786 (1988) or the like. Furthermore, a compound (A''-1) wherein the connecting group is a dialkylmethylene group can be synthesized by dissolving the compound (A'-1) in a solvent such as tetrahydrofuran and N,N-dimethylformamide and allowing it to react with an alkyl halide R—X (wherein R represents an alkyl group; and X represents a halogen atom such as bromine and iodine) in the presence of a base such as lithium diisopropylamide, potassium t-butoxide and sodium hydride.

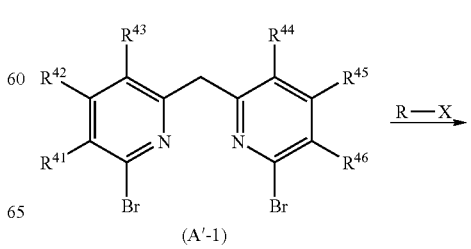

147
-continued

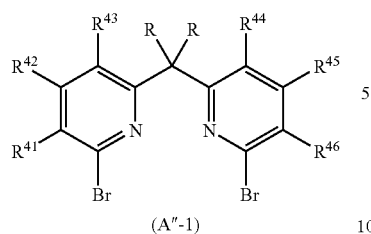

(A″-1)

In the foregoing formulae, $R^{41}$, $R^{42}$, $R^{43}$, $R^{44}$, $R^{45}$ and $R^{46}$ are synonymous with those in the foregoing formula (A-1).

As to the step of obtaining the platinum complex represented by the formula (4a-1) from (C-1), the desired compound can be synthesized by dissolving the compound (C-1) and from 1 to 1.5 equivalents of platinum(II) chloride in benzonitrile, heating the solution at from 130° C. to the heat reflux temperature (boiling point of benzonitrile: 191° C.) and stirring it for from 30 minutes to 4 hours. The metal complex represented by the formula (4a-1) can be purified by recrystallization from chloroform, dichloromethane, toluene, xylene, acetonitrile, butyronitrile, benzonitrile, ethyl acetate, etc., silica gel column chromatography, purification by sublimation, or the like.

In the foregoing manufacturing method, in the case where the defined substituents are changed under a condition of a certain synthesis method or are inadequate for carrying out the subject method, the manufacture can be easily made by measures such as protection and deprotection of a functional group (see, for example, *Protective Groups in Organic Synthesis*, written by T. W. Greene, John Wiley & Sons Inc. (1981), etc.). Also, the order of the reaction steps such as introduction of a substituent can be properly changed, if desired.

The synthesis of the compound (C-1) is hereunder described with reference to the following specific examples, but it should not be construed that the invention is limited to the following methods.

<Synthesis of Compound L-142>

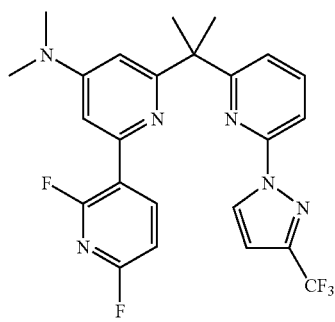

(L-142)

Compound L-142 can be synthesized by using a compound represented by the foregoing formula (A″-1), wherein each of $R^{41}$, $R^{43}$, $R^{44}$, $R^{45}$ and $R^{46}$ is a hydrogen atom, $R^{42}$ is a dimethylamino group, and R is a methyl group, and allowing it to react with 3-trifluoromethylpyrazole and 2,6-difluoropyridyl-3-boronic acid under a reaction condition shown in the synthesis of Illustrative Compound Pt-5 described below.

148
<Synthesis of Compound L-143>

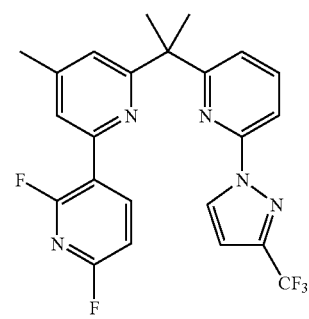

(L-143)

Compound L-143 can be synthesized by using a compound represented by the foregoing formula (A″-1), wherein each of $R^{41}$, $R^{43}$, $R^{44}$, $R^{45}$ and $R^{46}$ is a hydrogen atom, and each $R^{42}$ and R is a methyl group, and allowing it to react with 3-trifluoromethylpyrazole and 2,6-difluoropyridyl-3-boronic acid under a reaction condition shown in the synthesis of Illustrative Compound Pt-5 described below.

<Synthesis of Compound L-11>

Compound L-11 can be synthesized by using a compound represented by the foregoing formula (A″-1), wherein each of $R^{41}$, $R^{42}$, $R^{43}$, $R^{44}$, $R^{45}$ and $R^{46}$ is a hydrogen atom, and R is a methyl group, and allowing it to react with 4-cyano-3-trifluoromethylpyrazole and 2,6-difluoropyridyl-3-boronic acid under a reaction condition used in the synthesis of Illustrative Compound Pt-5 described below.

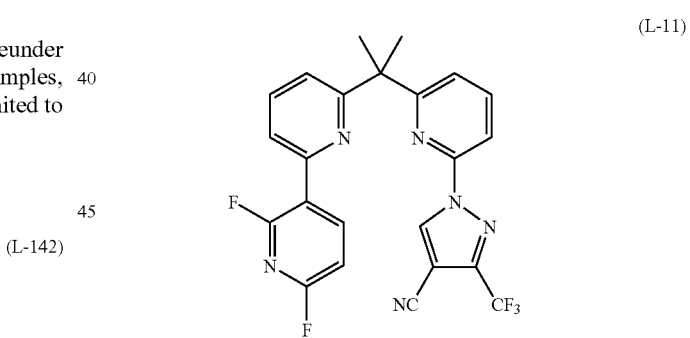

(L-11)

<Synthesis of Compound L-50>

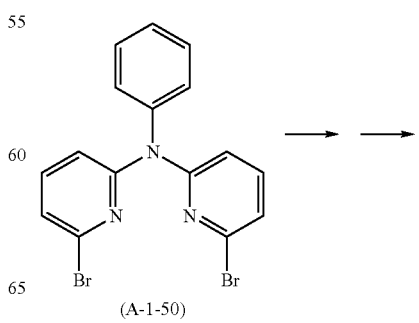

(A-1-50)

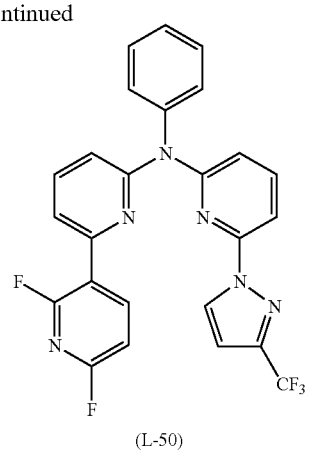

(L-50)

Compound A-1-50 can be synthesized by utilizing a method described in *Syn. Lett.*, 2, 263 (2005) or the like. Also, Ligand L-50 can be synthesized by allowing Compound A-1-50 to react with 3-trifluoromethylpyrazole and 2,6-difluoropyridyl-3-boronic acid under a reaction condition used in the synthesis of Illustrative Compound Pt-5 or the like described below.

Also, the compound which is used for the purpose of obtaining the metal complex represented by the foregoing formula (4b-1) can be synthesized in the following manner.

5%, more preferably not more than 3%, and further preferably not more than 1% of the total amount of light emission in the whole of the device.

Though the amount of the host material in the light emitting layer, it is preferable that the host material is a major component (component whose content is the highest) in the light emitting layer. The amount of the host material is more preferably 50% by mass or more and not more than 99.9% by mass, further preferably 70% by mass or more and not more than 99.8% by mass, especially preferably 80% by mass or more and not more than 99.7% by mass, and most preferably 85% by mass or more and not more than 99.5% by mass.

A glass transition temperature of the host material is preferably 100° C. or higher and not higher than 500° C., more preferably 110° C. or higher and not higher than 300° C., and further preferably 120° C. or higher and not higher than 250° C.

A fluorescence wavelength of the host material in a film state is preferably in the range of 400 nm or more and not more than 650 nm, more preferably in the range of 420 nm or more and not more than 600 nm, and further preferably in the range of 440 nm or more and not more than 550 nm.

As the host material, compounds disclosed in paragraphs 0113 to 0161 of JP-A-2002-100476 and compounds disclosed in paragraphs 0087 to 0098 of JP-A-2004-214179 can be suitably used, but it should not be construed that the invention is limited to these compounds.

Also, examples of the host material include not only materials having a tertiary amine structure, materials having a

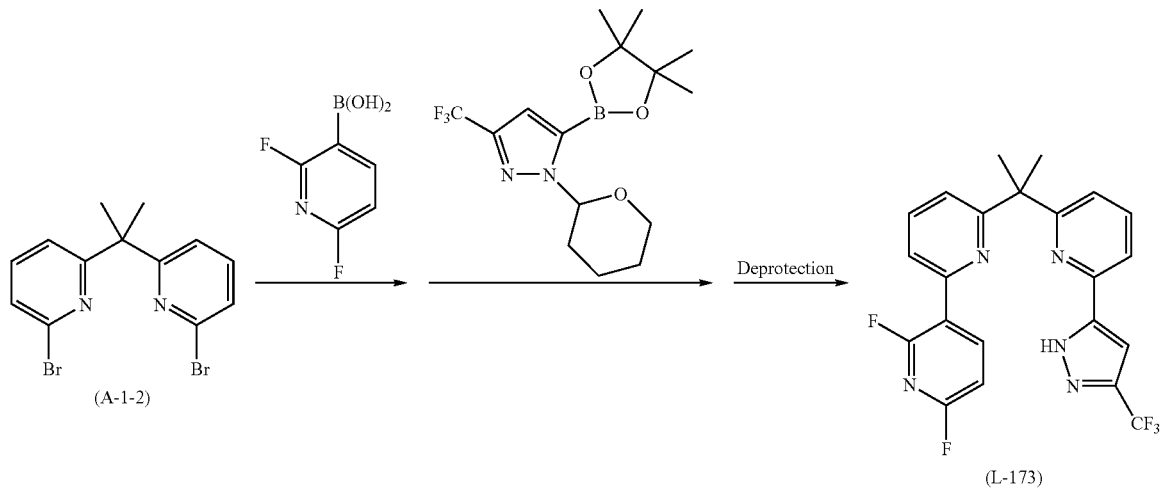

(L-173)

Compound L-173 can be synthesized by allowing Compound A-1-2 to react with a corresponding boronic acid or boronic ester and then deprotecting the protective group on nitrogen.

As described previously, it is especially preferable that the foregoing metal complex with a specified structure is contained together with at least one host material in the light emitting layer.

The host material as referred to herein is a compound which chiefly bears the injection or transport of charges in the light emitting layer and is also a compound which does not substantially emit light in itself. In this specification, it is meant by the terms "which does not substantially emit light" that the amount of light emission from the compound which does not substantially emit light is preferably not more than carbazole structure, materials having an indole structure, materials having a diarylamine structure, materials having a pyridine structure, materials having a pyrazine structure, materials having a triazine structure and materials having an arylsilane structure but materials exemplified in the sections of hole injection layer, hole transport layer, electron injection layer and electron transport layer as described later. Of these, materials having a carbazole structure or an indole structure are more preferable; and materials having a carbazole structure are especially preferable.

It is preferable that the organic layer contains a material having at least one deuterium.

By using a material having at least one deuterium, the durability can be more enhanced.

It is known that the binding energy of a carbon-deuterium (C-D) bond is higher than that of a carbon-hydrogen (C—H)

bond. Thus, a deterioration mechanism in which the carbon-hydrogen bond is cleaved can be suppressed. For this reason, it may be thought that it is effective for enhancing the durability to replace the hydrogen atom with the deuterium atom.

The material having at least one deuterium atom may be either one or both of an organic material and an inorganic material and is preferably an organic material.

It is meant by the terms "organic material having at least one deuterium atom" that a deuterium atom and a hydrogen atom are contained in a ratio ((the atomic number of deuterium atom)/(the atomic number of hydrogen atom)) in the range of from 100/0 to 1/99 at a position at which the hydrogen atom or deuterium atom can be bound in the organic material. Here, the position at which the hydrogen atom or deuterium atom can be bound may be any position in the range of from at least one specified place to the whole in one molecule. In other words, the foregoing ratio is synonymous with the fact that a proportion occupied by the deuterium atom (deuteration ratio) is from 1 to 100% in the total sum of positions at which the hydrogen atom or deuterium atom can be bound.

Accordingly, the state of the foregoing ratio can be realized by simultaneously using a compound containing deuterium at the subject position and a compound not containing deuterium at the subject position in an appropriate ratio.

As to the composition of the deuterium atom relative to the hydrogen atom, its ratio is preferably in the range of from 100/0 to 5/95, more preferably in the range of from 100/0 to 50/50, and especially preferably in the range of from 100/0 to 80/20.

Though the organic material having at least one deuterium atom may be contained in any of the layers of the organic electroluminescence device, it is preferably contained in any one or a plurality of a hole injection layer, a hole transport layer, a light emitting layer, an electron transport layer, an electron injection layer, an exciton blocking layer and a charge blocking layer; more preferably contained in any one or a plurality of a light emitting layer, an exciton blocking layer and a charge blocking layer; further preferably contained in a light emitting layer; and especially preferably contained as a host material in a light emitting layer. When used as the host material, the amount of the organic material having at least one deuterium atom is the same as the amount described previously in the host material.

Examples of the organic material having at least one deuterium atom include compounds disclosed in WO 02/47440, but it should not be construed that the invention is limited thereto.

In particular, preferred examples of the organic material having at least one deuterium atom include materials containing a nitrogen atom. Of these, materials having a tertiary amine structure, a carbazole structure or an indole structure are preferable; materials having a carbazole structure or an indole structure are more preferable; and materials having a carbazole structure are especially preferable.

As to the materials having a carbazole structure, a compound represented by the formula (V) is especially preferable. The compound represented by the formula (V) is hereunder described.

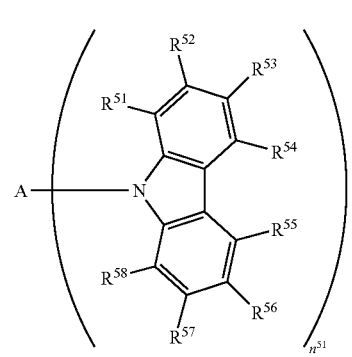

Formula (V)

In the formula (V), each of $R^{51}$ to $R^{58}$ represents a hydrogen atom or a substituent, and in $R^{51}$ to $R^{58}$, the adjacent substituents may be bonded to each other to form a condensed ring. A represents a connecting group; and $n^{51}$ represents an integer of from 2 to 6. The compound represented by the formula (V) contains at least one deuterium atom.

Examples of the substituent include a deuterium atom and those exemplified in the foregoing substituent group B.

The substituent represented by $R^{51}$ to $R^{58}$ is preferably a deuterium atom, an alkyl group, an aryl group, a heteroaryl group, a halogen group, a cyano group or a silyl group; more preferably a deuterium atom, an alkyl group, a heteroaryl group, a halogen group, a cyano group or a silyl group; and especially preferably a deuterium atom, an alkyl group, a heteroaryl group or a silyl group. Such a substituent may be further substituted with other substituent, or these substituents may be bonded to each other to form a ring.

The alkyl group represented by $R^{51}$ to $R^{58}$ is preferably methyl, ethyl, n-propyl, isopropyl, n-butyl, tert-butyl, n-octyl, cyclopropyl, cyclopentyl, cyclohexyl, 1-adamantyl or trifluoromethyl; more preferably methyl, isopropyl, tert-butyl, n-octyl, cyclopentyl, cyclohexyl, 1-adamantyl or trifluoromethyl; and especially preferably tert-butyl, cyclohexyl, 1-adamantyl or trifluoromethyl. Such a substituent may be further substituted with other substituent, or these substituents may be bonded to each other to form a ring.

The heteroaryl group represented by $R^{51}$ to $R^{58}$ is preferably imidazolyl, pyrazolyl, pyridyl, quinolyl, isoquinolynyl, pyrrolyl, indolyl, furyl, thienyl, benzoxazolyl, benzimidazolyl, benzothiazolyl, carbazolyl or azepinyl; more preferably imidazolyl, pyrazolyl, quinolyl, indolyl, furyl, thienyl, benzimidazolyl, carbazolyl or azepinyl; and especially preferably indolyl, furyl, thienyl, benzimidazolyl, carbazolyl or azepinyl. Such a substituent may be further substituted with other substituent or may form a condensed ring structure, or these substituents may be bonded to each other to form a ring.

The silyl group represented by $R^{51}$ to $R^{58}$ is preferably trimethylsilyl, triethylsilyl, triisopropylsilyl, methyldiphenylsilyl, dimethyl-tert-butylsilyl, dimethylphenylsilyl, diphenyl-tert-butylsilyl or triphenylsilyl; more preferably trimethylsilyl, triisopropylsilyl, dimethyl-tert-butylsilyl, diphenyl-tert-butylsilyl or triphenylsilyl; and especially preferably trimethylsilyl, dimethyl-tert-butylsilyl or triphenylsilyl. Such a substituent may be further substituted with other substituent, or these substituents may be bonded to each other to form a ring.

In particular, the substituent represented by $R^{52}$ and $R^{57}$ is preferably an alkyl group, an aryl group, a silyl group or a deuterium atom; more preferably an alkyl group, a silyl group or a deuterium atom; and especially preferably a tert-butyl group, an adamantyl group, a trimethylsilyl group, a triphenylsilyl group or a deuterium atom.

In particular, the substituent represented by $R^{53}$ and $R^{56}$ is preferably an alkyl group, an aryl group, a silyl group or a deuterium atom; more preferably an alkyl group, a silyl group or a deuterium atom; and especially preferably a tert-butyl group, an adamantyl group, a trimethylsilyl group, a triphenylsilyl group or a deuterium atom.

$n^{51}$ is preferably from 2 to 4, more preferably from 2 to 3, and especially preferably 2.

The connecting group represented by A is preferably alkylene, arylene, heteroarylene, silylene or a divalent connecting group having a biphenyl structure (biphenyldiyl); more preferably arylene, heteroarylene or a divalent connecting group having a biphenyl structure (biphenyldiyl); and especially preferably arylene or a divalent connecting group having a biphenyl structure (biphenyldiyl). Such a connecting group may be further substituted with a deuterium atom or the substituent represented by the foregoing substituent group B.

The arylene is preferably phenylene, naphthylene, biphenylene or terphenylene; more preferably phenylene or biphenylene; and especially preferably phenylene.

The phenylene is preferably 1,2,3,4,5,6-hexasubstituted phenylene, 1,2,4,5-tetrasubstituted phenylene, 1,3,5-trisubstituted phenylene, 1,2-disubstituted phenylene, 1,3-disubstituted phenylene or 1,4-disubstituted phenylene; more preferably 1,2-disubstituted phenylene, 1,3-disubstituted phenylene or 1,4-disubstituted phenylene; and especially preferably 1,3-disubstituted phenylene or 1,4-disubstituted phenylene.

The heteroarylene is preferably disubstituted pyridylene or disubstituted N-phenylcarbazolylene; more preferably 2,6-disubstituted pyridylene, 3,5-disubstituted pyridylene or 3,6-disubstituted N-phenylcarbazolylene; and especially preferably 3,6-disubstituted N-phenylcarbazolylene.

Examples of the divalent connecting group having a biphenyl structure (biphenyldiyl) include those described below. Of these, BP-1, BP-2 and BP-6 are preferable; BP-1 and BP-2 are more preferable; and BP-2 is further preferable.

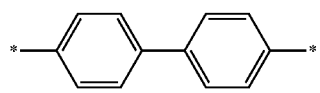
BP-1

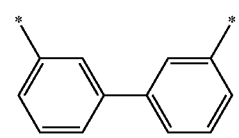
BP-2

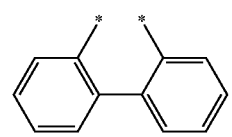
BP-3

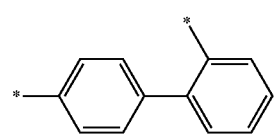
BP-4

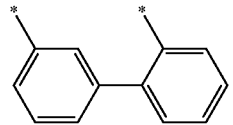
BP-5

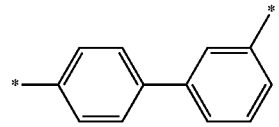
BP-6

In the structural formulae, * represents a position bonding to the nitrogen atom of the carbazole.

Examples of the material having a carbazole structure or an indole structure each having at least one deuterium atom are those described below.

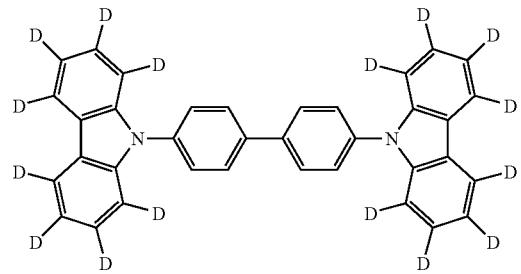

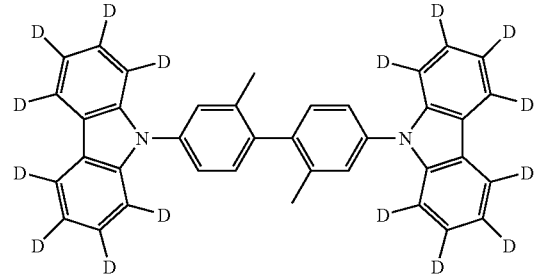

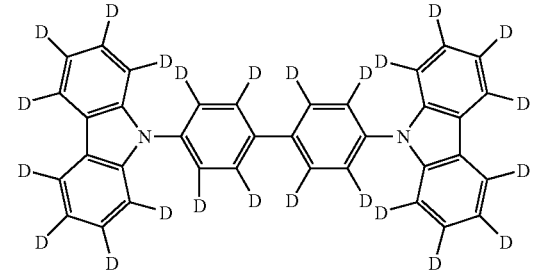

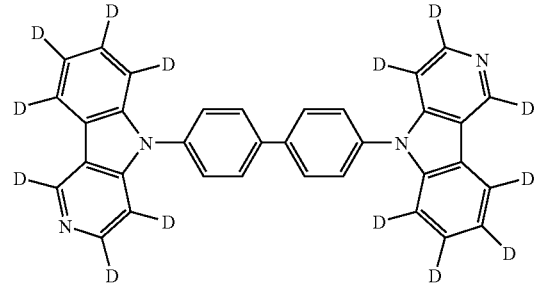

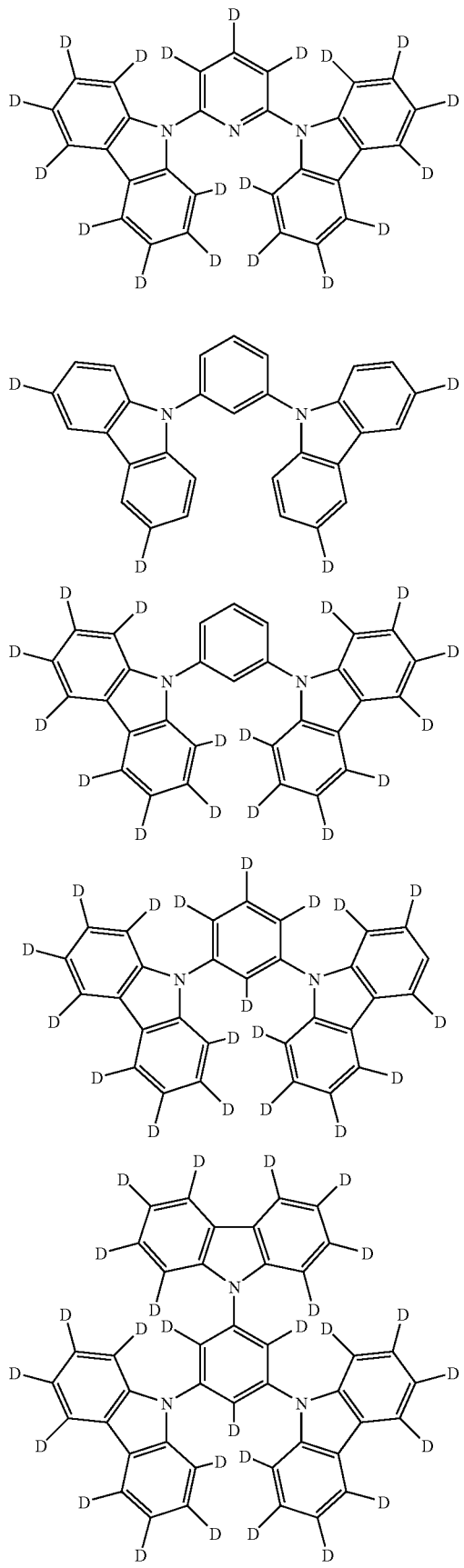
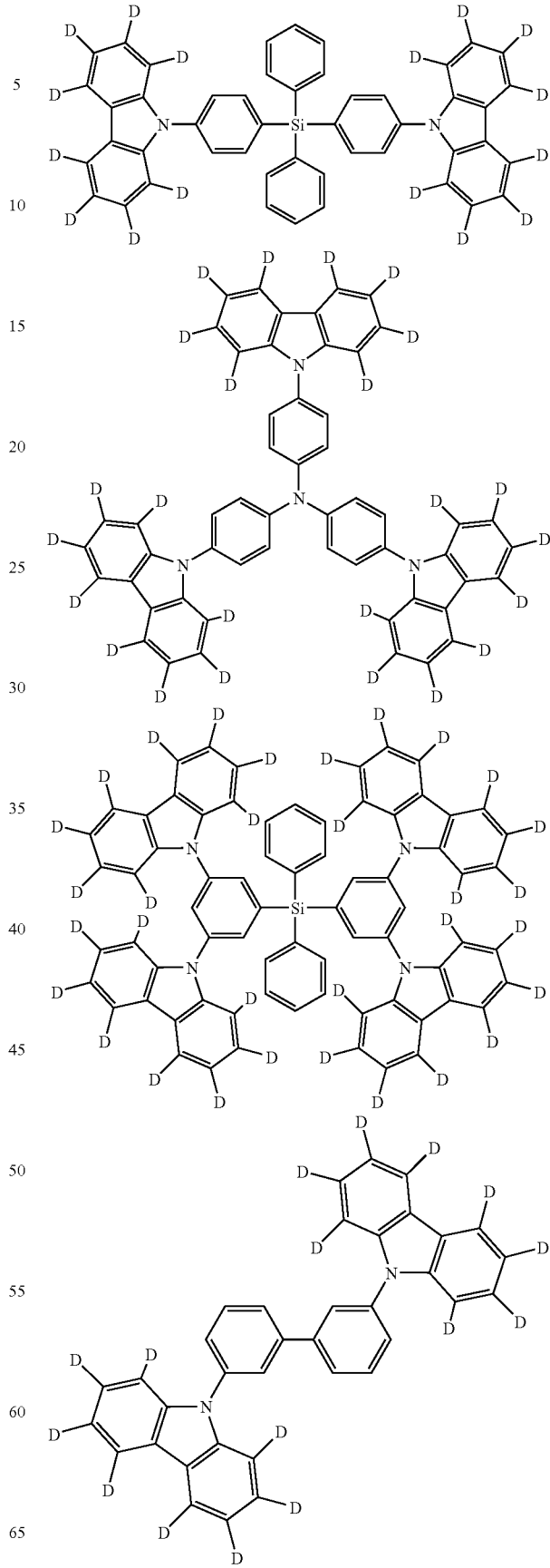

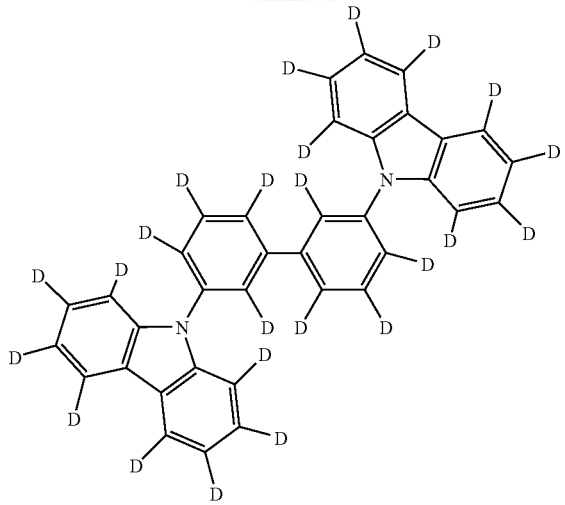

In the organic electroluminescence device (organic EL device) of the invention, it is preferable that at least one of the compounds represented by the foregoing formulae (1) to (4), (4a-1) to (4a-3) and (4b-1) to (4b-3) is contained in the light emitting layer.

Next, each of the elements configuring the organic EL device is described.

<Organic Layer>

The organic layer in the invention is described. The device of the invention has at least one organic layer including the light emitting layer. As described previously, examples of other organic layers than the organic light emitting layer include respective layers such as a hole transport layer, an electron transport layer, a hole blocking layer, an electron blocking layer, a hole injection layer and an electron injection layer.

—Formation of Organic Layer—

Each of the organic layers can be suitably formed by any of dry fabrication processes such as vapor deposition and sputtering, a transfer process, a printing process, etc.

—Light Emitting Layer—

The light emitting layer is a layer having functions such that at the time of applying an electric field, it receives a hole from the anode, the hole injection layer or the hole transport layer, receives an electron from the cathode, the electron injection layer or the electron transport layer and provides a site of recombination of the hole and the electron, thereby emitting light.

The light emitting layer may be configured of only a light emitting material or may be configured as a mixed layer of a host material and a light emitting material. The light emitting material may be a fluorescence material or a phosphorescent material. The light emitting material may be made of a single kind or two or more kinds. It is preferable that the host material is a charge transport material. The host material may be made of a single kind or two or more kinds. Examples thereof include a configuration in which an electron transporting host material and a hole transporting host material are mixed. Furthermore, the light emitting layer may contain a material which does not have charge transporting properties and which does not emit light.

Also, the light emitting layer may be made of a single layer or two or more layers. The respective layers may emit light in a different luminescent color from each other.

Examples of the fluorescent material include compounds, for example, benzoxazole derivatives, benzimidazole derivatives, benzothiazole derivatives, styrylbenzene derivatives, polyphenyl derivatives, diphenylbutadiene derivatives, tetraphenylbutadiene derivatives, naphthalimide derivatives, coumarin derivatives, condensed aromatic compounds, perinone derivatives, oxadiazole derivatives, oxazine derivatives, aldazine derivatives, pyralizine derivatives, cyclopentadiene derivatives, bisstyrylanthracene derivatives, quinacridone derivatives, pyrolopyridine derivatives, thiadiazolopyridine derivatives, cyclopentadiene derivatives, styrylamine derivatives, diketopyrrolopyrrole derivatives, aromatic dimethylidine compounds, various complexes represented by complexes of 8-quinolinol derivatives and complexes of pyrromethene derivatives, polymer compounds such as polythiophene, polyphenylene and polyphenylene vinylene, organic silane derivatives, etc.

Examples of the phosphorescent material include, in addition to the foregoing metal complex with a specified structure, phosphorescent compounds disclosed in, for example, U.S. Pat. No. 6,303,238B1, U.S. Pat. No. 6,097,147, WO 00/57676, WO 00/70655, WO 01/08230, WO 01/39234A2, WO 01/41512A1, WO 02/02714A2, WO 02/15645A1, WO 02/44189A1, WO 05/19373A2, JP-A-2001-247859, JP-A-2002-302671, JP-A-2002-117978, JP-A-2003-133074, JP-A-2002-235076, JP-A-2003-123982, JP-A-2002-170684, EP1211257, JP-A-2002-226495, JP-A-2002-234894, JP-A-2001-247859, JP-A-2001-298470, JP-A-2002-173674, JP-A-2002-203678, JP-A-2002-203679, JP-A-2004-357791, JP-A-2006-256999, JP-A-2007-19462, JP-A-2007-84635, JP-A-2007-96259, etc. Above all, more preferred examples of the light emitting material include Ir complexes, Pt complexes, Cu complexes, Re complexes, W complexes, Rh complexes, Ru complexes, Pd complexes, Os complexes, Eu complexes, Tb complexes, Gd complexes, Dy complexes and Ce complexes. In particular, Ir complexes, Pt complexes and Re complexes are preferable; and Ir complexes, Pt complexes and Re complexes containing at least one coordination mode of a metal-carbon bond, a metal-nitrogen bond, a metal-oxygen bond and a metal-sulfur bond are more preferable. Furthermore, from the viewpoints of luminous efficiency, driving durability, chromaticity, etc., Ir complexes, Pt complexes and Re complexes containing a tridentate or multidentate ligand are especially preferable.

As the host material which is contained in the light emitting layer, those described above can be used.

The thickness of the light emitting layer is not particularly limited. In general, the thickness of the light emitting layer is preferably from 1 nm to 500 nm, more preferably from 5 nm to 200 nm, and further preferably from 10 nm to 100 nm.

—Hole Injection Layer and Hole Transport Layer—

Each of the hole injection layer and the hole transport layer is a layer having a function to accept a hole from the anode or the anode side to transport it into the cathode side. Specifically, each of the hole injection layer and the hole transport layer is preferably a layer containing a carbazole derivative, an azacarbazole derivative, an indole derivative, an azaindole derivative, an imidazole derivative, a polyarylalkane derivative, a pyrazoline derivative, a pyrazolone derivative, a phenylenediamine derivative, an arylamine derivative, an amino-substituted chalcone derivative, a styrylanthracene derivative, a fluorenone derivative, a hydrazone derivative, a stilbene derivative, a silazane derivative, an aromatic tertiary amine compound, a styrylamine compound, an aromatic dimethylidine based compound, a porphyrin based compound, an organic silane derivative, a metal complex of every sort having, as a ligand, carbon, phenylazole or phenylazine, which is represented by Ir complexes, or the like.

An electron-accepting dopant can be contained in the hole injection layer or the hole transport layer. As the electron-accepting dopant which is introduced into the hole injection layer or the hole transport layer, any inorganic compound or organic compound can be used so far as it is electron-accepting and has properties of oxidizing an organic compound.

Specifically, examples of the inorganic compound include metal halides such as ferric chloride, aluminum chloride, gallium chloride, indium chloride and antimony pentachloride; and metal oxides such as vanadium pentoxide and molybdenum trioxide.

As the organic compound, compounds having, as a substituent, a nitro group, a halogen, a cyano group, a trifluoromethyl group, etc., quinone based compounds, acid anhydride based compounds, fullerenes and the like can be suitably used.

Besides, compounds disclosed in JP-A-6-212153, JP-A-11-111463, JP-A-11-251067, JP-A-2000-196140, JP-A-2000-286054, JP-A-2000-315580, JP-A-2001-102175, JP-A-2001-160493, JP-A-2002-252085, JP-A-2002-56985, JP-A-2003-157981, JP-A-2003-217862, JP-A-2003-229278, JP-A-2004-342614, JP-A-2005-72012, JP-A-2005-166637, JP-A-2005-209643, etc. can also be suitably used.

Of these, hexacyanobutadiene, hexacyanobenzene, tetracyanoethylene, tetracyanoquinodimethane, tetrafluorotetracyanoquinodimethane, p-fluoranyl, p-chloranyl, p-bromanyl, p-benzoquinone, 2,6-dichlorobenzoquinone, 2,5-dichlorobenzoquinone, 1,2,4,5-tetracyanobenzene, 1,4-dicyanotetrafluorobenzene, 2,3-dichloro-5,6-dicyanobenzoquinone, p-dinitrobenzene, m-dinitrobenzene, o-dinitrobenzene, 1,4-naphthoquinone, 2,3-dichloronaphthoquinone, 1,3-dinitronaphthalene, 1,5-dinitronaphthalene, 9,10-anthraquinone, 1,3,6,8-tetranitrocarbazole, 2,4,7-trinitro-9-fluorenone, 2,3,5,6-tetracyanopyridine and fullerene C60 are preferable; hexacyanobutadiene, hexacyanobenzene, tetracyanoethylene, tetracyanoquinodimethane, tetrafluorotetracyanoquinodimethane, p-fluoranyl, p-chloranyl, p-bromanyl, 2,6-dichlorobenzoquinone, 2,5-dichlorobenzoquinone, 2,3-dichloronaphthoquinone, 1,2,4,5-tetracyanobenzene, 2,3-dichloro-5,6-dicyanobenzoquinone and 2,3,5,6-tetracyanopyridine are more preferable; and tetrafluorotetracyanoquinodimethane is especially preferable.

Such an electron-accepting dopant may be used singly or in combinations of two or more kinds thereof. Though the amount of the electron-accepting dopant varies depending upon the kind of the material, it is preferably from 0.01% by mass to 50% by mass, more preferably from 0.05% by mass to 20% by mass, and especially preferably from 0.1% by mass to 10% by mass relative to the hole transport layer material.

The thickness of each of the hole injection layer and the hole transport layer is preferably not more than 500 nm from the viewpoint of lowering the driving voltage.

The thickness of the hole transport layer is preferably from 1 nm to 500 nm, more preferably from 5 nm to 200 nm, and further preferably from 10 nm to 100 nm. Also, the thickness of the hole injection layer is preferably from 0.1 nm to 200 nm, more preferably from 0.5 nm to 100 nm, and further preferably from 1 nm to 100 nm.

Each of the hole injection layer and the hole transport layer may be of a single layer structure composed of one or two or more kinds of the foregoing materials or may be of a multilayer structure composed of a plurality of layers of the same or different compositions.

—Electron Injection Layer and Electron Transport Layer—

Each of the electron injection layer and the electron transport layer is a layer having a function to accept an electron from the cathode or the cathode side and to transport it into the anode side. Specifically, each of the electron injection layer and the electron transport layer is preferably a layer containing a triazole derivative, an oxazole derivative, an oxadiazole derivative, an imidazole derivative, a fluorenone derivative, an anthraquinodimethane derivative, an anthrone derivative, a diphenylquinone derivative, a thiopyrandioxide derivative, a carbodiimide derivative, a fluorenylidenemethane derivative, a distyrylpyrazine derivative, an aromatic tetracarboxylic acid anhydride of naphthalene, perylene, etc., a phthalocyanine derivative, a complex of every sort represented by complexes of an 8-quinolinol derivative and complexes containing, as a ligand, phthalocyanine, benzoxazole or benzothiazole, an organic silane derivative, or the like.

An electron-donating dopant can be contained in the electron injection layer or the electron transport layer. As the electron-donating dopant which is introduced into the electron injection layer or the electron transport layer, alkali metals such as Li, alkaline earth metals such as Mg, transition metals including rare earth metals, reducing organic compounds and the like are suitably used so far as they are electron-donating and have properties of reducing an organic compound. A metal having a work function of not more than 4.2 eV can be suitably used as the metal. Specific examples thereof include Li, Na, K, Be, Mg, Ca, Sr, Ba, Y, Cs, La, Sm, Gd and Yb. Also, examples of the reducing organic compound include nitrogen-containing compounds, sulfur-containing compounds and phosphorus-containing compounds.

Besides, materials disclosed in JP-A-6-212153, JP-A-2000-196140, JP-A-2003-68468, JP-A-2003-229278, JP-A-2004-342614, etc. can be used.

Such an electron-donating dopant may be used singly or in combinations of two or more kinds thereof. Though the amount of the electron-donating dopant varies depending upon the kind of the material, it is preferably from 0.1% by mass to 99% by mass, more preferably from 1.0% by mass to 80% by mass, and especially preferably from 2.0% by mass to 70% by mass relative to the electron transport layer material.

The thickness of each of the electron injection layer and the electron transport layer is preferably not more than 500 nm from the viewpoint of lowering the driving voltage.

The thickness of the electron transport layer is preferably from 1 nm to 500 nm, more preferably from 5 nm to 200 nm, and further preferably from 10 nm to 100 nm. Also, the thickness of the electron injection layer is preferably from 0.1 nm to 200 nm, more preferably from 0.2 nm to 100 nm, and further preferably from 0.5 nm to 50 nm.

Each of the electron injection layer and the electron transport layer may be of a single layer structure composed of one or two or more kinds of the foregoing materials or may be of a multilayer structure composed of a plurality of layers of the same or different compositions.

—Hole Blocking Layer—

The hole blocking layer is a layer having a function to prevent permeation of the hole having been transported from the anode side to the light emitting layer into the cathode side. In the invention, the hole blocking layer can be provided as an organic layer adjacent to the light emitting layer on the cathode side.

Examples of an organic compound which constitutes the hole blocking layer include aluminum complexes such as aluminum(III) bis(2-methyl-8-quinolinato)4-phenylphenolate (abbreviated as "BAlq"); triazole derivatives; and phenanthroline derivatives such as 2,9-dimethyl-4,7-diphenyl-1,10-phenanthroline (abbreviated as "BCP"). The thickness of the hole blocking layer is preferably from 1 nm to 500 nm, more preferably from 5 nm to 200 nm, and further preferably from 10 nm to 100 nm.

The hole blocking layer may be of a single layer structure composed of one or two or more kinds of the foregoing materials or may be of a multilayer structure composed of a plurality of layers of the same or different compositions.

—Charge Generation Layer—

In order to enhance the emission efficiency, a charge generation layer can be provided between the plural light emitting layers.

The charge generation layer is a layer having not only a function to generate charges (hole and electron) at the time of applying an electric field but a function to inject the generated charges into the layer adjacent to the charge generation layer.

As a material capable of forming the charge generation layer, any material having the foregoing functions is useful. Such a material may be formed of a single compound or may be formed of plural compounds.

Specifically, the material may be a material having conductivity, may be a material having semi-conductivity as in a doped organic layer, or may be a material having electrically insulating properties. Examples thereof include materials disclosed in JP-A-11-329748, JP-A-2003-272860, JP-A-2004-39617, etc.

More specifically, transparent conductive materials such as ITO and IZO (indium zinc oxide); fullerenes such as C60; conductive organic materials such as oligothiophene; conductive organic materials such as metal phthalocyanines, non-metal phthalocyanines, metal porphyrins and non-metal porphyrins; metal materials such as Ca, Ag, Al, Mg:Ag alloys, Al:Li alloys and Mg:Li alloys; hole conductive materials; electron conductive materials; and mixtures thereof may be used.

Examples of the hole conductive material include materials obtained by doping a hole transporting organic material (for example, 2-TNATA, NPD, etc.) with an oxidizing agent with electron-withdrawing properties (for example, F4-TCNQ, TCNQ, $FeCl_3$, etc.); P-type conductive polymers; and P-type semiconductors. Examples of the electron conductive material include materials obtained by doping an electron transporting organic material with a metal or a metal compound having a work function of less than 4.0 eV; N-type conductive polymers; and N-type semiconductors. Examples of the N-type semiconductor include N-type Si, N-type CdS and N-type ZnS, and examples of the P-type semiconductor include P-type Si, P-type CdTe and P-type CuO.

Also, as the charge generation layer, electrically insulating materials such as $V_2O_5$ can be used.

The charge generation layer may be a single layer or a laminate of plural layers. Examples of the structure of the laminate of plural layers include layers having a structure in which a material having conductivity, such as a transparent conductive material and a metal material, and a hole conductive material or an electron conductive material are laminated; and layers having a structure in which the foregoing hole conductive material and electron conductive material are laminated.

In general, it is preferable that the thickness and material of the charge generation layer are chosen so as to have a transmittance to visible light of 50% or more. Also, though the thickness of the charge generation layer is not particularly limited, it is preferably from 0.5 to 200 nm, more preferably from 1 to 100 nm, further preferably from 3 to 50 nm, and especially preferably from 5 to 30 nm.

Though a method for forming the charge generation layer is not particularly limited, the foregoing method for forming an organic compound layer can be adopted.

Though the charge generation layer is formed between the foregoing two or more light emitting layers, the charge generation layer may contain a material having a function to inject charges into the adjacent layer on the anode side and cathode side thereof In order to enhance the injection properties of an electron into the adjacent layer to the anode side, an electron injecting compound, for example, BaO, SrO, $Li_2O$, LiCl, LiF, $MgF_2$, MgO, $CaF_2$, etc. may be laminated on the anode side of the charge generation layer.

In addition to the foregoing contents, the material of the charge generation layer can be chosen on the basis of the descriptions of JP-A-2003-45676, U.S. Pat. Nos. 6,337,492, 6,107,734 and 6,872,472, etc.

<Protective Layer>

The whole of the organic EL device may be protected by a protective layer.

As a material to be contained in the protective layer, any material having a function to inhibit the incorporation of a substance promoting the deterioration of the device, such as moisture and oxygen, into the device is useful.

Specific examples thereof include metals (for example, In, Sn, Pb, Au, Cu, Ag, Al, Ti, Ni, etc.), metal oxides (for example, MgO, SiO, $SiO_2$, $Al_2O_3$, GeO, NiO, CaO, BaO, $Fe_2O_3$, $Y_2O_3$, $TiO_2$, etc.), metal nitrides (for example, $SiN_x$, $SiN_xO_y$, etc.), metal fluorides (for example, $MgF_2$, LiF, $AlF_3$, $CaF_2$, etc.), polyethylene, polypropylene, polymethyl methacrylate, polyimides, polyureas, polytetrafluoroethylene, polychlorotrifluoroethylene, polydichlorodifluoroethylene, copolymers of chlorotrifluoroethylene and dichlorodifluoroethylene, copolymers obtained by copolymerizing a monomer mixture containing tetrafluoroethylene and at least one comonomer, fluorine-containing copolymers having a cyclic structure in a copolymer main chain thereof, water-absorbing substances having a water absorption factor of 1% or more and moisture-proof substances having a water absorption factor of not more than 0.1%.

A method for forming the protective layer is not particularly limited. For example, a vacuum vapor deposition process, a sputtering process, a reactive sputtering process, an MBE (molecular beam epitaxy) process, a cluster ion beam process, an ion plating process, a plasma polymerization process (high-frequency exciting ion plating process), a plasma CVD process, a laser CVD process, a thermal CVD process, a gas source CVD process, a coating process, a printing process and a transfer process can be adopted.

<Anode>

In general, the anode may have a function as an electrode for feeding a hole into the organic layer. The anode is not particularly limited with respect to its shape, structure and size and so on and can be properly chosen among known electrode materials depending upon the application and purpose of the luminescence device. As described above, the anode is usually provided as a transparent anode.

Suitable examples of a material of the anode include metals, alloys, metal oxides, conductive compounds and mixtures thereof. Specific examples of the anode material include conductive metal oxides such as tin oxide doped with antimony, fluorine, etc. (for example, ATO, FTO, etc.), tin oxide, zinc oxide, indium oxide, indium tin oxide (ITO) and indium zinc oxide (IZO); metals such as gold, silver, chromium and nickel; mixtures or laminates of the foregoing metal and conductive metal oxide; inorganic conductive substances such as copper iodide and copper sulfide; organic conductive materials such as polyaniline, polythiophene and polypyrrole; and laminates thereof with ITO. Of these, conductive metal oxides are preferable; and ITO is especially preferable from the standpoints of productivity, high conductivity, transparency, etc.

The anode can be formed on the foregoing substrate according to a method properly chosen while taking into consideration the adaptability to the material constituting the anode among, for example, a wet mode (for example, a printing mode, a coating mode, etc.), a physical mode (for example, a vacuum vapor deposition process, a sputtering process, an ion plating process, etc.), a chemical mode (for example, a CVD process, a plasma CVD process, etc.) and so on. For example, in the case where ITO is chosen as the material of the anode, the formation of the anode can be carried out according to a direct current or high-frequency sputtering process, a vacuum vapor deposition process, an ion plating process, etc.

Though the formation position of the anode is not particularly limited and can be properly chosen depending upon the application and purpose of the luminescence device, it is preferable that the anode is formed on the substrate. In that case, the anode may be formed on the whole or a part of one surface of the substrate.

Patterning in forming the anode may be carried out by means of chemical etching such as photolithography or may be carried out by means of physical etching with a laser, etc. Also, patterning may be carried out by superimposing a mask and undergoing vacuum vapor deposition or sputtering or the like or may be carried out by a liftoff process or a printing process.

The thickness of the anode can be properly chosen depending upon the material constituting the anode and cannot be unequivocally defined. The thickness of the anode is usually from about 10 nm to 50 μm, and preferably from 50 nm to 20 μm.

A resistivity value of the anode is preferably not more than $10^3 \Omega/\square$, and more preferably not more than $10^2 \Omega/\square$. In the case where the anode is transparent, the anode may be colorless transparent or may be colored transparent. In order to collect light emission from the transparent anode side, its transmittance is preferably 60% or more, and more preferably 70% or more.

The transparent anode is described in detail in *New Developments of Transparent Conductive Films*, supervised by Yutaka Sawada (published by CMC Publishing Co., Ltd., 1999), and the matters described therein can be applied to the invention. In the case of using a plastic base material with low heat resistance, a transparent anode obtained by using ITO or IZO and fabricating it at a low temperature of not higher than 150° C. is preferable.

<Cathode>

In general, the cathode may have a function as an electrode for injecting an electron into the organic layer. The cathode is not particularly limited with respect to its shape, structure and size and so on and can be properly chosen among known electrode materials depending upon the application and purpose of the luminescence device.

Examples of a material constituting the cathode include metals, alloys, metal oxides, electrically conductive compounds and mixtures thereof. Specific examples of the cathode material include alkali metals (for example, Li, Na, K, Cs, etc.), alkaline earth metals (for example, Mg, Ca, etc.), gold, silver, lead, aluminum, a sodium-potassium alloy, a lithium-aluminum alloy, a magnesium-silver alloy, indium and rare earth metals such as ytterbium. Though such a material may be used singly, two or more kinds thereof can be suitably used jointly from the viewpoint of making both stability and electron injection properties compatible with each other.

Of these, alkali metals and alkaline earth metals are preferable as the material constituting the cathode from the standpoint of electron injection properties; and materials composed mainly of aluminum are preferable from the standpoint of excellent storage stability.

The material composed mainly of aluminum as referred to herein refers to aluminum singly or an alloy of aluminum and from 0.01 to 10% by mass of an alkali metal or an alkaline earth metal or a mixture thereof (for example, a lithium-aluminum alloy, a magnesium-aluminum alloy, etc.).

The material of the cathode is disclosed in detail in JP-A-2-15595 and JP-A-5-121172, and materials disclosed in these patent documents can also be applied in the invention.

The method for forming the cathode is not particularly limited, and the formation of the cathode can be carried out according to a known method. The cathode can be formed according to a method properly chosen while taking into consideration the adaptability to the material constituting the cathode among, for example, a wet mode (for example, a printing mode, a coating mode, etc.), a physical mode (for example, a vacuum vapor deposition process, a sputtering process, an ion plating process, etc.), a chemical mode (for example, a CVD process, a plasma CVD process, etc.) and so on. For example, in the case where a metal or the like is chosen as the material of the cathode, the cathode can be formed by a simultaneous or sequential sputtering process of one or two or more kinds thereof.

Patterning in forming the cathode may be carried out by means of chemical etching such as photolithography or may be carried out by means of physical etching with a laser, etc. Also, patterning may be carried out by superimposing a mask and undergoing vacuum vapor deposition or sputtering or the like or may be carried out by a liftoff process or a printing process.

The formation position of the cathode is not particularly limited. The cathode can be formed on the whole or a part of the organic layer.

Also, a dielectric layer made of a fluoride or oxide of an alkali metal or alkaline earth metal, etc. may be inserted in a thickness of from 0.1 to 5 nm between the cathode and the organic layer. This dielectric layer can also be considered as a sort of the electron injection layer. The dielectric layer can be formed by, for example, a vacuum vapor deposition process, a sputtering process, an ion plating process or the like.

The thickness of the cathode can be properly chosen depending upon the material constituting the cathode and cannot be unequivocally defined. The thickness of the cathode is usually from about 10 nm to 5 μm, and preferably from 50 nm to 1 μm.

Also, the cathode may be transparent or may be opaque. A transparent cathode can be formed by thinly fabricating the material of the cathode in a thickness of from 1 to 10 nm and further laminating a transparent conductive material such as ITO and IZO.

In view of the properties of the device, it is preferable that at least one of the anode and the cathode is transparent or translucent.

<Substrate>

The electrode and the organic layer can be prepared on a substrate.

It is preferable that the substrate is a substrate which does not scatter or decay light emitted from the organic layer. Specific examples thereof include inorganic materials such as yttria-stabilized zirconia (YSZ) and a glass; polyesters such as polyethylene terephthalate, polybutylene phthalate and polyethylene naphthalate; and organic materials such as polystyrene, polycarbonates, polyethersulfones, polyarylates, polyimides, polycycloolefins, norbornene resins and poly(chlorotrifluoroethylene).

For example, in the case where a glass is used as the substrate, with respect to the quality of the material, for the purpose of reducing eluted ions from the glass, it is preferred to use a no-alkali glass. Also, in the case of using a soda lime glass, it is preferred to use a glass to which barrier coating with silica, etc. has been applied. In the case of an organic material, it is preferable that the organic material is excellent in heat resistance, dimensional stability, solvent resistance, electrical insulating properties and processability.

The substrate is not particularly limited with respect to its shape, structure and size and so on and can be properly chosen depending upon the application and purpose and the like of the luminescence device. In general, the shape of the substrate is preferably a platy shape. The structure of the substrate may be a single layer structure or may be a laminate structure. Also, the substrate may be formed of a single component or may be formed of two or more components.

Though the substrate may be colorless transparent or may be colored transparent, it is preferably colorless transparent from the standpoint that light emitted from the organic light emitting layer is not scattered or decayed.

The substrate can be provided with a moisture permeation preventing layer (gas barrier layer) on the front or back surface thereof.

As a material of the moisture permeation preventing layer (gas barrier layer), an inorganic material such as silicon nitride and silicon oxide is suitably used. The moisture permeation preventing layer (gas barrier layer) can be formed by, for example, a high-frequency sputtering process, etc. In the case of using a thermoplastic substrate, a hard coat layer, an undercoat layer or the like may be further provided, if desired.

<Sealing Vessel>

The organic EL device of the invention may be a device prepared by sealing the whole of the device using a sealing vessel. A moisture absorber or an inert liquid may be charged in a space between the sealing vessel and the device. Though the moisture absorber is not particularly limited, examples thereof include barium oxide, sodium oxide, potassium oxide, calcium oxide, sodium sulfate, calcium sulfate, magnesium sulfate, phosphorus pentoxide, calcium chloride, magnesium chloride, copper chloride, cesium fluoride, niobium fluoride, calcium bromide, vanadium bromide, molecular sieve, zeolite and magnesium oxide. Though the inert liquid is not particularly limited, examples thereof include paraffins, liquid paraffins, fluorine based solvents such as perfluoroalkanes, perfluoroamines and perfluoroethers, chlorine based solvents and silicon oils.

<Driving Method>

According to the organic EL device of the invention, light emission can be obtained by applying a voltage of direct current (optionally containing an alternating current component) (usually from 2 volts to 15 volts) or a current of direct current between the anode and the cathode.

As to the driving method of the organic EL device of the invention, driving methods disclosed in JP-A-2-148687, JP-A-6-301355, JP-A-5-29080, JP-A-7-134558, JP-A-8-234685, JP-A-8-241047, Japanese Patent No. 2784615 and U.S. Pat. Nos. 5,828,429 and 6,023,308 can be applied.

The device of the invention can be suitably utilized for display devices, displays, backlights, electro-photographs, illumination light sources, recording light sources, exposure light sources, read light sources, markers, signboards, interiors, optical communications and so on.

EXAMPLES

The invention is hereunder described in detail with reference to the following Examples, but it should not be construed that the invention is limited thereto.

<Synthesis of Compound B-1-2>

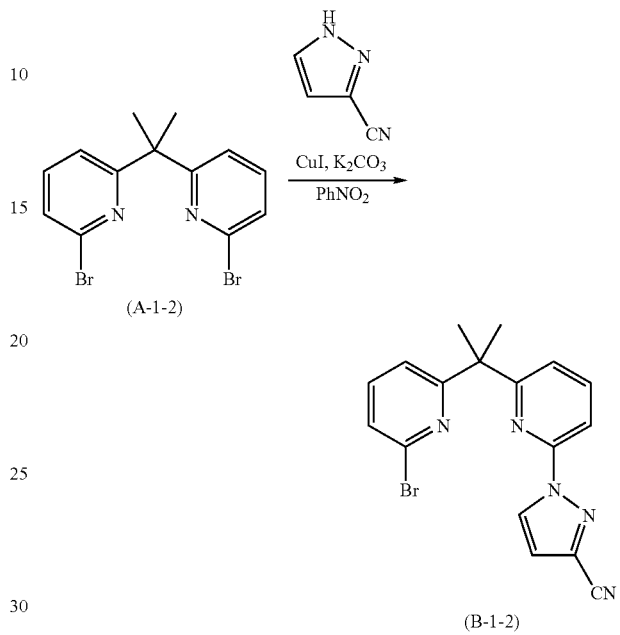

A three-necked flask was charged with Compound A-1-2 (14.24 g, 40.0 mmoles), 3-cyanopyrazole (1.86 g, 20.0 mmoles), copper iodide (0.38 g. 2.0 mmoles), potassium carbonate (8.29 g, 30.0 mmoles) and nitrobenzene (80 mL) under a nitrogen atmosphere, and the mixture was refluxed by heating with stirring for 6 hours. After distilling off the nitrobenzene in vacuo, water was added; the reaction mixture was extracted with ethyl acetate; and the obtained organic layer was dried over sodium sulfate, filtered and then concentrated. The obtained residue was purified by column chromatography, thereby obtaining 2.60 g of Compound B-1-2.

$^1$H-NMR (CDCl$_3$, 300 MHz) δ: 1.84 (s, 6H), 6.82 (s, 1H), 7.12 (d, J=4.5 Hz, 1H), 7.20 (d, J=3.0 Hz, 1H), 7.31 (d, J=4.5 Hz, 1H), 7.44 (t, J=9.0 Hz, 1H), 7.77 (d, J=4.0 Hz, 1H), 7.82 (t, J=9.6 Hz, 1H), 8.56 (s, 1H)

<Synthesis of Compound L-2>

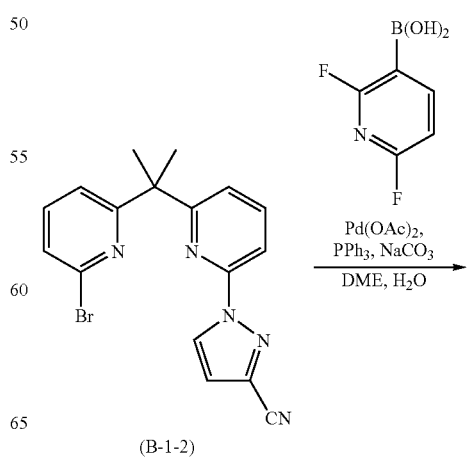

-continued

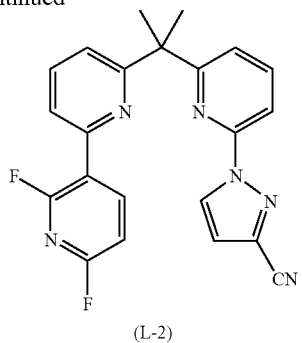

(L-2)

A three-necked flask was charged with the obtained Compound B-1-2 (1.84 g, 5.0 mmoles), 2,6-difluoropyridyl-3-boronic acid (0.93 g, 6.0 mmoles), palladium acetate (28 mg, 0.125 mmoles), triphenylphosphine (0.13 g, 0.5 mmoles), sodium carbonate (2.65 g, 25 mmoles), 1,2-dimethoxyethane (25 mL) and water (25 mL) under a nitrogen atmosphere, and the mixture was refluxed by heating with stirring for 4 hours 30 minutes. After cooling to room temperature, water was added; the reaction mixture was extracted with ethyl acetate; and the obtained organic layer was dried over sodium sulfate, filtered and then concentrated. The obtained residue was purified by column chromatography, thereby obtaining 1.91 g of Compound L-2.

$^1$H-NMR (DMSO-d$^6$, 300 MHz) δ: 1.88 (s, 6H), 7.26 (s, 1H), 7.32 (d, J=4.5 Hz, 1H), 7.39 (d, J=4.5 Hz, 1H), 7.43 (d, J=6.0 Hz, 1H), 7.72 (d, J=3.0 Hz, 1H), 7.81 (d, J=6.0 Hz, 1H), 7.89 (t, J=6.0 Hz, 1H), 8.00 (t, J=9.0 Hz, 1H), 8.67 (dd, J=6.0, 4.5 Hz, 1H), 8.81 (s, 1H)

<Synthesis of Illustrative Compound Pt-2>

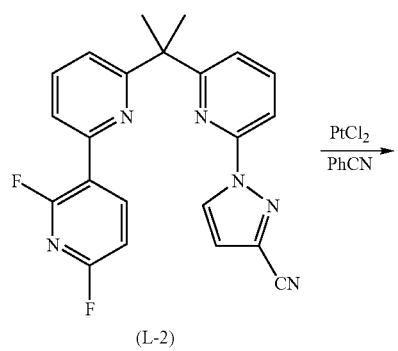

(L-2)

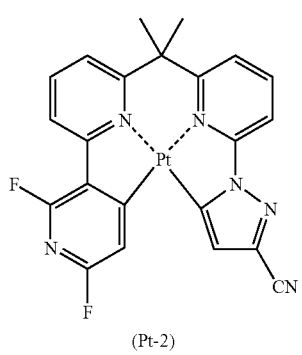

(Pt-2)

A flask was charged with Compound L-2 (1.60 g, 4.0 mmoles), platinum(II) chloride (1.07 g, 4.0 mmoles) and benzonitrile (50 mL) under a nitrogen atmosphere, and the mixture was heated at 180° C. with stirring for 3 hours. After cooling to room temperature, the solvent was concentrated, and a deposited crystal was filtered to obtain 1.27 g (yield: 53%) of Illustrative Compound Pt-2 as a yellow crystal.

$^1$H-NMR (CDCl$_3$, 300 MHz) δ: 2.06 (s, 6H), 6.83 (s, J$_{Pt-H}$=6.0 Hz, 1H), 7.41 (dd, J=0.91, 1.2 Hz, J$_{Pt-H}$=28 Hz, 1H), 7.58 (d, J=3.9 Hz, 1H), 7.63 (d, J=3.9 Hz, 1H), 7.89 (d, J=4.5 Hz, 1H), 8.00 (t, J=9.0 Hz, 1H), 8.07 (t, J=9.0 Hz, 1H), 8.13 (d, J=4.5 Hz, 1H)

<Synthesis of Compound L-5>

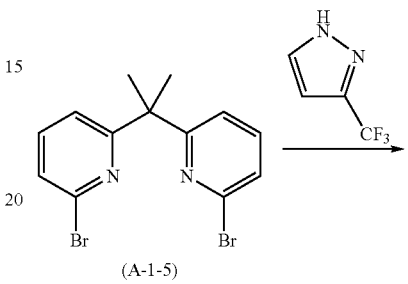

(A-1-5)

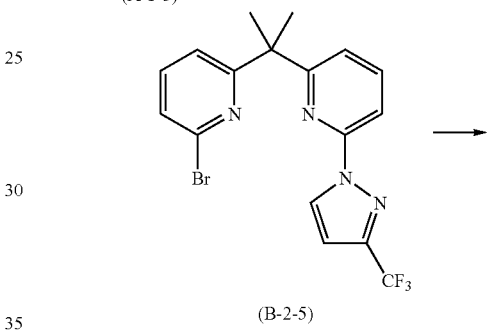

(B-2-5)

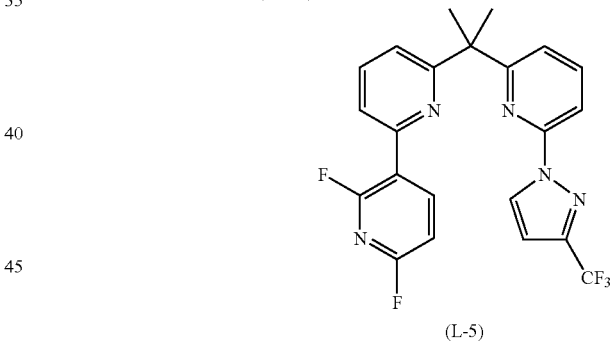

(L-5)

A three-necked flask was charged with Compound A-1-5 (10.0 g, 28.09 mmoles), 3-trifluoromethylpyrazole (1.91 g, 14.05 mmoles), copper iodide (0.267 g, 1.40 mmoles), potassium carbonate (5.82 g, 42.1 mmoles) and butyronitrile (200 mL) under a nitrogen atmosphere, and the mixture was refluxed by heating with stirring for 7 hours 30 minutes. After cooling to room temperature, water was added; the reaction mixture was extracted with ethyl acetate; and the obtained organic layer was dried over sodium sulfate, filtered and then concentrated. A half of the obtained product was used for a subsequent reaction as it was.

A three-necked flask was charged with 5.0 g of the obtained product, 2,6-difluoropyridyl-3-boronic acid (5.00 g, 31.5 mmoles), palladium acetate (137 mg, 0.608 mmoles), triphenylphosphine (0.638 g, 2.43 mmoles), sodium carbonate (12.9 g, 121.6 mmoles), 1,2-dimethoxyethane (150 mL) and water (200 mL) under a nitrogen atmosphere, and the mixture was refluxed by heating with stirring for 4 hours 30 minutes.

After cooling to room temperature, water was added; the reaction mixture was extracted with ethyl acetate; and the obtained organic layer was dried over sodium sulfate, filtered and then concentrated. The obtained residue was purified by column chromatography, thereby obtaining 1.74 g of Compound L-5.

$^1$H-NMR (CDCl$_3$, 300 MHz) δ: 1.89 (s, 6H), 6.67 (d, J=2.4 Hz, 1H), 6.94 (dd, J=3, 8.4 Hz, 1H), 7.15 to 7.25 (m, 2H), 7.60 to 7.90 (m, 4H), 8.50 to 8.59 (m, 1H), 8.69 (dt, J=8.1, 9.6 Hz, 1H)

<Synthesis of Illustrative Compound Pt-5>

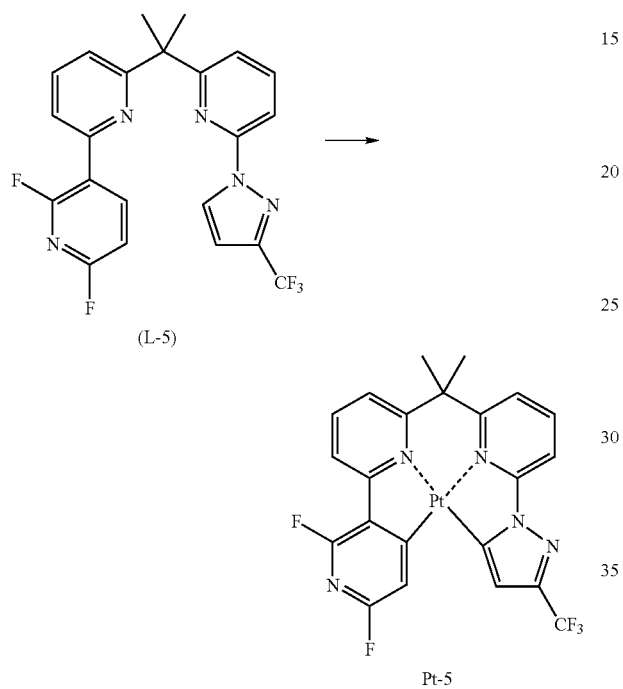

A flask was charged with Compound L-5 (1.70 g, 3.82 mmoles), platinum(II) chloride (1.02 g, 3.82 mmoles) and benzonitrile (50 mL) under a nitrogen atmosphere, and the mixture was heated at 180° C. with stirring for 3 hours. After cooling to room temperature, the solvent was concentrated, and a deposited crystal was filtered to obtain 1.84 g (yield: 75%) of Illustrative Compound Pt-5 as a yellow crystal.

$^1$H-NMR (CDCl$_3$, 300 MHz) δ: 2.05 (s, 6H), 6.72 (s, J$_{Pt-H}$=12 Hz, 1H), 7.45 (s, J$_{Pt-H}$=60 Hz, 1H), 7.52 (dd, J=0.6, 7.2 Hz, 1H), 7.62 (d, J=7.2 Hz, 1H), 7.89 (d, J=7.5 Hz, 1H), 7.95 to 8.20 (m, 3H)

<Synthesis of Compound L-40>

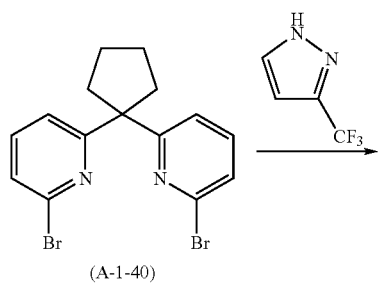

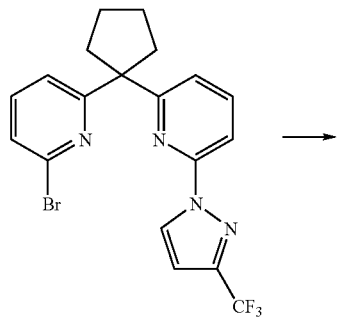

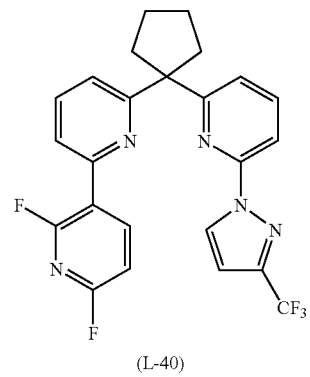

A three-necked flask was charged with Compound A-1-40 (5.00 g, 13.00 mmoles), 3-trifluoromethylpyrazole (0.88 g, 6.5 mmoles), copper iodide (0.124 g, 0.65 mmoles), potassium carbonate (2.70 g, 20 mmoles) and butyronitrile (100 mL) under a nitrogen atmosphere, and the mixture was refluxed by heating with stirring for 7 hours 30 minutes. After cooling to room temperature, water was added; the reaction mixture was extracted with ethyl acetate; and the obtained organic layer was dried over sodium sulfate, filtered and then concentrated. The obtained product was used for a subsequent reaction as it was.

A three-necked flask was charged with 2.7 g of the obtained product, 2,6-difluoropyridyl-3-boronic acid (1.47 g, 9.3 mmoles), palladium acetate (69 mg, 0.3 mmoles), triphenylphosphine (0.33 g, 1.2 mmoles), sodium carbonate (3.29 g, 31 mmoles), 1,2-dimethoxyethane (75 mL) and water (100 mL) under a nitrogen atmosphere, and the mixture was refluxed by heating with stirring for 4 hours 30 minutes. After cooling to room temperature, water was added; the reaction mixture was extracted with ethyl acetate; and the obtained organic layer was dried over sodium sulfate, filtered and then concentrated. The obtained residue was purified by column chromatography, thereby obtaining 1.8 g of Compound L-40.

$^1$H-NMR (CDCl$_3$, 300 MHz) δ: 1.79 (m, 4H), 2.64 (m, 4H), 6.70 (d, J=2.6 Hz, 1H), 6.97 (dd, J=2.8, 8.2 Hz, 1H), 7.19 (d, J=7.4 Hz, 1H), 7.23 (dd, J=1.3, 7.3 Hz, 1H), 7.67 (t, J=7.7 Hz, 1H), 7.72 (dd, J=1.5, 8.0 Hz, 1H), 7.73 (d, J=7.8 Hz, 1H), 7.82 (d, J=7.7 Hz, 1H), 8.65 (d, J=1.6 Hz, 1H), 8.77 (dt, J=8.1, 9.5 Hz, 1H)

<Synthesis of Illustrative Compound Pt-40>

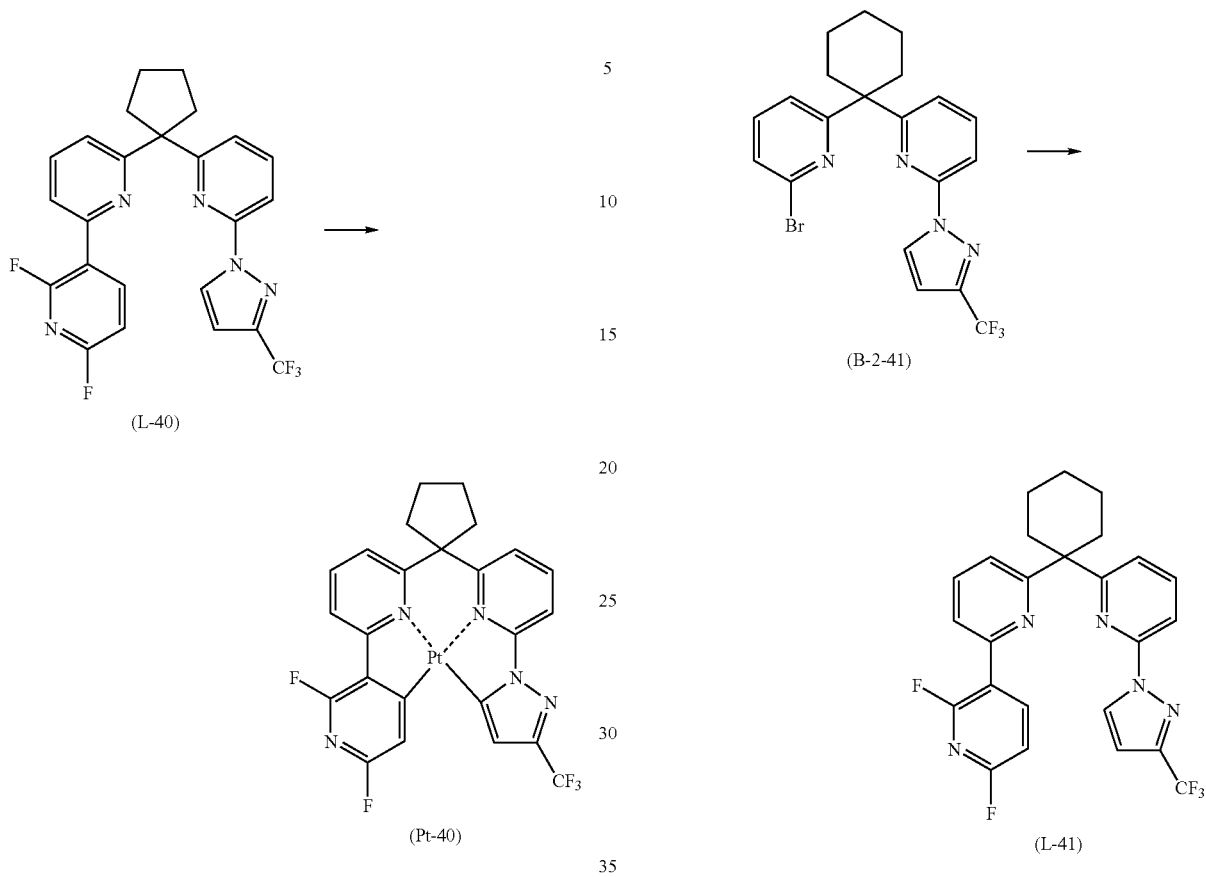

A flask was charged with Compound L-40 (1.70 g, 3.6 mmoles), platinum(II) chloride (0.96 g, 3.6 mmoles) and benzonitrile (50 mL) under a nitrogen atmosphere, and the mixture was heated at 180° C. with stirring for 3 hours. After cooling to room temperature, the solvent was concentrated, and a deposited crystal was filtered to obtain 1.56 g (yield: 65%) of Illustrative Compound Pt-40 as a yellow crystal.

$^1$H-NMR (CD$_2$Cl$_2$, 300 MHz) δ: 1.76 (m, 4H), 2.71 (m, 4H), 6.74 (s, J$_{Pt-H}$=11.7 Hz, 1H), 7.45 (t, J=2.2 Hz, J$_{Pt-H}$=64.0 Hz, 1H), 7.52 (dd, J=0.6, 7.8 Hz, 1H), 7.60 (dd, J=1.0, 7.8 Hz, 1H), 7.84 (dd, J=0.7, 8.2 Hz, 1H), 8.01 (t, J=8.0 Hz, 1H), 8.06 (t, J=8.1 Hz, 1H), 8.07 (d, J=8.0 Hz, 1H)

<Synthesis of Compound L-41>

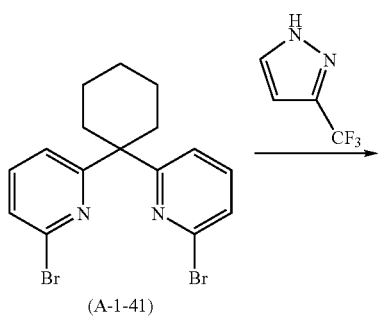

A mixture consisting of Compound A-1-41 (4.7 g, 11.9 mmoles), 3-trifluoromethylpyrazole (0.8 g, 5.9 mmoles), copper iodide (113.0 mg, 0.6 mmoles), potassium carbonate (2.5 g, 17.9 mmoles) and normal butyronitrile (80.0 mL) was stirred under a nitrogen atmosphere at 115° C. for 7 hours. After cooling to room temperature, the reaction mixture was filtered, concentrated and then purified by column chromatography, thereby obtaining 5.0 g of a pale yellow solid.

A mixture consisting of the obtained pale yellow solid (5.0 g), 2,6-difluoropyridyl-3-boronic acid (4.5 g, 28.3 mmoles), palladium acetate (212 mg. 0.94 mmoles), triphenylphosphine (991 mg, 3.8 mmoles), sodium carbonate (9.2 g, 86 mmoles), 1,2-dimethoxyethane (200.0 mL) and water (200.0 mL) was stirred under a nitrogen atmosphere at 80° C. for one and a half hours. After cooling to room temperature, the reaction mixture was filtered and then extracted with ethyl acetate. The organic layer was collectively dried and then concentrated, and the obtained residue was purified by column chromatography, thereby obtaining 1.0 g of Compound L-41 as a white solid.

$^1$H-NMR (300 MHz, CDCl$_3$) δ: 1.60 to 1.66 (br, 6H), 2.53 to 2.60 (br, 4H), 6.69 (d, J=2.4 Hz, 1H), 6.97 (dd, J=3.0, 8.4 Hz, 1H), 7.18 (d, J=7.2 Hz, 1H), 7.23 to 7.28 (m, 1H), 7.56 to 7.53 (m, 4H), 8.62 (s, 1H), 8.74 (dt, J=8.1, 9.6 Hz, 1H)

<Synthesis of Illustrative Compound Pt-41>

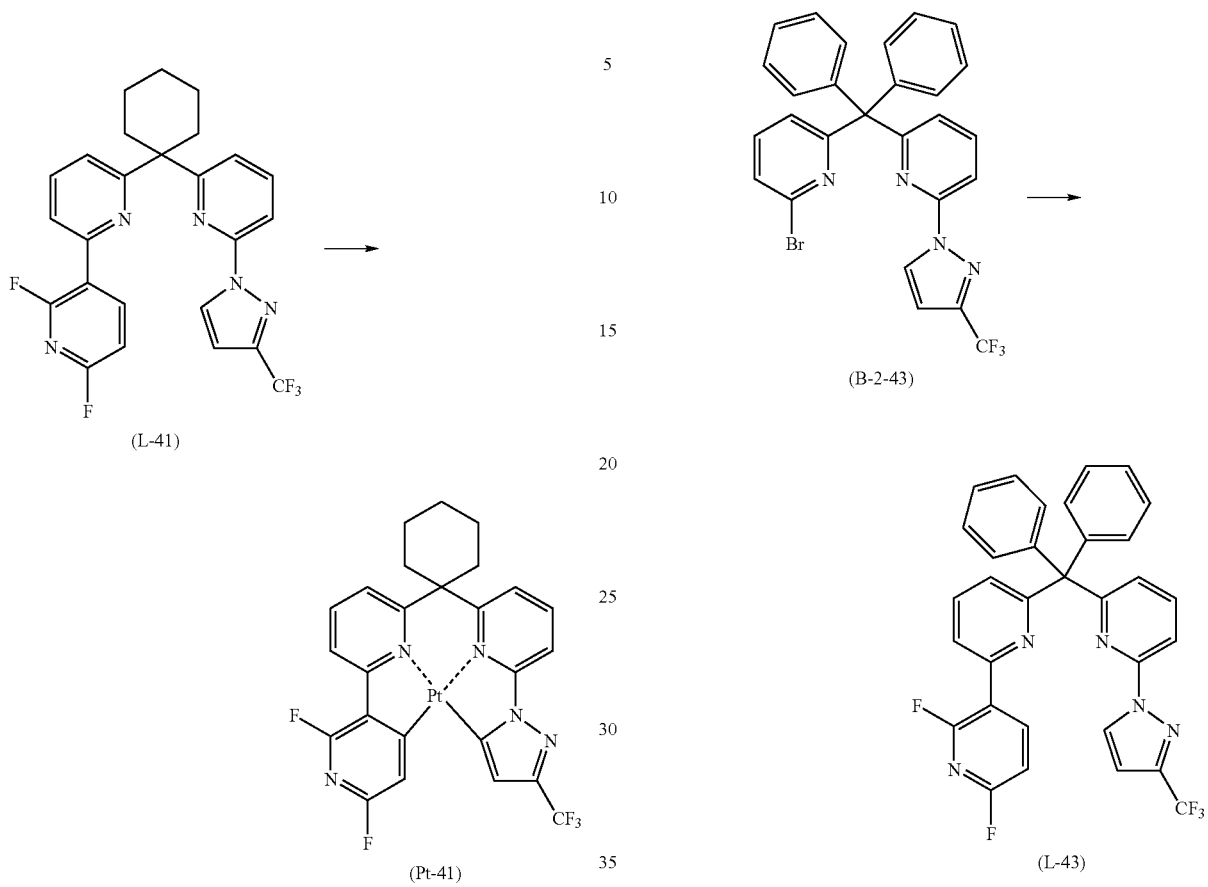

A flask was charged with Compound L-41 (1.00 g, 2.1 mmoles), platinum(II) chloride (0.55 g, 2.1 mmoles) and benzonitrile (20 mL) under a nitrogen atmosphere, and the mixture was heated at 180° C. with stirring for 8 hours. After cooling to room temperature, a deposited crystal was filtered to obtain 0.91 g (yield: 65%) of Illustrative Compound Pt-41 as a yellow crystal.

$^1$H-NMR (CD$_2$Cl$_2$, 300 MHz) δ: 1.39 (br, 6H), 2.51 (br, 2H), 2.82 (br, 2H), 6.61 (s, 1H), 7.32 (t, J=2.1 Hz, J$_{Pt-H}$=63.6 Hz, 1H), 7.45 (d, J=8.4 Hz, 1H), 7.54 (dd, J=1.8, 4.5 Hz, 1H), 7.72 (d, J=8.1 Hz, 1H), 7.93 to 8.01 (m, 3H)

<Synthesis of Compound L-43>

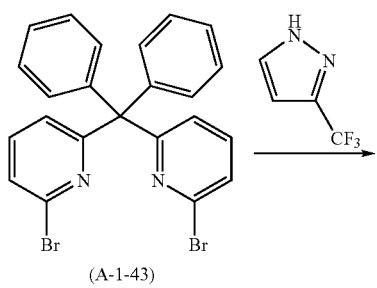

A three-necked flask was charged with Compound A-1-43 (9.46 g, 19.7 mmoles), 3-trifluoromethylpyrazole (1.34 g, 9.85 mmoles), copper iodide (0.187 g, 0.98 mmoles), potassium carbonate (4.00 g, 29.55 mmoles) and butyronitrile (50 mL) under a nitrogen atmosphere, and the mixture was refluxed by heating with stirred for 6 hours. After cooling to room temperature, water was added; the reaction mixture was extracted with ethyl acetate; and the obtained organic layer was dried over sodium sulfate, filtered and then concentrated. The obtained product was used for a subsequent reaction as it was.

A three-necked flask was charged with 5.85 g of the obtained product, 2,6-difluoropyridyl-3-boronic acid (3.47 g, 21.85 mmoles), palladium acetate (122 mg, 0.54 mmoles), triphenylphosphine (0.571 g, 2.1 mmoles), sodium carbonate (11.55 g, 109 mmoles), 1,2-dimethoxyethane (100 mL) and water (100 mL) under a nitrogen atmosphere, and the mixture was refluxed by heating with stirring for 4 hours 30 minutes. After cooling to room temperature, water was added; the reaction mixture was extracted with ethyl acetate; and the obtained organic layer was dried over sodium sulfate, filtered and then concentrated. The obtained residue was purified by column chromatography, thereby obtaining 1.75 g of Compound L-43.

$^1$H-NMR (CDCl$_3$, 300 MHz) δ: 6.58 (d, 1H), 6.80 (dd, 1H), 7.10 to 7.40 (m, 13H), 7.70 to 7.90 (m, 3H), 8.15 (d, 1H), 8.40 (dt, 1H)

<Synthesis of Illustrative Compound Pt-43>

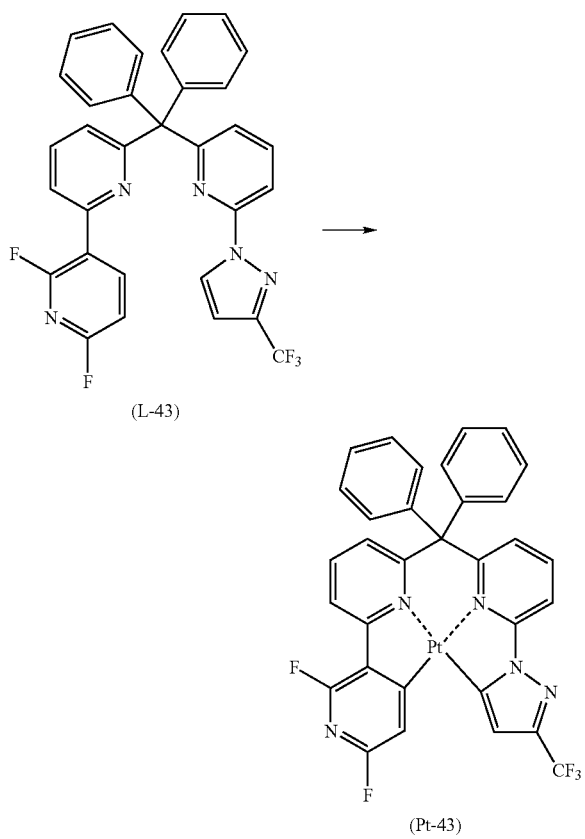

A flask was charged with Compound L-43 (1.75 g, 3.07 mmoles), platinum(II) chloride (0.817 g, 3.07 mmoles) and benzonitrile (20 mL) under a nitrogen atmosphere, and the mixture was heated at 180° C. with stirring for 2 hours. After cooling to room temperature, the solvent was concentrated, and a deposited crystal was filtered to obtain 1.72 g (yield: 73%) of Illustrative Compound Pt-43 as a yellow crystal.

$^1$H-NMR (CD$_2$Cl$_2$, 300 MHz) δ: 6.55 (dd, 3H), 6.64 (s, 1H), 6.91 (dd, 1H), 7.03 (dd, 1H), 7.20 to 7.40 (m, 6H), 7.40 to 7.52 (m, 1H), 7.57 to 7.70 (m, 1H), 7.80 to 8.00 (m, 3H), 8.12 (d, 1H)

<Synthesis of Compound L-142>

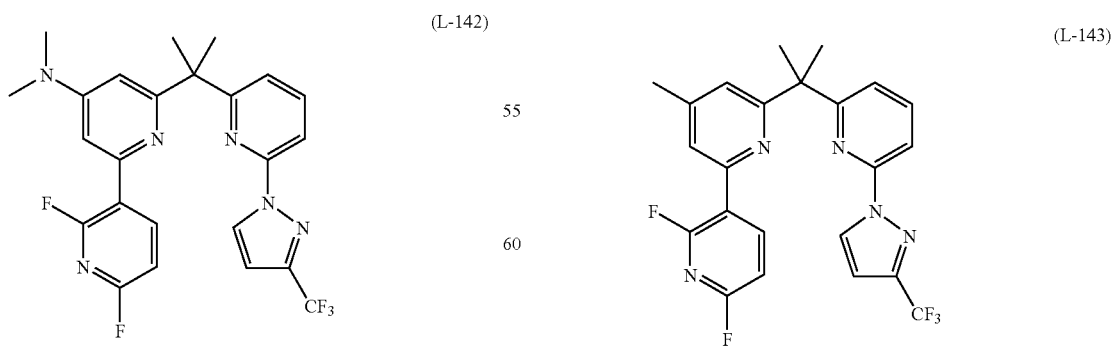

Compound L-142 was synthesized in the same manner as in the synthesis of Illustrative Compound Pt-5.

$^1$H-NMR (300 MHz, CDCl$_3$) δ: 1.88 (s, 6H), 3.04 (s, 6H), 6.41 (s, 1H), 6.72 (s, 1H), 6.90 (d, J=8.1 Hz, 1H), 7.04 (s, 1H), 7.18 (d, J=8.9 Hz, 1H), 7.75 (t, J=7.2 Hz, 1H), 7.84 (d, J=7.2 Hz, 1H), 8.63 to 8.73 (m, 2H)

<Synthesis of Illustrative Compound Pt-142>

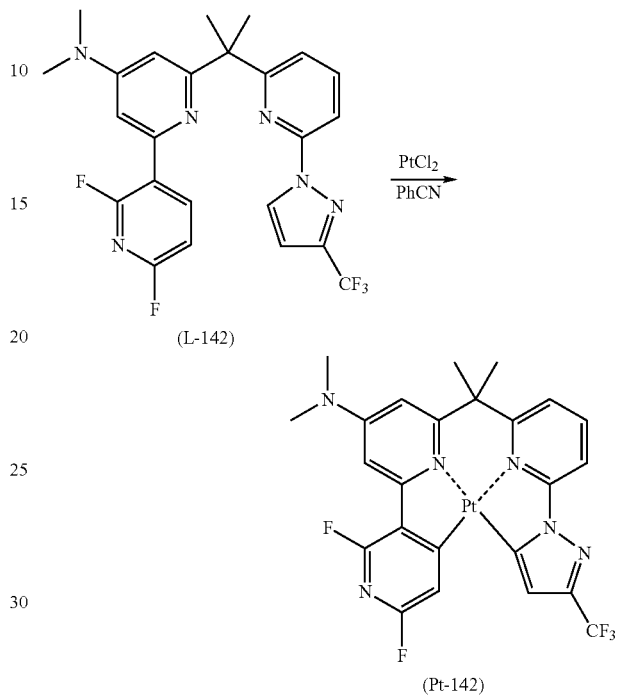

Platinum(II) chloride (871 mg, 3.3 mmoles) and Compound L-142 (1.6 g, 3.3 mmoles) were stirred in benzonitrile (100 mL) for 8 hours under a nitrogen atmosphere under a reflux condition by heating. After allowing the reaction mixture to stand for cooling, methanol was added, and a deposited solid was filtered and then washed with methanol, thereby obtaining 1.2 g of 1 Illustrative Compound Pt-142 as a bright yellow powder. Yield: 54%

$^1$H-NMR (300 MHz, CD$_2$Cl$_2$) δ: 1.99 (s, 6H), 3.19 (s, 6H), 6.68 (t, J=6.0 Hz, 1H), 6.76 (d, J=2.4 Hz, 1H), 7.25 (t, J=2.4 Hz, 1H), 7.41 (t, J (H—F)=2.1 Hz, J (Pt—H)=64.2 Hz, 1H), 7.52 (d, J=7.8 Hz, 1H), 7.82 (d, J=8.1 Hz, 1H), 8.03 (t, J=8.1 Hz, 1H)

<Synthesis of Compound L-143>

Compound L-143 was synthesized in the same manner as in the synthesis of Illustrative Compound Pt-5.

¹H-NMR (300 MHz, CDCl₃) δ: 1.87 (s, 6H), 2.37 (s, 3H), 6.67 (d, J=2.4 Hz, 1H), 6.92 (dd, J=1.8, 8.4 Hz, 1H), 7.00 (s, 1H), 7.16 (t, J=7.2 Hz, 1H), 7.56 (s, 1H), 7.75 (t, J=7.8 Hz, 1H), 7.85 (d, J=7.5 Hz, 1H), 8.59 (s, 1H), 8.68 (dd, J=8.4, 17.1 Hz, 1H)

<Synthesis of Illustrative Compound Pt-143>

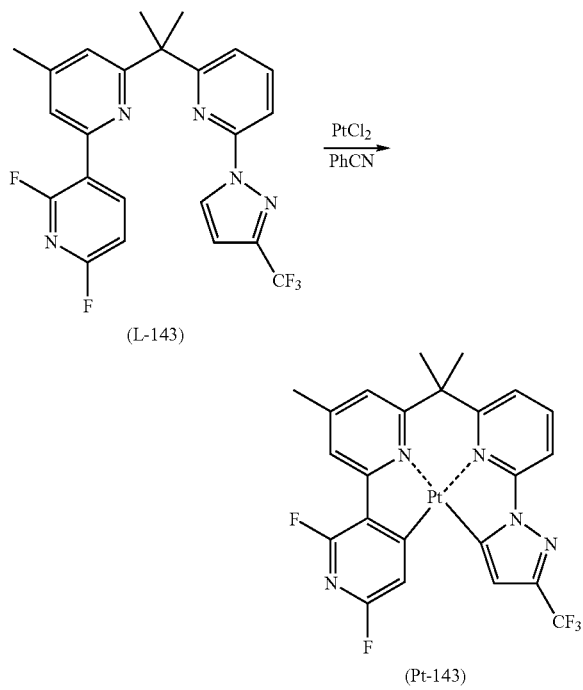

Platinum(II) chloride (266 mg, 1.0 mmole, 1.05 equivalents) and Compound L-143 (400 mg, 0.95 mmoles, 1.0 equivalent) were stirred in benzonitrile (4 mL) for 4 hours under a nitrogen atmosphere under a reflux condition by heating. After allowing the reaction mixture to stand for cooling, methanol was added, and a deposited solid was filtered and then washed with methanol, thereby obtaining 380 mg of 1 Illustrative Compound Pt-143 as a bright yellow powder. Yield: 65%

¹H-NMR (300 MHz, CD₂Cl₂) δ: 2.05 (s, 6H), 2.56 (s, 3H), 6.74 (t, J=6.0 Hz, 1H), 7.46 (t, J (H—F)=2.4 Hz, J (Pt—H)= 64.2 Hz, 1H), 7.51 (s, 1H), 7.59 (d, J=7.2 Hz, 1H), 7.87 (d, J=7.5 Hz, 1H), 7.95 (s, 1H), 8.09 (t, J=8.1 Hz, 1H)

<Synthesis of Illustrative Compound Pt-140>

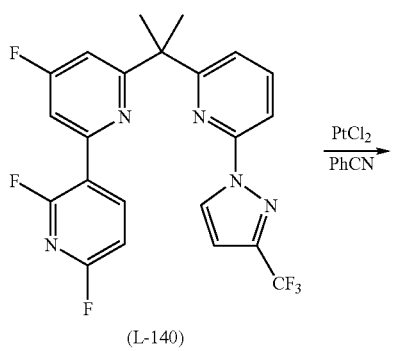

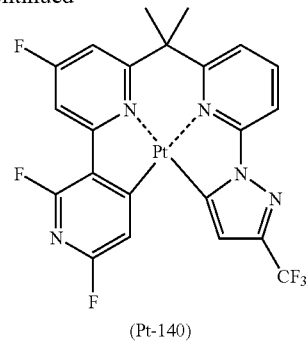

Platinum(II) chloride (980 mg, 3.7 mmoles) and Compound L-140 (1.72 g, 3.7 mmoles) were stirred in benzonitrile (80 mL) for 18 hours under a nitrogen atmosphere under a reflux condition by heating. After allowing the reaction mixture to stand for cooling, methanol was added, and a deposited solid was filtered and then washed with methanol, thereby obtaining 1.22 g of 1 Illustrative Compound Pt-140 as a bright yellow powder. Yield: 50%

¹H-NMR (300 MHz, CD₂Cl₂) δ: 2.06 (s, 6H), 7.35 to 7.52 (m, 2H), 7.60 (dd, J=0.6, 7.8 Hz, 1H), 7.82 to 7.94 (m, 2H), 8.12 (t, J=8.1 Hz, 1H)

<Synthesis of Compound L-11>

Compound L-11 can be synthesized by using a compound represented by the formula (A"-1), wherein each of R⁴¹, R⁴², R⁴³, R⁴⁴, R⁴⁵ and R⁴⁶ is a hydrogen atom, and R is a methyl group, and allowing it to react with 4-cyano-3-trifluoromethylpyrazole and 2,6-difluoropyridyl-3-boronic acid by using a reaction condition employed in the synthesis of Illustrative Compound Pt-5 and so on.

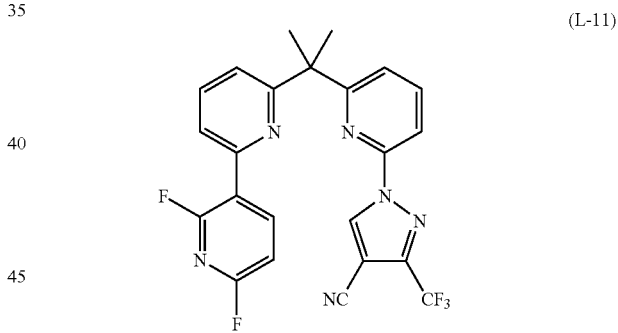

¹H-NMR (300 MHz, CD₂Cl₂) δ: 1.94 (s, 6H), 6.99 (ddd, J=0.9, 3.0, 8.4 Hz, 1H), 7.36 (ddd, J=1.5, 6.9, 15 Hz, 2H), 7.70 to 8.00 (m, 4H), 8.65 (dt, J=8.1, 9.6 Hz, 1H), 9.04 (d, J=0.9 Hz, 1H)

<Synthesis of Illustrative Compound Pt-11>

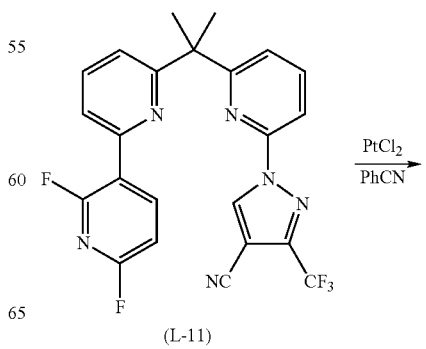

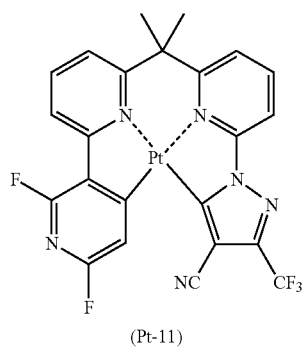

(Pt-11)

Platinum(II) chloride (791 mg, 2.98 mmoles) and Compound L-11 (1.4 g, 2.98 mmoles) were stirred in benzonitrile (50 mL) for 3 hours under a nitrogen atmosphere under a reflux condition by heating. After allowing the reaction mixture to stand for cooling, methanol was added, and a deposited solid was filtered and then washed with methanol, thereby obtaining 1.49 g of 1 Illustrative Compound Pt-11 as a bright yellow powder. Yield: 75%

$^1$H-NMR (300 MHz, CD$_2$Cl$_2$) δ: 2.10 (s, 6H), 7.63 to 7.72 (m, 2H), 7.95 (dd, J=0.6, 8.1 Hz, 1H), 8.07 (t, J=8.1 Hz, 1H), 8.12 to 8.23 (m, 2H), 8.31 (t, J (H—F)=1.5 Hz, J (Pt—H)= 63.0 Hz, 1H)

<Synthesis of Compound L-50>

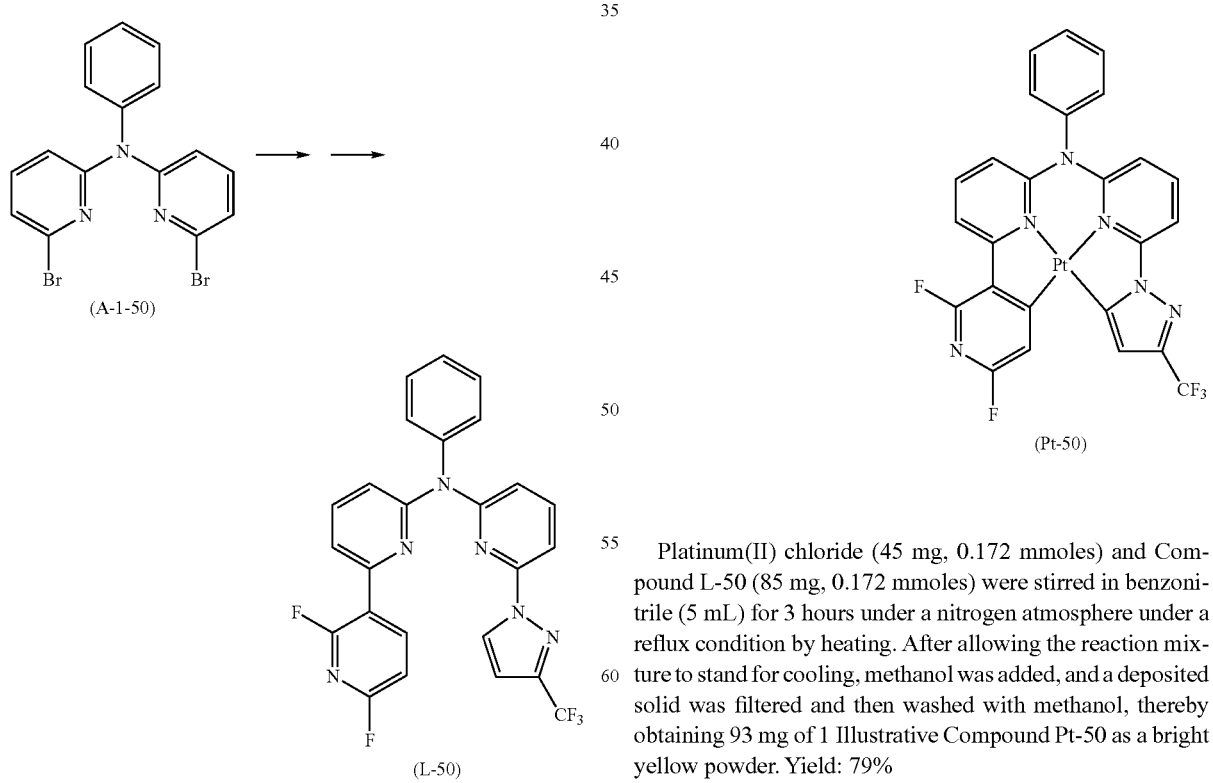

Compound A-1-50 was synthesized by utilizing a method described in *Syn. Lett.*, 2, 263 (2005) or the like.

Compound L-50 was synthesized in the same manner as in the synthesis of Illustrative Compound Pt-5.

$^1$H-NMR (300 MHz, CDCl$_3$) δ: 6.56 (d, J=2.7 Hz, 1H), 6.82 (ddd, J=0.6, 3.0, 8.4 Hz, 1H), 7.01 (d, J=8.4 Hz, 1H), 7.10 (d, J=8.4 Hz, 1H), 7.25 to 7.37 (m, 3H), 7.46 (t, J=7.5 Hz, 2H), 7.56 to 7.63 (m, 2H), 7.71 (dt, J=1.5, 8.1 Hz, 2H), 8.11 (dd, J=0.9, 2.7 Hz, 1H), 8.32 (dt, J=7.8, 8.1 Hz, 1H)

<Synthesis of Illustrative Compound Pt-50>

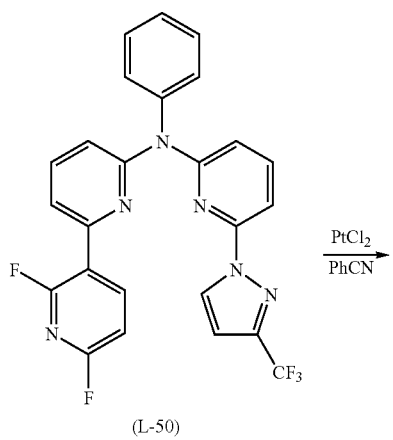

Platinum(II) chloride (45 mg, 0.172 mmoles) and Compound L-50 (85 mg, 0.172 mmoles) were stirred in benzonitrile (5 mL) for 3 hours under a nitrogen atmosphere under a reflux condition by heating. After allowing the reaction mixture to stand for cooling, methanol was added, and a deposited solid was filtered and then washed with methanol, thereby obtaining 93 mg of 1 Illustrative Compound Pt-50 as a bright yellow powder. Yield: 79%

$^1$H-NMR (300 MHz, CD$_2$Cl$_2$) δ: 6.45 (d, J=8.7 Hz, 1H), 6.64 (d, J=8.7 Hz, 1H), 6.75 (s, 1H), 7.46 to 7.56 (m, 3H), 7.66 (d, J=7.5 Hz, 1H), 7.75 to 7.90 (m, 6H)

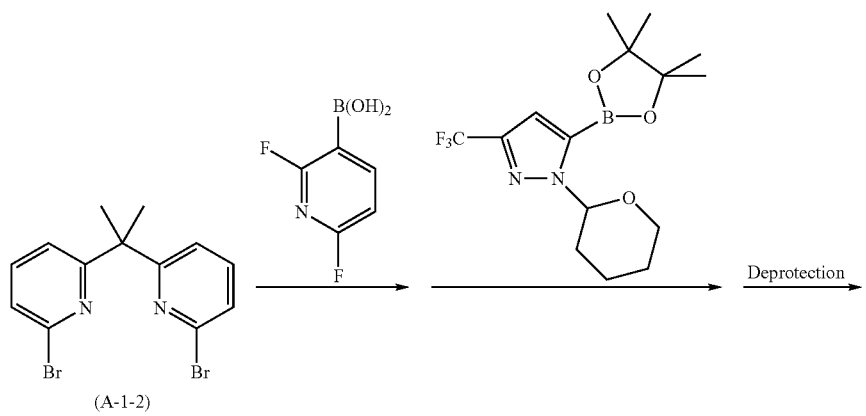

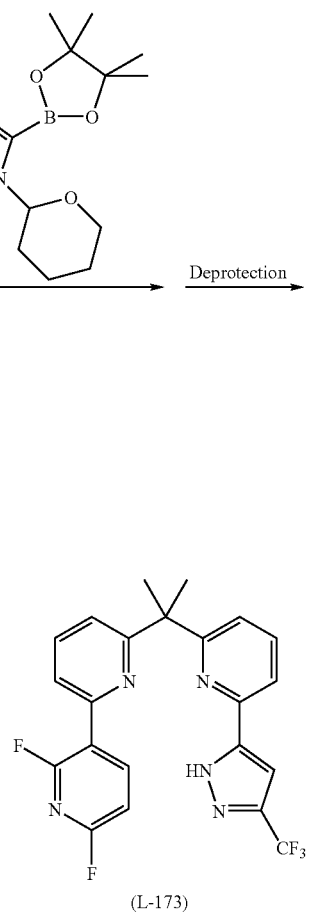

Compound L-173 was synthesized by allowing Compound A-1-2 and a boronic ester to react with each other and then deprotecting the protective group on nitrogen.

$^1$H-NMR (300 MHz, CD$_2$Cl$_2$) δ: 1.85 (s, 6H), 6.85 (dd, J=0.9, 3.0 Hz, 1H), 6.88 (s, 1H), 7.21 (dt, J=0.9, 7.8 Hz, 2H), 7.43 (dd, J=0.9, 7.8 Hz, 1H), 7.60 to 7.72 (m, 3H), 8.55 (dt, J=9.6, 10.8 Hz, 1H), 11.7 (brs, 1H)

<Synthesis of Illustrative Compound Pt-173>

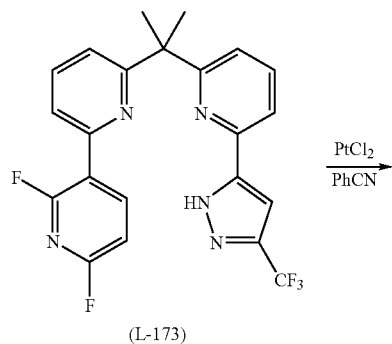

-continued

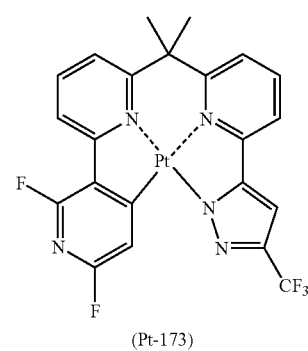

Platinum(II) chloride (537 mg, 2.02 mmoles) and Compound L-173 (900 mg, 2.02 mmoles) were stirred in benzonitrile (50 mL) for 3 hours under a nitrogen atmosphere under a reflux condition by heating. After allowing the reaction mixture to stand for cooling, methanol was added, and a deposited solid was filtered and then washed with methanol, thereby obtaining 1.06 g of 1 Illustrative Compound Pt-173 as a bright yellow powder. Yield: 82%

$^1$H-NMR (300 MHz, CD$_2$Cl$_2$) δ: 2.07 (s, 6H), 6.97 (s, 1H), 7.60 to 7.67 (m, 2H), 7.71 (dd, J=0.9, 8.1 Hz), 7.90 to 8.08 (m, 3H), 8.17 (t, J=2.1 Hz, J (Pt—H)=46.8 Hz, 1H)

<Evaluation of Organic EL Device>

A washed ITO substrate was put in a vapor deposition apparatus; copper phthalocyanine was vapor deposited thereon in a thickness of 10 nm; and NPD ((N,N'-di-α-naphthyl-N,N'-diphenyl)-benzidine) was further vapor deposited thereon in a thickness of 40 nm. A host material and a light emitting material were vapor deposited thereon at a ratio of 85/15 (mass ratio) in a thickness of 40 nm; BAlq was further vapor deposited thereon in a thickness of 10 nm; and Alq was then additionally vapor deposited thereon in a thickness of 30 nm. After vapor depositing thereon lithium fluoride in a thickness of 3 nm, aluminum was vapor deposited in a thickness of 60 nm, thereby preparing an organic EL device. The organic EL device was subjected to light emission upon application of a direct current constant voltage using a source measure unit MODEL 2400, manufactured by Toyo Corporation. As a result, light emission derived from the light emitting material was obtained. Furthermore, a brightness half-time of the device which had been driven under a brightness condition of 360 cd/m$^2$ (area of luminescence: 4 mm$^2$) and under a higher brightness condition of 1,000 cd/cm$^2$ (area of luminescence: 4 mm$^2$), respectively was measured. In each of Examples 8 and 9, the same device was prepared using deuterated Alq (D-Alq) in place of Alq. The obtained results are shown in Table 2.

The chemical structure of each of the compounds used in the foregoing Examples is shown below.

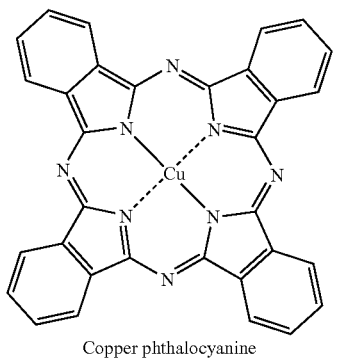

Copper phthalocyanine

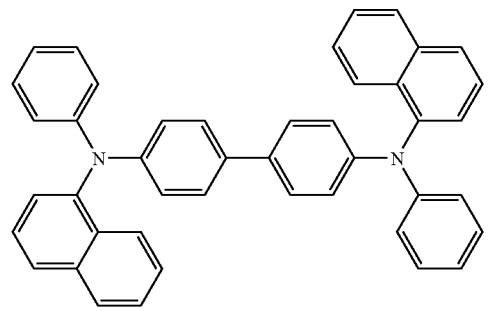

NPD

TABLE 2

| Luminescence device | Host material used in the light emitting layer | Light emitting material used in the light emitting layer | Brightness half-time (start: 360 cd/m$^2$) | Brightness half-time (start: 1,000 cd/m$^2$) |
|---|---|---|---|---|
| Comparative Example 1 | mCP | Compound I | 810 | 176 |
| Comparative Example 2 | mCP | Compound II | 750 | 162 |
| Example 1 | mCP | Pt-2 | 850 | 230 |
| Example 2 | mCP | Pt-5 | 890 | 230 |
| Example 3 | mCP | Pt-40 | 850 | 220 |
| Example 4 | mCP | Pt-41 | 850 | 230 |
| Example 5 | mCP | Pt-43 | 972 | 246 |
| Example 6 | Host 1 | Pt-5 | 1053 | 300 |
| Example 7 | Host 2 | Pt-5 | 970 | 246 |
| Example 8 | mCP | Pt-5 | 930 | 246 |
| Example 9 | Host 1 | Pt-5 | 1134 | 316 |
| Example 10 | mCP | Pt-11 | 900 | 240 |
| Example 11 | mCP | Pt-50 | 850 | 235 |
| Example 12 | mCP | Pt-140 | 950 | 250 |
| Example 13 | mCP | Pt-142 | 850 | 220 |
| Example 14 | mCP | Pt-143 | 910 | 260 |
| Example 15 | mCP | Pt-173 | 850 | 240 |
| Example 16 | Host 1 | Pt-11 | 1100 | 310 |
| Example 17 | Host 1 | Pt-140 | 1170 | 330 |
| Example 18 | Host 1 | Pt-143 | 1200 | 340 |
| Example 19 | Host 2 | Pt-11 | 1010 | 250 |
| Example 20 | Host 2 | Pt-140 | 1080 | 260 |
| Example 21 | Host 2 | Pt-143 | 1100 | 270 |
| Example 22 | Host 3 | Pt-5 | 1155 | 320 |
| Example 23 | Host 3 | Pt-11 | 1200 | 325 |
| Example 24 | Host 3 | Pt-140 | 1270 | 338 |
| Example 25 | Host 3 | Pt-143 | 1300 | 350 |

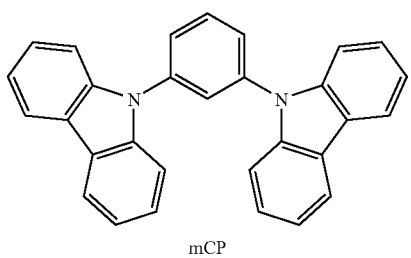

mCP

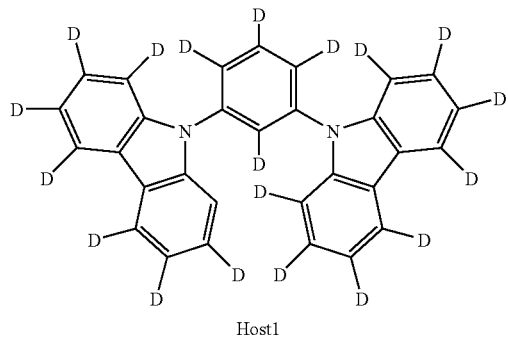

Host1

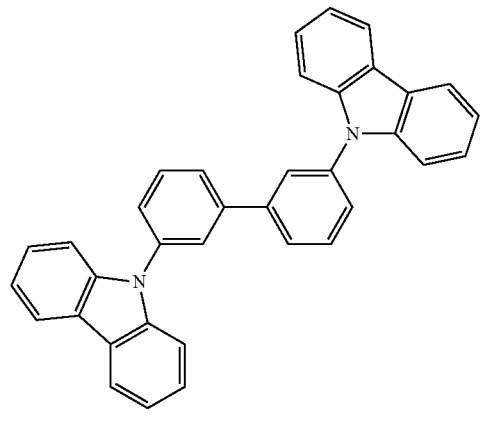

Host2

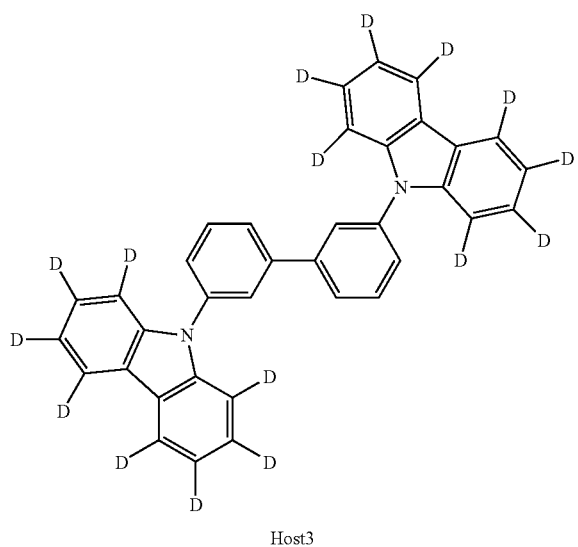

Host3

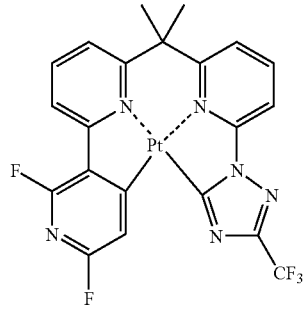

Compound I

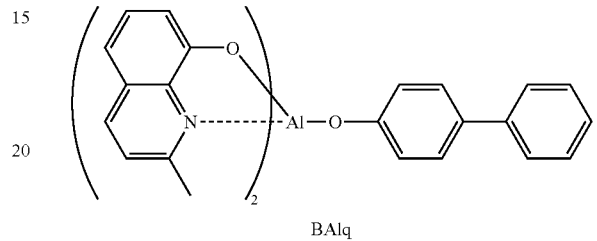

BAlq

Compound 130 Disclosed in JP-A-2006-261623

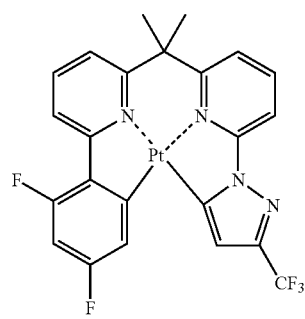

Compound II

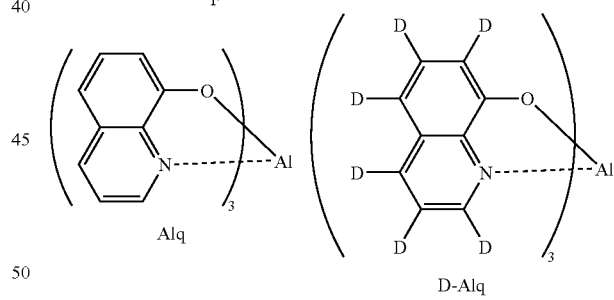

Alq            D-Alq

Compound 176 Disclosed in JP-A-2006-261623

It has become clear from the foregoing Examples that according to the invention, an organic electroluminescence device which is excellent in durability especially at a high brightness is obtained.

In accordance with the invention, by containing the compound represented by the foregoing formula (1) in the organic layer, it is possible to provide an organic electroluminescence device with excellent durability especially in the use at a high brightness.

Also, in accordance with the compound represented by the formula (4a-4) and the compound represented by the formula (4a-4') according to the invention, it is possible to provide a light emitting material capable of realizing excellent durability in the use at a high brightness.

The entire disclosure of each and every foreign patent application from which the benefit of foreign priority has been claimed in the present application is incorporated herein by reference, as if fully set forth.

What is claimed is:

1. An organic electroluminescence device, comprising:
a pair of electrodes; and
at least one organic layer including a light emitting layer, the light emitting layer being provided between the pair of electrodes,
wherein at least one layer of the at least one organic layer contains a compound represented by formula (4a-4):

Formula (4a-4)

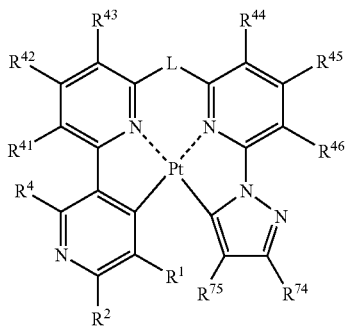

(4a-4)

wherein each of $R^1$, $R^2$, $R^4$, $R^{41}$, $R^{42}$, $R^{43}$, $R^{44}$, $R^{45}$, $R^{46}$, $R^{74}$ and $R^{75}$ independently represents a hydrogen atom or a substituent; and L represents a single bond or a divalent connecting group.

2. The organic electroluminescence device according to claim 1,
wherein the light emitting layer contains at least one member of the compound represented by formula (4a-4).

3. The organic electroluminescence device according to claim 1,
wherein at least one layer of the at least one organic layer contains a material having at least one deuterium atom.

4. The organic electroluminescence device according to claim 3,
wherein the material having at least one deuterium atom is a material containing any one of a carbazole structure and an indole structure each having at least one deuterium atom.

5. A compound represented by formula (4a-4):

Formula (4a-4)

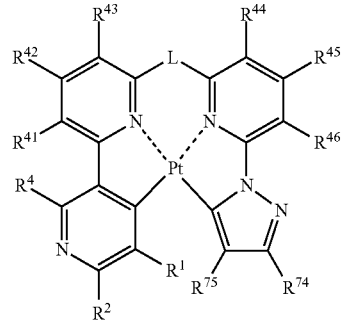

(4a-4)

wherein each of $R^1$, $R^2$, $R^4$, $R^{41}$, $R^{42}$, $R^{43}$, $R^{44}$, $R^{45}$, $R^{46}$, $R^{74}$ and $R^{75}$ independently represents a hydrogen atom or a substituent; and L represents a single bond or a divalent connecting group.

* * * * *